United States Patent [19]

Newkirk et al.

[11] Patent Number: 5,280,819
[45] Date of Patent: Jan. 25, 1994

[54] METHODS FOR MAKING THIN METAL MATRIX COMPOSITE BODIES AND ARTICLES PRODUCED THEREBY

[75] Inventors: Marc S. Newkirk, Newark, Del.; Michael K. Aghajanian, Bel Air; Gregory E. Hannon, North East, both of Md.; Allyn L. McCormick, Bear; Gerhard H. Schiroky, Hockessin; Michael A. Rocazella; Robert C. Kantner, both of Newark, all of Del.

[73] Assignee: Lanxide Technology Company, LP, Newark, Del.

[21] Appl. No.: 841,902

[22] Filed: Feb. 25, 1992

Related U.S. Application Data

[63] Continuation of Ser. No. 550,777, Jul. 10, 1990, abandoned, which is a continuation-in-part of Ser. No. 520,912, May 9, 1990, abandoned.

[51] Int. Cl.[5] .............................................. B22D 19/02
[52] U.S. Cl. ..................................... 164/98; 164/109; 164/129
[58] Field of Search .................. 164/97, 98, 100, 101, 164/102, 103, 104, 105, 106, 108, 109, 129

[56] References Cited

U.S. PATENT DOCUMENTS

| | | | |
|---|---|---|---|
| 2,102,394 | 12/1937 | Trembour | 164/109 |
| 2,133,293 | 10/1938 | Gordon | 164/78 |
| 2,995,816 | 8/1961 | Ma | 164/108 |
| 3,020,222 | 2/1962 | Zambrow | 164/109 |
| 3,031,340 | 4/1962 | Girardot | 117/118 |
| 3,047,409 | 7/1962 | Slayter | 164/109 |
| 3,149,409 | 9/1964 | Maruhn | 29/156.5 |
| 3,364,976 | 1/1968 | Reding et al. | 164/63 |
| 3,396,777 | 8/1968 | Reding, Jr. | 164/97 |
| 3,547,180 | 12/1970 | Cochran et al. | 164/61 |
| 3,608,170 | 9/1971 | Larson et al. | 29/149.5 |
| 3,718,441 | 2/1973 | Landingham | 29/182.1 |
| 3,864,154 | 2/1975 | Gazza et al. | 29/123 B |

(List continued on next page.)

FOREIGN PATENT DOCUMENTS

| | | |
|---|---|---|
| 0071449 | 2/1983 | European Pat. Off. . |
| 0094353 | 11/1983 | European Pat. Off. . |
| 0115742 | 8/1984 | European Pat. Off. . |
| 0339894 | 11/1989 | European Pat. Off. . |
| 0340957 | 11/1989 | European Pat. Off. . |
| 0364963 | 4/1990 | European Pat. Off. . |
| 2819076 | 10/1979 | Fed. Rep. of Germany . |
| 485710 | 11/1917 | France ................................ 164/63 |
| 0144441 | 8/1983 | Japan . |
| 609569 | 1/1985 | Japan ................................ 164/97 |
| 1397169 | 5/1988 | U.S.S.R. ........................... 164/108 |
| 2156718 | 10/1985 | United Kingdom . |

OTHER PUBLICATIONS

International Search Report for International Patent Application Ser. No. PCT/US91/03234 (see attached Search Report).

(List continued on next page.)

Primary Examiner—Mark Rosenbaum
Assistant Examiner—Rex E. Pelto
Attorney, Agent, or Firm—Mark G. Mortenson; Jeffrey R. Ramberg

[57] ABSTRACT

The present invention relates to a novel process for forming a plurality of thin metal matrix composite bodies. Particularly, an infiltration enhancer and/or an infiltrating atmosphere are in communication with a filler material or preform, at least at some point during the process, which permits molten matrix metal to spontaneously infiltrate the plurality of filler materials or preforms. Such spontaneous infiltration occurs without the application of any pressure or vacuum and occurs in a single step. In an embodiment of the present invention, the filler material may be sprayed upon a thin sheet of matrix metal. Alternatively, the filler material may be shaped via tape casting, slip casting, etc. to provide a thin preform. In another embodiment of the present invention, a body of matrix metal may be coated with a filler material such that upon spontaneous infiltration a metal matrix composite body is produced which inversely replicates the configuration of the original body of matrix metal.

22 Claims, 21 Drawing Sheets

U.S. PATENT DOCUMENTS

| | | | |
|---|---|---|---|
| 3,868,267 | 2/1975 | Gazza et al. | 117/22 |
| 3,915,699 | 10/1975 | Umehara et al. | 75/208 R |
| 3,945,555 | 3/1976 | Schmidt | 164/108 |
| 3,969,553 | 7/1976 | Kondo et al. | 427/299 |
| 3,970,136 | 7/1976 | Cannell | 164/108 |
| 4,082,864 | 4/1978 | Kendall et al. | 427/248 |
| 4,232,091 | 11/1980 | Grimshaw et al. | 428/472 |
| 4,376,803 | 3/1983 | Katzman | 428/408 |
| 4,376,804 | 3/1983 | Katzman | 428/408 |
| 4,450,207 | 5/1984 | Donomoto et al. | 428/614 |
| 4,473,103 | 9/1984 | Kenney et al. | 164/97 |
| 4,559,246 | 12/1985 | Jones | 427/299 |
| 4,570,316 | 2/1986 | Sakamaki et al. | 29/156.8 R |
| 4,605,599 | 8/1986 | Penrice et al. | 428/665 |
| 4,630,665 | 12/1986 | Nov  et al. | 164/97 |
| 4,657,065 | 4/1987 | Wada et al. | 164/461 |
| 4,662,429 | 5/1987 | Wada et al. | 164/461 |
| 4,673,435 | 6/1987 | Yamaguchi et al. | 75/235 |
| 4,713,111 | 12/1987 | Cameron et al. | 75/68 R |
| 4,753,690 | 6/1988 | Wada et al. | 148/11.5 A |
| 4,753,850 | 6/1988 | Ibe | 428/614 |
| 4,777,097 | 10/1988 | Kubo et al. | 428/614 |
| 4,802,524 | 2/1989 | Donomoto | 164/97 |
| 4,824,008 | 4/1989 | Luszcz | 501/127 |
| 4,828,008 | 5/1989 | White et al. | 164/66.1 |
| 4,871,008 | 10/1989 | Dwivedi et al. | 164/6 |
| 4,932,099 | 6/1990 | Corwin | 164/97 |
| 4,961,461 | 10/1990 | Klier | 164/97 |
| 5,004,034 | 4/1991 | Park | 164/97 |

OTHER PUBLICATIONS

F. Delannay, L. Froyen, and A. Deruyttere, "Review: The Wetting of Solids by Molten Metals and its Relation to the Preparation of Metal-Matrix Composites", Journal of Materials Science, vol. 22, No. 1, pp. 1–16, Jan. 1987.

G. R. Edwards and D. L. Olson, "The Infiltration Kinetics of Aluminum in Silicon Carbide Compacts", Annual Report from Center for Welding Research, Colorado School of Mines, under ONR Contract No. M000014-85-K-0451, DTIC Report AD-A184, 682, Jul. 1987.

A. Mortensen, M. N. Gungor, J. A. Cornie, and M. C. Flemings "Alloy Microstructures in Cast Metal Matrix Composites", Journal of Metals, vol. 38, No. 3, pp. 30–35, Mar. 1986.

A. Mortensen, J. A. Cornie, and M. C. Flemings, "Solidification Processing of Metal-Matrix Composites", Journal of Metals, vol. 40, No. 2, pp. 12–19, Feb. 1988.

B. D. Sparks and F. W. Meadus, "The Development of an Infiltrated Lead/Iron Composite Material for use as a Non-toxic Bird Shot", Composites, pp. 37–39, Jan. 1978.

METHODS FOR MAKING THIN METAL MATRIX COMPOSITE BODIES AND ARTICLES PRODUCED THEREBY

CROSS-REFERENCE TO RELATED APPLICATION

This is a continuation of copending application Ser. No. 07/550,777 filed on Jul. 10, 1990, now abandoned, which application is a continuation-in-part application of U.S. patent application Ser. No. 07/520,912, filed on May 9, 1990, in the names of Marc S. Newkirk et al. and entitled "Methods For Making Thin Metal Matrix Composite bodies and Articles Produced Thereby". The entire subject matter of the aforementioned U.S. Patent Application is hereby expressly incorporated by reference.

FIELD OF INVENTION

The present invention relates to a novel process for forming thin metal matrix composite bodies. Particularly, thin preform(s) of a filler material or thin coating(s) of a filler material onto a shaped mandrel or mold are first formed, by various techniques. An infiltration enhancer and/or infiltration enhancer precursor and/or infiltrating atmosphere are made to be in communication with the thin preform(s) or coating(s), at least at some point during the process, which permits molten matrix metal to spontaneously infiltrate the thin preform(s) or coating(s), thereby forming a thin metal matrix composite body. Such spontaneous infiltration occurs without the requirement for the application of any pressure or vacuum.

BACKGROUND OF THE INVENTION

Composite products comprising a metal matrix and a strengthening or reinforcing phase such as ceramic particulates, whiskers, fibers or the like, show great promise for a variety of applications because they combine some of the stiffness and wear resistance of the reinforcing phase with the ductility and toughness of the matrix metal. Generally, a metal matrix composite will show an improvement in such properties as strength, stiffness, contact wear resistance, coefficient of thermal expansion (C.T.E.), density, thermal conductivity and elevated temperature strength retention relative to the matrix metal in monolithic form, but the degree to which any given property may be improved depends largely on the specific constituents, their volume or weight fraction, and how they are processed in forming the composite. In some instances, the composite also may be lighter in weight than the matrix metal per se. Aluminum matrix composites reinforced with ceramics such as silicon carbide in particulate, platelet, or whisker form, for example, are of interest because of their higher specific stiffness (e.g., elastic modulus over density), wear resistance, thermal conductivity, low coefficient of thermal expansion (C.T.E.) and high temperature strength and/or specific strength (e.g., strength over density) relative to aluminum.

Various metallurgical processes have been described for the fabrication of aluminum matrix composites, including methods based on powder metallurgy techniques and liquid-metal infiltration techniques which make use of pressure casting, vacuum casting, stirring, and wetting agents. With powder metallurgy techniques, the metal in the form of a powder and the reinforcing material in the form of a powder, whiskers, chopped fibers, etc., are admixed and then either cold-pressed and sintered, or hot-pressed. The maximum ceramic volume fraction in silicon carbide reinforced aluminum matrix composites produced by this method has been reported to be about 25 volume percent in the case of whiskers, and about 40 volume percent in the case of particulates.

The production of metal matrix composites by powder metallurgy techniques utilizing conventional processes imposes certain limitations with respect to the characteristics of the products attainable. The volume fraction of the ceramic phase in the composite is limited typically, in the case of particulates, to about 40 percent. Also, the pressing operation poses a limit on the practical size attainable. Only relatively simple product shapes are possible without subsequent processing (e.g., forming or machining) or without resorting to complex presses. Also, nonuniform shrinkage during sintering can occur, as well as nonuniformity of microstructure due to segregation in the compacts and grain growth.

U.S. Pat. No. 3,970,136, granted Jul. 20, 1976, to J. C. Cannell et al., describes a process for forming a metal matrix composite incorporating a fibrous reinforcement, e.g. silicon carbide or alumina whiskers, having a predetermined pattern of fiber orientation. The composite is made by placing parallel mats or felts of coplanar fibers in a mold with a reservoir of molten matrix metal, e.g., aluminum, between at least some of the mats, and applying pressure to force molten metal to penetrate the mats and surround the oriented fibers. Molten metal may be poured onto the stack of mats while being forced under pressure to flow between the mats. Loadings of up to about 50% by volume of reinforcing fibers in the composite have been reported.

The above-described infiltration process, in view of its dependence on outside pressure to force the molten matrix metal through the stack of fibrous mats, is subject to the vagaries of pressure-induced flow processes, i.e., possible non-uniformity of matrix formation, porosity, etc. Non-uniformity of properties is possible even though molten metal may be introduced at a multiplicity of sites within the fibrous array. Consequently, complicated mat/reservoir arrays and flow pathways need to be provided to achieve adequate and uniform penetration of the stack of fiber mats. Also, the aforesaid pressure-infiltration method allows for only a relatively low reinforcement to matrix volume fraction to be achieved because of the difficulty inherent in infiltrating a large mat volume. Still further, molds are required to contain the molten metal under pressure, which adds to the expense of the process. Finally, the aforesaid process, limited to infiltrating aligned particles or fibers, is not directed to formation of aluminum metal matrix composites reinforced with materials in the form of randomly oriented particles, whiskers or fibers.

In the fabrication of aluminum matrix-alumina filled composites, aluminum does not readily wet alumina, thereby making it difficult to form a coherent product. Various solutions to this problem have been suggested. One such approach is to coat the alumina with a metal (e.g., nickel or tungsten), which is then hot-pressed along with the aluminum. In another technique, the aluminum is alloyed with lithium, and the alumina may be coated with silica. However, these composites exhibit variations in properties, or the coatings can degrade the filler, or the matrix contains lithium which can affect the matrix properties.

U.S. Pat. No. 4,232,091 to R. W. Grimshaw et al., overcomes certain difficulties in the art which are encountered in the production of aluminum matrix-alumina composites. This patent describes applying pressures of 75-375 kg/cm² to force molten aluminum (or molten aluminum alloy) into a fibrous or whisker mat of alumina which has been preheated to 700° to 1050° C. The maximum volume ratio of alumina to metal in the resulting solid casting was 0.25/1. Because of its dependency on outside force to accomplish infiltration, this process is subject to many of the same deficiencies as that of Cannell et al.

European Patent Application Publication No. 115,742 describes making aluminum-alumina composites, especially useful as electrolytic cell components, by filling the voids of a preformed alumina matrix with molten aluminum. The application emphasizes the non-wettability of alumina by aluminum, and therefore various techniques are employed to wet the alumina throughout the preform. For example, the alumina is coated with a wetting agent of a diboride of titanium, zirconium, hafnium, or niobium, or with a metal, i.e., lithium, magnesium, calcium, titanium, chromium, iron, cobalt, nickel, zirconium, or hafnium. Inert atmospheres, such as argon, are employed to facilitate wetting. This reference also shows applying pressure to cause molten aluminum to penetrate an uncoated matrix. In this aspect, infiltration is accomplished by evacuating the pores and then applying pressure to the molten aluminum in an inert atmosphere, e.g., argon. Alternatively, the preform can be infiltrated by vapor-phase aluminum deposition to wet the surface prior to filling the voids by infiltration with molten aluminum. To assure retention of the aluminum in the pores of the preform, heat treatment, e.g., at 1400° to 1800° C., in either a vacuum or in argon is required. Otherwise, either exposure of the pressure infiltrated material to gas or removal of the infiltration pressure will cause loss of aluminum from the body.

The use of wetting agents to effect infiltration of an alumina component in an electrolytic cell with molten metal is also shown in European Patent Application Publication No. 0094353. This publication describes production of aluminum by electrowinning with a cell having a cathodic current feeder as a cell liner or substrate. In order to protect this substrate from molten cryolite, a thin coating of a mixture of a wetting agent and solubility suppressor is applied to the alumina substrate prior to start-up of the cell or while immersed in the molten aluminum produced by the electrolytic process. Wetting agents disclosed are titanium, zirconium, hafnium, silicon, magnesium, vanadium, chromium, niobium, or calcium, and titanium is stated as the preferred agent. Compounds of boron, carbon and nitrogen are described as being useful in suppressing the solubility of the wetting agents in molten aluminum. The reference, however, does not suggest the production of metal matrix composites, nor does it suggest the formation of such a composite in, for example, a nitrogen atmosphere.

In addition to application of pressure and wetting agents, it has been disclosed that an applied vacuum will aid the penetration of molten aluminum into a porous ceramic compact. For example, U.S. Pat. No. 3,718,441, granted Feb. 27, 1973, to R. L. Landingham, reports infiltration of a ceramic compact (e.g., boron carbide, alumina and beryllia) with either molten aluminum, beryllium, magnesium, titanium, vanadium, nickel or chromium under a vacuum of less than $10^{-6}$ torr. A vacuum of $10^{-2}$ to $10^{-6}$ torr resulted in poor wetting of the ceramic by the molten metal to the extent that the metal did not flow freely into the ceramic void spaces. However, wetting was said to have improved when the vacuum was reduced to less than $10^{-6}$ torr.

U.S. Pat. No. 3,864,154, granted Feb. 4, 1975, to G. E. Gazza et al., also shows the use of vacuum to achieve infiltration. This patent describes loading a cold-pressed compact of $AlB_{12}$ powder onto a bed of cold-pressed aluminum powder. Additional aluminum was then positioned on top of the $AlB_{12}$ powder compact. The crucible, loaded with the $AlB_{12}$ compact "sandwiched" between the layers of aluminum powder, was placed in a vacuum furnace. The furnace was evacuated to approximately $10^{-5}$ torr to permit outgassing. The temperature was subsequently raised to 1100° C. and maintained for a period of 3 hours. At these conditions, the molten aluminum penetrated the porous $AlB_{12}$ compact.

U.S. Pat. No. 3,364,976, granted Jan. 23, 1968 to John N. Reding et al., discloses the concept of creating a self-generated vacuum in a body to enhance penetration of a molten metal into the body. Specifically, it is disclosed that a body, e.g., a graphite mold, a steel mold, or a porous refractory material, is entirely submerged in a molten metal. In the case of a mold, the mold cavity, which is filled with a gas reactive with the metal, communicates with the externally located molten metal through at least one orifice in the mold. When the mold is immersed into the melt, filling of the cavity occurs as the self-generated vacuum is produced from the reaction between the gas in the cavity and the molten metal. Particularly, the vacuum is a result of the formation of a solid oxidized form of the metal. Thus, Reding et al. disclose that it is essential to induce a reaction between gas in the cavity and the molten metal. However, utilizing a mold to create a vacuum may be undesirable because of the inherent limitations associated with use of a mold. Molds must first be machined into a particular shape; then finished, machined to produce an acceptable casting surface on the mold; then assembled prior to their use; then disassembled after their use to remove the cast piece therefrom; and thereafter reclaim the mold, which most likely would include refinishing surfaces of the mold or discarding the mold if it is no longer acceptable for use. Machining of a mold into a complex shape can be very costly and time-consuming. Moreover, removal of a formed piece from a complex-shaped mold can also be difficult (i.e., cast pieces having a complex shape could be broken when removed from the mold). Still further, while there is a suggestion that a porous refractory material can be immersed directly in a molten metal without the need for a mold, the refractory material would have to be an integral piece because there is no provision for infiltrating a loose or separated porous material absent the use of a container mold (i.e., it is generally believed that the particulate material would typically disassociate or float apart when placed in a molten metal). Still further, if it was desired to infiltrate a particulate material or loosely formed preform, precautions should be taken so that the infiltrating metal does not displace at least portions of the particulate or preform resulting in a non-homogeneous microstructure.

Accordingly, there has been a long felt need for a simple and reliable process to produce shaped metal matrix composites which does not rely upon the use of applied pressure or vacuum (whether externally applied or internally created), or damaging wetting agents to create a metal matrix embedding another material such as a ceramic material. Moreover, there has been a long felt need to minimize the amount of final machining operations needed to produce a metal matrix composite body. The present invention satisfies these needs by providing a spontaneous infiltration mechanism for infiltrating a material (e.g., a ceramic material), which can be formed into a preform, with molten matrix metal (e.g., aluminum) in the presence of an infiltrating atmosphere (e.g., nitrogen) under normal atmospheric pressures so long as an infiltration enhancer precursor and/or infiltration enhancer is present at least at some point during the process.

DESCRIPTION OF COMMONLY OWNED U.S. PATENT AND PATENT APPLICATIONS

The subject matter of this application is related to that of a co-owned Patent and several other copending and co-owned patent applications and issued Patents. Particularly, the Patent and other copending patent applications and issued Patents describe novel methods for making metal matrix composite materials (hereinafter sometimes referred to as "Commonly Owned Metal Matrix Patent and Patent Applications").

A novel method of making a metal matrix composite material is disclosed in Commonly Owned U.S. Pat. No. 4,828,008, which issued May 9, 1989, from U.S. patent application Ser. No. 049,171, filed May 13, 1987, in the names of White et al., and entitled "Metal Matrix Composites" which published in the EPO on Nov. 17, 1988, as Publication No. 0291441. According to the method of this White et al. invention, a metal matrix composite is produced by infiltrating a permeable mass of filler material (e.g., a ceramic or a ceramic-coated material) with molten aluminum containing at least about 1 percent by weight magnesium, and preferably at least about 3 percent by weight magnesium. Infiltration occurs spontaneously without the application of external pressure or vacuum. A supply of the molten metal alloy is contacted with the mass of filler material at a temperature of at least about 675° C. in the presence of a gas comprising from about 10 to 100 percent, and preferably at least about 50 percent, nitrogen by volume, and a remainder of the gas, if any, being a nonoxidizing gas, e.g., argon. Under these conditions, the molten aluminum alloy infiltrates the ceramic mass under normal atmospheric pressures to form an aluminum (or aluminum alloy) matrix composite. When the desired amount of filter material has been infiltrated with the molten aluminum alloy, the temperature is lowered to solidify the alloy, thereby forming a solid metal matrix structure that embeds the reinforcing filler material. Usually, and preferably, the supply of molten alloy delivered will be sufficient to permit the infiltration to proceed essentially to the boundaries of the mass of filler material. The amount of filler material in the aluminum matrix composites produced according to the White et al. invention may be exceedingly high. In this respect, filler to alloy volumetric ratios of greater than 1:1 may be achieved.

Under the process conditions in the aforesaid White et al. invention, aluminum nitride can form as a discontinuous phase dispersed throughout the aluminum matrix. The amount of nitride in the aluminum matrix may vary depending on such factors as temperature, alloy composition, gas composition and filler material. Thus, by controlling one or more such factors in the system, it is possible to tailor certain properties of the composite. For some end use applications, however, it may be desirable that the composite contain little or substantially no aluminum nitride.

It has been observed that higher temperatures favor infiltration but render the process more conductive to nitride formation. The White et al. invention allows the choice of a balance between infiltration kinetics and nitride formation.

An example of suitable barrier means for use with metal matrix composite formation is described in Commonly Owned U.S. patent application Ser. No. 141,642, filed Jan. 7, 1988, in the names of Michael K. Aghajanian et al., and entitled "Method of Making Metal Matrix Composite with the Use of a Barrier", now allowed in the United States and which published in the EPO on Jul. 12, 1989, as Publication No. 0323945. According to the method of this Aghajanian et al. invention, a barrier means (e.g., particulate titanium diboride or a graphite material such as a flexible graphite foil product sold by Union Carbide under the trade name GRAFOIL ®) is disposed on a defined surface boundary of a filler material and matrix alloy infiltrates up to the boundary defined by the barrier means. The barrier means is used to inhibit, prevent, or terminate infiltration of the molten alloy, thereby providing net, or near net, shapes in the resultant metal matrix composite. Accordingly, the formed metal matrix composite bodies have an outer shape which substantially corresponds to the inner shape of the barrier means.

The method of U.S. Pat. No. 4,828,008 was improved upon by Commonly Owned and Copending U.S. patent application Ser. No. 168,284, filed Mar. 15, 1988, in the names of Michael K. Aghajanian and Marc S. Newkirk and entitled "Metal Matrix Composites and Techniques for Making the Same", and which published in the EPO on Sep. 20, 1989, as Publication No. 0333629. In accordance with the methods disclosed in this U.S. patent application, a matrix metal alloy is present as a first source of metal and as a reservoir of matrix metal alloy which communicates with the first source of molten metal due to, for example, gravity flow. Particularly, under the conditions described in this patent application, the first source of molten matrix alloy begins to infiltrate the mass of filler material under normal atmospheric pressures and thus begins the formation of a metal matrix composite. The first source of molten matrix metal alloy is consumed during its infiltration into the mass of filler material and, if desired, can be replenished, preferably by a continuous means, from the reservoir of molten matrix metal as the spontaneous infiltration continues. When a desired amount of permeable filler has been spontaneously infiltrated by the molten matrix alloy, the temperature is lowered to solidify the alloy, thereby forming a solid metal matrix structure that embeds the reinforcing filler material. It should be understood that the use of a reservoir of metal is simply one embodiment of the invention described in this patent application and it is not necessary to combine the reservoir embodiment with each of the alternate embodiments of the invention disclosed therein, some of which could also be beneficial to use in combination with the present invention.

The reservoir of metal can be present in an amount such that it provides for a sufficient amount of metal to infiltrate the permeable mass of filler material to a predetermined extent. Alternatively, an optional barrier means can contact the permeable mass of filler on at least one side thereof to define a surface boundary.

Moreover, while the supply of molten matrix alloy delivered should be at least sufficient to permit spontaneous infiltration to proceed essentially to the boundaries (e.g., barriers) of the permeable mass of filler material, the amount of alloy present in the reservoir could exceed such sufficient amount so that not only will there be a sufficient amount of alloy for complete infiltration, but excess molten metal alloy could remain and be attached to the metal matrix composite body. Thus, when excess molten alloy is present, the resulting body will be a complex composite body (e.g., a macrocomposite), wherein an infiltrated ceramic body having a metal matrix therein will be directly bonded to excess metal remaining in the reservoir.

Further improvements in metal matrix technology can be found in commonly owned and copending U.S. patent application Ser. No. 07/416,327, filed Oct. 6, 1989, which is a continuation-in-part application of U.S. patent application Ser. No. 07/349,590, filed May 9, 1989, which in turn is a continuation-in-part application of U.S. patent application Ser. No. 07/269,311, filed Nov. 10, 1988, all of which were filed in the names of Michael K. Aghajanian et al. and all of which are entitled "A Method of Forming Metal Matrix Composite Bodies By A Spontaneous Infiltration Process, and Products Produced Therefrom." According to these Aghajanian et al. applications, spontaneous infiltration of a matrix metal into a permeable mass of filler material or preform is achieved by used of an infiltration enhancer and/or an infiltration enhancer precursor and/or an infiltrating atmosphere which are in communication with the filler material or preform, at least at some point during the process, which permits molten matrix metal to spontaneously infiltrate the filler material or preform. Aghajanian et al. disclose a number of matrix metal/infiltration enhancer precursor/infiltrating atmosphere systems which exhibit spontaneous infiltration. Specifically, Aghajanian et al. disclose that spontaneous infiltration behavior has been observed in the aluminum/magnesium/nitrogen system; the aluminum/strontium/nitrogen system; the aluminum/zinc/oxygen system; and the aluminum/calcium/nitrogen system. However, it is clear from the disclosure set forth in the Aghajanian et al. applications that the spontaneous infiltration behavior should occur in other matrix metal/infiltration enhancer precursor/infiltrating atmosphere systems.

Each of the above-discussed Commonly Owned Metal Matrix Patent and Patent Applications describes methods for the production of metal matrix composite bodies and novel metal matrix composite bodies which are produced therefrom. The entire disclosures of all of the foregoing Commonly Owned Metal Matrix Patent and Patent Applications are expressly incorporated herein by reference.

SUMMARY OF THE INVENTION

A thin metal matrix composite body can be produced by spontaneously infiltrating a permeable mass of filler material which has been shaped into a thin preform (or a number of thin preforms) with molten matrix metal. Specifically, an infiltration enhancer and/or an infiltration enhancer precursor and/or an infiltrating atmosphere are in communication with the thin preform (or performs) at least at some point during the process which permits molten matrix metal to spontaneously infiltrate the thin perform (or assemblage of thin preforms). Alternatively, a thin coating or film of filler material may be provided, for example, onto at least a portion of at least one surface of a thin sheet of matrix metal or onto at least a portion of a mandrel or a mold material and thereafter spontaneously infiltrated by molten matrix metal. The thin sheet of matrix metal, mandrel or mold may be shaped into any desired configuration.

In a first preferred embodiment, a permeable mass of filler material may be shaped into a thin sheet by tape casting. Particularly, the filler material (e.g., silicon carbide particulate) may be incorporated into a mixture of a suitable binder(s), plasticizer(s), suspension agent(s) etc., to form a slurry of filler material. The slurry of filler material may also include an infiltration enhancer and/or an infiltration enhancer precursor (e.g., magnesium metal powder). The slurry of filler material may be tape cast into a thin (e.g., a few thousandths of an inch to a few hundredths of an inch thick) and flexible sheet (or sheets) which can be manipulated or subsequently shaped to result in a preform having a desired configuration. For example, a tape cast sheet of filler material may be shaped into a preform by press molding the tape cast sheet into a mold or onto a mandrel possessing the desired configuration of the metal matrix composite body which is to be produced. Further, a single tape cast sheet may be divided (e.g., by cutting with scissors) into a plurality of preforms or a plurality of individually tape cast sheets of similar or different composition can be shaped into similar or different configurations that may be spontaneously infiltrated with matrix metal individually or as an assemblage. Moreover, due to the ability to import flexibility to a tape cast sheet, any suitable conventional shaping technique may be utilized in accordance with the present invention to shape a tape cast sheet into a thin preform (or assemblage of preforms) which resemble the shape of the desired metal matrix composite body to be produced.

In a second preferred embodiment, a mass of filler material may be shaped into a thin preform by conventional shaping techniques including slip casting, dry pressing, sedimentation casting, isostatic pressing, extrusion spray coating, injection molding, etc. For example, slip casting is particularly useful method for producing a thin preform comprising a hollow cavity or shell. A slurry or slip comprising a filler material (e.g., silicon carbide particulates) may be prepared by utilizing suitable suspension agents, deflocculants, etc. The slip, which may include an infiltration enhancer and/or an infiltration enhancer precursor, is poured into a porous mold (e.g., plaster of paris) having the configuration desired for the preform. The properties of the slip (e.g., solids content, etc.), length of time which the slip is permitted to remain in the mold, etc., determine the thickness of the resultant preform.

Moreover, it should be understood that when preforms are produced by any of the conventional techniques discussed above, it may necessary to cure or dry the preform so as to remove any binders, solvents, etc., from the preform prior to spontaneously infiltrating the preform so that spontaneous infiltration is not adversely affected. Further, acceptable thin preform(s) may be fabricated by placing a filler material onto a material which functions both as a mold and as a barrier material. For example, a material such as graphite which has been shaped into a particular shape can withstand the spontaneous infiltration of molten aluminum matrix metal and also functions as a barrier to any continued infiltration of matrix metal. Accordingly, it may not be necessary to remove a preform from a graphite mold prior to spontaneous infiltration of the preform.

Moreover, in a third preferred embodiment of the invention, a preform per se may not be necessary. Specifically, the configuration of filler material and ultimately, the metal matrix composite may be determined by the matrix metal. For example, a thin sheet (or assemblage of sheets), of matrix metal may be coated with at least one film or layer of a filler material. Additionally, a plurality of layers of filler material may also be applied, each of which may possess the same or different characteristics from any previously applied layer. For example, the layers may be comprised of chemically and/or physical distinct materials. Further, any suitable technique may be utilized to apply the filler material onto a sheet or body of matrix metal. Such suitable technique should be capable of being controlled in a manner to provide a coating having (e.g., surface quality, thickness, density etc.). Particularly, a layer of filler material may be applied onto a body of matrix metal by dipping, doctor blading, spraying, etc., at least a portion of at least one surface of a sheet or body of matrix metal. Moreover, a body of matrix metal can be shaped into any particular shape including the shape of cone, plate, sphere, etc. When such shaped bodies have at least one surface thereof coated with or contacting a filler material and are subjected to a spontaneous infiltration environment, the result is a metal matrix composite which at least partially (or substantially completely) inversely replicates the shape of the original body of matrix metal (i.e., a cavity which is produced in the formed metal matrix composite body at least partially inversely replicates the shape of the body of matrix metal). Accordingly, metal matrix composite bodies having complex-shaped interior cavities and thin walls can be produced. Moreover, in some cases, it may be desirable to place a second material into the formed cavity to achieve a synergistic effect. For example, a monomer or polymer material could be placed into the formed cavity to achieve various desirable results. Still further, the shaped body of matrix metal can include a member of different features to result in complex-shaped metal matrix composite bodies. for example, the placement of a plurality of through-holes in a thin-walled cylinder of matrix metal and the subsequent surrounding of the shaped matrix metal by a filler material mixture will result in the matrix metal spontaneously infiltrating the filler material. Accordingly, if filler material is placed on or into contact with each side of the cylindrical walls and is placed within the through-holes of the cylinder, upon spontaneous infiltration, a substantially concentric dual-walled metal matrix composite body will result. Specifically, the cavity within the dual-walled metal matrix composite body corresponds substantially in shape to the original shape of the body of matrix metal.

In each of the preferred embodiments discussed above, a precursor to an infiltration enhancer may be supplied to at least one of the filler material and/or preforms, and/or a matrix metal and/or an infiltrating atmosphere. The supplied infiltration enhancer precursor may thereafter react with at least one of the preforms and/or the matrix metal and/or the infiltrating atmosphere to produce infiltration enhancer in at least a portion of, or on, the filler material and/or preform. Ultimately, at least during the spontaneous infiltration, infiltration enhancer should be in contact with at least a portion of the filler material and/or preform.

In another preferred embodiment of the invention, rather than supplying an infiltration enhancer precursor, an infiltration enhancer may be supplied directly to at least one of the filler material and/or preform, and/or matrix metal, and/or infiltrating atmosphere. Ultimately, at least during the spontaneous infiltration, the infiltration enhancer should be in contact with at least a portion of the filler material and/or preform.

This application discusses various examples of matrix metals, which at some point during the formation of a metal matrix composite, are contacted with an infiltration enhancer precursor, in the presence of an infiltrating atmosphere. Thus, various references will be made to particular matrix metal/infiltration enhancer precursor/infiltrating atmosphere systems which exhibit spontaneous infiltration. However, it is conceivable that many other matrix metal/infiltration enhancer precursor/infiltrating atmosphere systems other than those discussed in this application may behave in a manner similar to the systems discuss above herein. Specifically, spontaneous infiltration behavior has been observed in the aluminum/magnesium/nitrogen system; the aluminum/strontium/nitrogen system; the aluminum/zinc/oxygen system; and the aluminum/calcium/nitrogen system. Accordingly, even though this application discusses only those systems referred to above herein (with particular emphasis being placed upon the aluminum/magnesium/nitrogen system), it should be understood that other matrix metal/infiltration enhancer precursor/infiltrating atmosphere systems may behave in a similar manner.

In a preferred embodiment for achieving spontaneous infiltration into a preform, molten matrix metal is contacted with the preform. The preform may have admixed therewith, and/or at some point during the process, be exposed to, an infiltration enhancer precursor. Moreover, in a preferred embodiment, the molten matrix metal and/or preform communicate with an infiltrating atmosphere for at least a portion of the process. In another preferred embodiment, the matrix metal and/or preform communicate with an infiltrating atmosphere for substantially all of the process. The preform will be spontaneously infiltrated by molten matrix metal, and the extent or rate of spontaneous infiltration and formation of metal matrix composite will vary with a given set of processing conditions including, for example, the concentration of infiltration enhancer precursor provided to the system (e.g., in the molten matrix alloy and/or in the preform and/or in the infiltrating atmosphere), the size and/or composition of the filler material in the preform, the available porosity for infiltration into the preform, the time permitted for infiltration to occur, and/or the temperature at which infiltration occurs. Spontaneous infiltration typically occurs to an extent sufficient to embed substantially completely the preform.

Moreover, by varying the composition of the matrix metal and/or the processing conditions, the physical and mechanical properties of the formed metal matrix composite bodies may be engineered to any particular application or need. Further, by subjecting the formed thin metal matrix composite body to a post treatment process (e.g., directional solidification, heat treatment, etc.) the mechanical and/or physical properties may be further engineered to meet any particular application or need. Still further, by controlling the processing conditions during the formation of a thin metal matrix composite body, the nitrogen content of the formed metal matrix composite may be tailored to meet a wide range of industrial applications.

Moreover, by controlling the composition and/or size (e.g., particle diameter) and/or geometry of the filler material comprising the preform, the physical and/or mechanical properties of the formed metal matrix composite can be controlled or engineered to meet any number of industrial needs. For example, it has been discovered that wear resistance of the metal matrix composite can be increased by increasing the size of the filler material (e.g., increasing the average diameter of the filler material particles), given that the wear resistance of filler material is higher than that of the matrix metal. However, strength and/or toughness may tend to increase with decreasing filler size. Further, the thermal expansion coefficient of the metal matrix composite may decrease with increasing filler loading, given that the coefficient of thermal expansion of the filler is lower than the coefficient of thermal expansion of the matrix metal. Still further, the mechanical and/or physical properties (e.g., density, elastic and/or specific modulus, strength and/or specific strength, etc.) of a formed metal matrix composite body may be tailored depending on the loading of the filler material in the preform. For example, by providing a preform comprising a mixture of filler particles of varying sizes and/or shapes, wherein the density of the filler is greater than that of the matrix metal, a higher filler loading, due to enhanced packing of the filler material, may be achieved, thereby resulting in a metal matrix composite body with an increased density. By utilizing the teachings of the present invention, the volume percent of filler material in the preform which can be infiltrated can vary over a wide range. The lower volume percent of filler that can be infiltrated is limited primarily by the ability to form a porous preform, (e.g., about 10 volume percent); whereas the higher volume percent of filler or preform that can be infiltrated is limited primarily by the ability to form a dense preform with at least some interconnected porosity (e.g., about 95 volume percent). Accordingly, by practicing any of the above teachings, alone or in combination, a metal matrix composite can be engineered to contain a desired combination of properties.

DEFINITIONS

"Aluminum", as used herein, means and includes essentially pure metal (e.g., a relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Balance Non-Oxidizing Gas", as used herein, means that any gas present in addition to the primary gas comprising the infiltrating atmosphere, is either an inert gas or a reducing gas which is substantially non-reactive with the matrix metal under the process conditions. Any oxidizing gas which may be present as an impurity in the gas(es) used should be insufficient to oxidize the matrix metal to any substantial extend under the process conditions.

"Barrier" or "barrier means", as used herein, means any suitable means which interferes, inhibits, prevents or terminates the migration, movement, or the like, of molten matrix metal beyond a surface boundary of a permeable mass of filler material or preform, where such surface boundary is defined by said barrier means. Suitable barrier means may be any such material, compound, element, composition, or the like, which, under the process conditions, maintains some integrity and is not substantially volatile (i.e., the barrier material does not volatilize to such an extent that it is rendered non-functional as a barrier).

Further, suitable "barrier means" includes materials which are substantially non-wettable by the migrating molten matrix metal under the process conditions employed. A barrier of this type appears to exhibit substantially little or no affinity for the molten matrix metal, and movement beyond the defined surface boundary of the mass of filler material or preform is prevented or inhibited by the barrier means. The barrier reduces any final machining or grinding that may be required and defines at least a portion of the surface of the resulting metal matrix composite product. The barrier may in certain cases be permeable or porous, or rendered permeable by, for example, drilling holes or puncturing the barrier, to permit gas to contact the molten matrix metal, etc.

"Carcass" or "Carcass of Matrix Metal", as used herein, refers to any of the original body of matrix metal remaining which has not been consumed during formation of the metal matrix composite body, and typically, if allowed to cool, remains in at least partial contact with the metal matrix composite body which has been formed. It should be understood that the carcass may also include a second or foreign metal therein.

"Filler", as used herein, is intended to include either single constituents or mixtures of constituents which are substantially non-reactive with and/or of limited solubility in the matrix metal and may be single or multiphase. Fillers may be provided in a wide variety of forms and sizes, such as powders, flakes, platelets, microspheres, whiskers, bubbles, etc., and may be either dense or porous. "Filler" may also include ceramic fillers, such as alumina or silicon carbide as fibers, chopped fibers, particulates, whiskers, bubbles, spheres, fiber mats, or the like, mixtures thereof, and ceramic-coated fillers such as carbon fibers coated with alumina or silicon carbide to protect the carbon from attack, for example, by a molten aluminum parent metal. Fillers may also include metals.

"Hot-Topping", as used herein, refers to the placement of a substance on one end (the "topping" end) of an at least partially formed metal matrix composite which reacts exothermally with at least one of the matrix metal and/or filler material and/or with another material supplied to the topping end. This exothermic reaction should provide sufficient heat to maintain the matrix metal at the topping end in a molten state while the balance of the matrix metal in the composite cools to solidification temperature.

"Infiltrating Atmosphere", as used herein, means that atmosphere which is present which interacts with the matrix metal and/or preform (or filler material) and/or infiltration enhancer precursor and/or infiltration enhancer and permits or enhances spontaneous infiltration of the matrix metal to occur.

"Infiltration Enhancer", as used herein, means a material which promotes or assists in the spontaneous infiltration of a matrix metal into a filler material or preform. An infiltration enhancer may be formed from, for example, a reaction of an infiltration enhancer precursor with an infiltrating atmosphere to form (1) a gaseous species and/or (2) a reaction product of the infiltration enhancer precursor and the infiltrating atmosphere and/or (3) a reaction product of the infiltration enhancer precursor and the filler material or preform. Moreover, the infiltration enhancer may be supplied directly to at least one of the preform, and/or matrix metal, and/or infiltrating atmosphere and function in a substantially similar manner to an infiltration enhancer which has formed as a reaction between an infiltration enhancer precursor and another species. Ultimately, at least during the spontaneous infiltration, the infiltration enhancer should be located in at least a portion of the filler material or preform to achieve spontaneous infiltration.

"Infiltration Enhancer Precursor" or "Precursor to the Infiltration Enhancer", as used herein, means a material which when used in combination with the matrix metal, preform and/or infiltrating atmosphere forms an infiltration enhancer which induces or assists the matrix metal to spontaneously infiltrate the filler material or preform. Without wishing to be bound by any particular theory or explanation, it appears as though it may be necessary for the precursor to the infiltration enhancer to be capable of being positioned, located or transportable to a location which permits the infiltration enhancer precursor to interact with the infiltrating atmosphere and/or the preform or filler material and/or matrix metal. For example, in some matrix metal/infiltration enhancer precursor/infiltrating atmosphere systems, it is desirable for the infiltration enhancer precursor to volatilize at, near, or in some cases, even somewhat above the temperature at which the matrix metal becomes molten. Such volatilization may lead to: (1) a reaction of the infiltration enhancer precursor with the infiltrating atmosphere to form a gaseous species which enhances wetting of the filler material or preform by the matrix metal; and/or (2) a reaction of the infiltration enhancer precursor with the infiltrating atmosphere to form a solid, liquid or gaseous infiltration enhancer in at least a portion of the filler material or perform which enhances wetting; and/or (3) a reaction of the infiltration enhancer precursor within the filler material or preform which forms a solid, liquid or gaseous infiltration enhancer in at least a portion of the filler material or preform which enhances wetting.

"Matrix metal" or "Matrix Metal Alloy", as used herein, means that metal which is utilized to form a metal matrix composite (e.g., before infiltration) and/or that metal which is intermingled with a filler material to form a metal matrix composite body (e.g., after infiltration). When a specified metal is mentioned as the matrix metal, it should be understood that such matrix metal includes that metal as an essentially pure metal, a commercially available metal having impurities and/or alloying constituents therein, an intermetallic compound or an alloy in which that metal is the major or predominant constituent.

"Matrix Metal/Infiltration Enhancer Precursor/Infiltrating Atmosphere System" or "Spontaneous System", as used herein, refers to that combination of materials which exhibit spontaneous infiltration into a preform or filler material. It should be understood that whenever a "/" appears between an exemplary matrix metal, infiltration enhancer precursor and infiltrating atmosphere that the "/" is used to designate a system or combination of materials which, when combined in a particular manner, exhibits spontaneous infiltration into a preform or filler material.

"Metal Matrix Composite" or "MMC", as used herein, means a material comprising a two- or three-dimensionally interconnected alloy or matrix metal which has embedded a preform or filler material. The matrix metal may include various alloying elements to provide specifically desired mechanical and physical properties in the resulting composite.

A Metal "Different" from the Matrix Metal means a metal which does not contain, as a primary constituent, the same metal as the matrix metal (e.g., if the primary constituent of the matrix metal is aluminum, the "different" metal could have a primary constituent of, for example, nickel).

"Nonreactive Vessel for Housing Matrix Metal" means any vessel which can house or contain a filler material (or preform) and/or molten matrix metal under the process conditions and not react with the matrix and/or the infiltrating atmosphere and/or infiltration enhancer precursor and/or a filler material or preform in a manner which would be significantly detrimental to the spontaneous infiltration mechanism. The nonreactive vessel may be disposable and removable after the spontaneous infiltration of the molten matrix metal has been completed.

"Preform" or "Permeable Preform", as used herein, means a porous mass of filler or filler material which is manufactured with at least one surface boundary which essentially defines a boundary for infiltrating matrix metal, such mass retaining sufficient shape integrity and green strength to provide dimensional fidelity prior to being infiltrated by the matrix metal. The mass should be sufficiently porous to accommodate spontaneous infiltration of the matrix metal thereinto. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage.

"Reservoir", as used herein, means a separate body of matrix metal positioned relative to a mass of filler or a preform so that, when the metal is molten, it may flow to replenish, or in some cases to initially provide and subsequently replenish, that portion, segment or source of matrix metal which is in contact with the filler or preform.

"Spontaneous Infiltration", as used herein, means the infiltration of matrix metal into the permeable mass of filler or preform occurs without requirement for the application of pressure or vacuum (whether externally applied or internally created).

"Thin Coating", "Thin Metal Matrix Composite", "Thin Preform", or "Thin Sheet", as used herein, refers to a dimensional characteristic of a particular material. A "thin" dimension may range in numerical values from a few mils (e.g., the diameter of a particle of filler material) to several inches or feet. In the case of a "thin" metal matrix composite plate or preform, "thin" refers to the thickness of the plate which is a relative relationship that is dependent upon the length and width of the plate, whereas for a cavity or hollow metal matrix composite or preform, "thin" refers to the thickness of the walls which define the cavity or hollow shell. Further, "thin" refers to the relative thickness of the walls of a metal matrix composite which inversely replicates the configuration of the original matrix metal. However, in every embodiment, a "thin" dimensional characteristic must possess sufficient structural integrity to satisfy a particular end-use application.

BRIEF DESCRIPTION OF THE FIGURES

The following Figures are provided to assist in understanding the invention, but are not intended to limit the scope of the invention. Similar reference numerals have been used wherever possible in each of the Figures to denote like components, wherein.

DETAILED DESCRIPTION OF THE INVENTION AND PREFERRED EMBODIMENTS

Figure 1A:
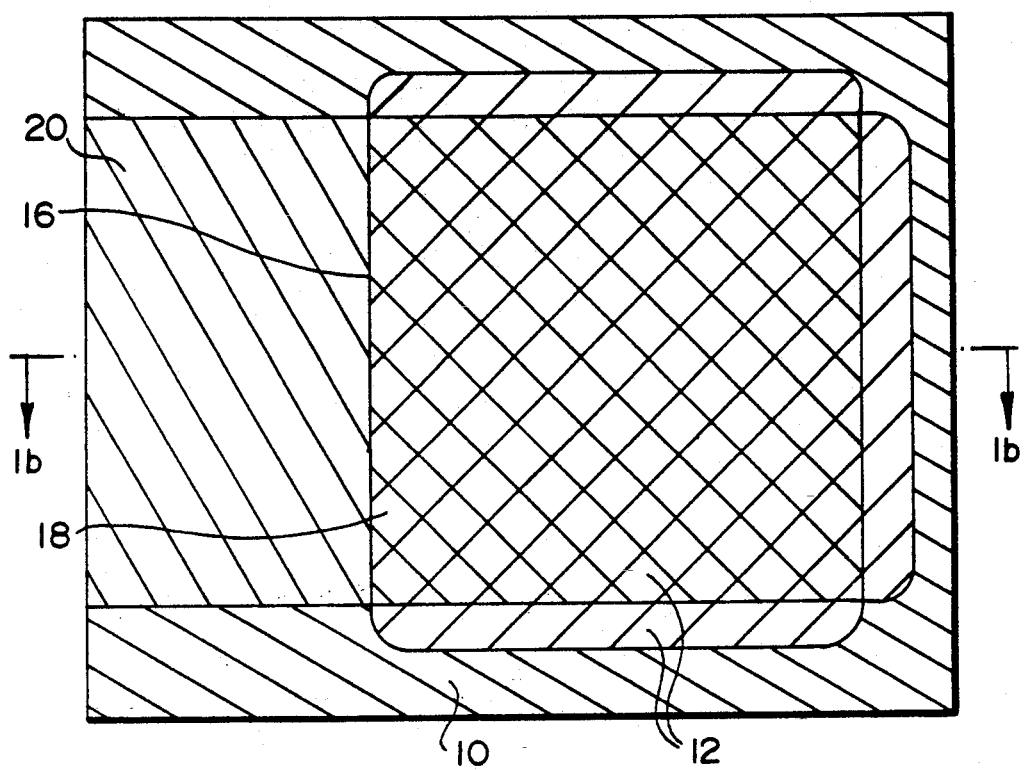
FIG. 1(a) is an overhead view of a schematic of a female mold half which may be utilized to shape a preform in accordance with the present invention.

A thin metal matrix composite body is produced by spontaneously infiltrating a permeable mass of filler material, which has been shaped into a thin preform (or a number of preforms), with molten matrix metal. Specifically, an infiltration enhancer and/or an infiltration enhancer precursor and/or an infiltrating atmosphere are in communication with the thin preform (or preforms) at least at some point during the process which permits molten matrix metal to spontaneously infiltrate the thin preform (or preforms). Alternatively, a coating or film of filler material may be provided, for example, onto at least a portion of at least one surface of a thin sheet of matrix metal. Accordingly, the present invention permits utilizing a preform and/or body of matrix metal which has been shaped to possess the configuration of the desired metal matrix composite (e.g., the filler material may be applied to a shaped body of matrix metal, a matrix metal may be applied to a preform, etc.).

In a first preferred embodiment a permeable mass of filler material may be shaped into a thin sheet by tape casting. Particularly, the filler material (e.g., silicon carbide particulates) may be incorporated into a slurry of suitable binders, plasticizers, etc. which may include an infiltration enhancer and/or an infiltration enhancer precursor (e.g., magnesium metal powder). The slurry of filler material may be tape cast into a thin (e.g., 0.035 inch thick) and flexible sheet (or sheets) which can be manipulated to result in a preform having a desired configuration. For example, a tape cast sheet of filler material may be shaped into a preform by press molding the tape cast sheet within a mold possessing the configuration of the desired metal matrix composite. Further, a single tape cast sheet may be divided (e.g., by cutting with scissors) into a plurality of preforms which can be shaped into similar or distinct configurations that may be spontaneously infiltrated with a matrix metal individually or as a group. Moreover, due to the flexibility of a tape cast sheet of filler material, any conventional shaping technique may be utilized in accordance with the present invention to fabricate a thin preform (or assemblage of preforms) which resemble the shape of the desired metal matrix composite.

In accordance with a specific tape casting embodiment, a plurality of tape cast preforms may be infiltrated with a matrix metal during a single spontaneous infiltration process. Particularly, a plurality of thin tape cast preforms which are segregated by a barrier material (e.g., graphite foil) may be spontaneously infiltrated by a matrix metal when in communication with a source of molten matrix metal. Specifically, a plurality of tape cast preforms, which may be shaped into curved sections, corrugated sheets, etc. can be incorporated within a sandwich structure comprising several tape cast preforms and sheets of graphite foil (i.e., the sheets of graphite foil function as a barrier material to segregate the preforms). At least a portion, for example, one edge of the sandwich structure may be communicated with molten matrix metal to permit spontaneous infiltration into each of the tape cast preforms. For example, an ingot of matrix metal may be placed adjacent to (e.g., on top) the sandwich structure such that the matrix metal when rendered molten will travel towards and into the preforms. The barrier materials (e.g., graphite foil) that sandwich the tape cast preforms define the boundaries to which the molten matrix metal may flow and spontaneously infiltrate. Such definitions permits fabrication of a plurality (e.g., 15 or more tape cast preforms) of thin tape cast preforms into thin metal matrix composites to net or near-net shaped.

In a second specific tape casting embodiment, a tape cast preform (or preforms) may be placed into contact with a matrix metal alloy such that the tape cast preform conforms to the surface features of the matrix metal. Specifically, a tape cast preform possesses a sufficient degree of flexibility in order to be shaped to conform to the interior and/or exterior dimension of a matrix metal body. For example, a tape cast preform may be rolled into a tube and inserted into a hollow cylinder of matrix metal (e.g., forming a tubular metal matrix composite upon spontaneous infiltration). Additionally, a tape cast preform may be located around the external surface of a matrix metal tube. Further, tape cast preforms may be located on both the interior and exterior surfaces of a matrix metal body. In some instances, it may be advantageous to adhere the tape cast preform to a surface of the matrix metal (e.g., gluing). Furthermore, a barrier material (e.g., graphite foil) may be placed upon the exposed surface (or surfaces) of the tape cast preform (or preforms), (i.e., in order to define a surface of a formed metal matrix composite), once the tape cast preform has been oriented properly in relation to the matrix metal.

Moreover, a tube is not the only configuration which may be contacted with tape cast preforms in order to form a metal matrix composite. Particularly, a complex configuration (e.g., a connection or junction for a plurality of tubular structural members) which may comprise a single body of matrix metal or a plurality of matrix metal pieces, may be covered externally and/or internally with tape cast preforms (e.g., ribbons of tape cast filler material wrapped about a body of matrix metal) that can be spontaneously infiltrated with matrix metal. Further, a tape cast preform may be spontaneously infiltrated with a thin sheet or layer of matrix metal. For example, a layer of particulate matrix metal may be sprayed onto at least a portion of at least one surface of a tape cast preform. The resultant metal matrix composite may possess a configuration which replicates the original body of matrix metal.

In a second preferred embodiment, a mass of filler material may be shaped into a thin preform by slip casting. Slip casting is particularly useful for producing a thin preform comprising a hollow cavity or shell. Particularly, slip casting may be utilized to fabricate a preform having a complex geometry (e.g., a body possessing an attenuated or truncated protrusion). A slip comprising a filler material (e.g., ball-milled silicon carbide particles) may be prepared by utilizing suitable suspension agents, deflocculants, etc. The slip which may include an infiltration enhancer and/or an infiltration enhancer precursor is poured into a mold (e.g., plaster of paris, $CaCO_3$, $SiO_2$, $B_4C$, SiC, etc.,) having the configuration desired for the preform. The length of time which the slip is permitted to remain in the mold determines the thickness (e.g., wall thickness of a spherical shell) of the resultant preform.

In a specific slip casting embodiment, a mold for casting the slip may be fabricated from a wax pattern. Specifically, a wax pattern which possesses the surface geometry and texture of the desired metal matrix composite may be coated with an investment shell material (e.g., $CaCO_3$). Further, a wax pattern can be shaped to include a cavity for housing the matrix metal which is interconnected with the portion of the wax pattern that defines the configuration of the formed metal matrix composite to permit fluid communication between the filler material or preform (or preforms) and the molten matrix metal. More importantly, the coating of investment shell material adheres to the wax pattern and forms a shell that inversely replicates the wax pattern. The investment shell material is heated to a temperature sufficient to remove (e.g., melt and/or burnout) the wax pattern in order to produce a mold for slip casting. A slip of filler material is poured into the resultant mold to fabricate a thin preform (e.g., a cavity or hollow body) to be spontaneously infiltrated with matrix metal.

Moreover, the thin metal matrix composite formed from a slip cast preform may possess an internal cavity which can be least partially filled. Particularly, prior to spontaneous infiltration of a matrix metal into a slip cast preform a material (e.g., alumina particulate) may be placed into the internal cavity of the preform. Further, the material which may be placed into the internal cavity of a preform may have a composition which is similar or different chemically from the preform. The material within the cavity may not contain an infiltration enhancer or a precursor thereof and thus, functions to support the preform during spontaneous infiltration and enhance the surface quality of the interior of the formed metal matrix composite. The material (e.g., alumina particulate) which may be enclosed within the formed metal matrix composite or the material may be removed subsequent to spontaneous infiltration. Alternatively, the material within the cavity may be rendered infiltratable (e.g., adding magnesium powder) and spontaneously infiltrated with a matrix metal which may be chemically different than the matrix metal that was originally utilized to spontaneously infiltrate the slip cast preform. Further still, the interior of a cavity or shell within the formed metal matrix composite may be at least partially filled with a substance (e.g., polymer, metal, ceramic, glass, etc.) in order to satisfy a specific end-use requirement.

Almost any existing article or body may be utilized as a design for fabricating a metal matrix composite. Particularly, an existing article, which may or may not be a metal matrix composite, may be immersed in a silicon rubber molding material. After the silicone molding material has cured or dried, the original article is removed to provide a mold that inversely replicates the original article. A molten wax pattern material may be poured into the silicon rubber mold. The resultant wax pattern may be recovered from the mold and, as discussed above, coated with an investment shell material to form a mold. A thin preform may be slip cast into the resultant mold which is ultimately spontaneously infiltrated with a matrix metal to form a thin metal matrix composite body which replicates the surface geometry and texture of the original article or body. Therefore, slip casting may be utilized to produce a thin metal matrix composite having a virtually unlimited array of shapes and textures.

The matrix metal to spontaneously infiltrate a slip cast preform may be communicated with the preform in any expedient manner. For example, the matrix metal may be housed within a cavity of the mold which is in fluid communication with the portion of the mold that defines the preform to be spontaneously infiltrated. Further, a layer (or layers) of matrix metal (e.g., which may be similar or chemically different) may be deposited upon an exterior and/or internal surface of a slip cast preform.

Moreover, it is to be understood when producing preforms via tape casting, slip casting, etc., it may necessary to cure (e.g., remove binders, solvents, etc.) or dry the preform before spontaneous infiltration by a molten matrix metal. Further, thin preforms for spontaneous infiltration by a matrix metal may be produced by any suitable technique which results in a preform possessing acceptable characteristics (e.g., thickness). Particularly, an acceptable preform may be fabricated by centrifuging extrusion, injection molding, isostatic pressing sediment casting, spray coating. Specifically, a filler material may be mixed with a binder and sprayed onto a mandrel, into a mold, etc. which will define the shape of the resultant preform. For example, an acceptable thin preform may be fabricated by spraying a filler material upon a barrier material, for example, a graphite mold, mandrel, etc., which has been coated with an adhesive. Alternatively, a mold not comprising a barrier material may be coated with a barrier material. Further, a mold comprising a barrier material (e.g., a graphite foil) which has been coated with a filler material may be further coated with a layer of matrix metal. A plurality of layers of filler and matrix metal may be utilized which possess differing characteristics (e.g., at least two layers of particulate filler material and/or matrix metal which are distinct in at least one of thickness and/or composition) may permit formation of a metal matrix composite having a graded microstructure. [The coated barrier material mold can be heated under appropriate conditions to permit the matrix metal to spontaneously infiltrate into the underlying layer of filler material. Further, a barrier material mold may be utilized to fabricate a metal matrix composite having a homogeneous microstructure (e.g., occlusions or channels of matrix metal within the formed composite are precluded). Further still, utilization of a mold comprising a barrier material permits formation of a thin metal matrix composite by spontaneous infiltration which has an improved surface finish quality. The coated barrier material mold can be exposed to appropriate conditions which permit the matrix metal to spontaneously infiltrate into the adjoining layer (or layers) of filler material.

In a third preferred embodiment of the claimed invention, a preform per se may not be necessary. Specifically, the configuration of the filler material and ultimately, the metal matrix composite may be determined by the matrix metal. For example, a thin sheet (or sheets), foil, etc. of matrix metal may be coated with at least one film or layer (e.g., a plurality of layers may be applied which possesses similar or distinct characteristics) of a filler material by any suitable technique which can be controlled to provide a coating having acceptable characteristics (e.g., surface quality, thickness, etc.). Further, a thin sheet of matrix metal may be shaped into a desired configuration (e.g., corrugated, foil, wire, etc.) before coating with a filler material. The shaped and filler coated sheet of matrix metal may be heated under appropriate conditions to cause the matrix metal to spontaneously infiltrate into the filler material to form a metal matrix composite which possesses the configuration of the original body of matrix metal. Particularly, when the entire thin body of matrix metal is coated with a filler material, spontaneous infiltration of the matrix metal may result in metal matrix composite which comprises a thin double-walled metal matrix composite that defines an internal cavity that inversely replicates the configuration of the original matrix metal body.

Moreover, a metal matrix composite structure can be fabricated by inverse replication into a virtually unlimited array of configurations (e.g., plates, cylinders, cones, boxes, etc.). Particularly, inverse replication of a matrix metal is not limited to the spontaneous infiltration process discussed above. Specifically, the configuration of a body of matrix metal may be inversely replicated by placing the shaped body of matrix metal into contact with any filler material which is capable of being wet by molten matrix metal. Depending on the characteristics of the filler material (e.g., size) the resultant metal matrix composite can define a cavity or void that substantially inversely replicates the configuration of the original shape of the matrix metal. Further, only a portion of a body of matrix metal may be placed (e.g., embedded within) a filler material. The portion of the matrix metal embedded within the filler material can be inversely replicated upon infiltration of the matrix metal into the surrounding filler material. Further, an inversely replicated metal matrix composite may be provided a with reinforcement or rigid structure means. For example, a rigid structure means may be provided by perforating a sheet of matrix metal which is substantially completely coated with a filler material. As a result, the holes within the perforated sheet are impregnated with filler material. When the filler material coating upon (and within) the perforated sheet of matrix metal is infiltrated by the matrix metal, a bridge or support means of metal matrix composite that may rigidize the resultant metal matrix composite will be formed at the location of the original perforations in the sheet of matrix metal. The support means can possess a predetermined cross-section (e.g., circular, rectangular, etc.) and may be provided at any desired location within the formed metal matrix composite (e.g., by providing rectangular perforations spaced evenly on a sheet of matrix metal) where increased mechanical integrity is desired. The internal cavities defined by the support means and the walls of the formed metal matrix composite may be utilized to channel or switch the flow of a fluid (e.g., to transfer heat). Further, the cavities within the formed metal matrix composite may possess a complex geometry (e.g., cooling passageways within an electronic package).

In another specific embodiment of the present invention, the surface quality of the outer or visible surface of a thin double-wall metal matrix composite formed by inverse replication may be improved by applying a coating or sheet of barrier material (e.g., graphite) onto the filler material before spontaneously infiltrating matrix metal into the filler material. For example, a sheet of matrix metal may be dipped into a filler material to substantially coat the entire surface of the matrix metal body. The coated matrix metal body may be contacted with a barrier material (e.g., sandwiched between two sheets of graphite) so that the spontaneously infiltrating matrix metal will infiltrate up to a smooth surface defined by the barrier.

Moreover, the techniques for coating, for example, a thin sheet of matrix metal with filler material, barrier, etc. and the subsequent spontaneous infiltration may be conducted in a continuous process. For example, a sheet of matrix metal may be supported by a barrier means while a layer of filler material (e.g., spray coating) is applied onto the sheet of matrix metal. Alternatively, a layer of filler material may be applied (e.g., tape cast) onto a support comprising barrier means and subsequently, a sheet of matrix metal is brought into contact with the layer of filler material overlying the barrier means. In both of these embodiments, the matrix metal is spontaneously infiltrated into the layer of filler material such that at least one surface of the formed metal matrix composite is defined by the barrier means.

In a still further embodiment of the present invention, a macrocomposite may be formed which comprises a metal matrix composite which is bonded integrally to a body of unreinforced metal (e.g., matrix metal without a filler material). Particularly, during a spontaneous infiltration process, an excess of matrix metal may be provided such that subsequent to infiltration the residual matrix metal is bonded integrally, for example, to the matrix metal within the formed composite. The excess matrix metal may be supplied via a reservoir means that may be external to the infiltration system (e.g., from outside of the furnace). Further, the composition of the excess matrix metal may be altered during the spontaneous infiltration (e.g., a reservoir may be utilized which supplies a matrix metal which is chemically different from an original source of matrix metal). The configuration of the unreinforced metal portion of the formed macrocomposite may correspond generally to the metal matrix component. Alternatively, the unreinforced metal portion may be bonded integrally to only a relatively small area of the metal matrix component and may extend outwardly from the surface of the metal matrix component in a predetermined manner.

Without wishing to be bound by any particular theory or explanation, when an infiltration enhancer precursor is utilized in combination with at least one of the matrix metal, and/or filler material (e.g., a coating of filler material on a matrix metal sheet) or preform and/or infiltrating atmosphere, the infiltration enhancer precursor may react to form an infiltration enhancer which induces or assists molten matrix metal to spontaneously infiltrate a filler material or preform. Moreover, it appears as though it may be necessary for the precursor to the infiltration enhancer to be capable of being positioned, located or transportable to a location which permits the infiltration enhancer precursor to interact with at least one of the infiltrating atmosphere, and/or the preform or filler material, and/or molten matrix metal. For example, in some matrix metal/infiltration enhancer precursor/infiltrating atmosphere systems, it is desirable for the infiltration enhancer precursor to volatilize at, near, or in some cases, even somewhat above the temperature at which the matrix metal becomes molten. Such volatilization may lead to: (1) a reaction of the infiltration enhancer precursor with the infiltrating atmosphere to form a gaseous species which enhances wetting of the filler material or preform by the matrix metal; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform which forms a solid, liquid or gaseous infiltration enhancer in at least a portion of the filler material or preform which enhances wetting.

Thus, for example, if an infiltration enhancer precursor was included or combined with, at least at some point during the process, molten matrix metal, it is possible that the infiltration enhancer could volatilize from the molten matrix metal and react with at least one of the filler material or preform and/or the infiltrating atmosphere. Such reaction could result in the formation of a solid species, if such solid species was stable at the infiltration temperature, said solid species being capable of being deposited on at least a portion of the filler material or preform as, for example, a coating. Moreover, it is conceivable that such solid species could be present as a discernable solid within at least a portion of the preform or filler material. If such a solid species was formed, molten matrix metal may have a tendency to react (e.g., the molten matrix metal may reduce the formed solid species) such that infiltration enhancer precursor may become associated with (e.g., dissolved in or alloyed with) the molten matrix metal. Accordingly, additional infiltration enhancer precursor may then be available to volatilize and react with another species (e.g., the filler material or preform and/or infiltrating atmosphere) and again form a similar solid species. It is conceivable that a continuous process of conversion of infiltration enhancer precursor to infiltration enhancer followed by a reduction reaction of the infiltration enhancer with molten matrix metal to again form additional infiltration enhancer, and so on, could occur, until the result achieved is a spontaneously infiltrated metal matrix composite.

In order to effect spontaneous infiltration of the matrix metal into the filler material or preform, an infiltration enhancer should be provided to the spontaneous system. An infiltration enhancer could be formed from an infiltration enhancer precursor which could be provided (1) in the matrix metal; and/or (2) in the filler material or preform; and/or (3) from the infiltrating atmosphere; and/or (4) from an external source into the spontaneous system. Moreover, rather than supplying an infiltration enhancer precursor, an infiltration enhancer may be supplied directly to at least one of the filler material or preform, and/or matrix metal, and/or infiltrating atmosphere. Ultimately, at least during the spontaneous infiltration, the infiltration enhancer should be located in at least a portion of the filler material or preform.

In a preferred embodiment of the invention, it is possible that the infiltration enhancer precursor can be at least partially reacted with the infiltrating atmosphere such that the infiltration enhancer can be formed in at least a portion of the filler material or preform prior to or substantially contiguous with contacting the filler material or preform with the matrix metal (e.g., if magnesium was the infiltration enhancer precursor and nitrogen was the infiltrating atmosphere, the infiltration enhancer could be magnesium nitride which would be located in at least a portion of the preform or filler material).

An example of a matrix metal/infiltration enhancer precursor/infiltrating atmosphere system is the aluminum/magnesium/nitrogen system. Specifically, an aluminum matrix metal can be contained within a suitable refractory vessel which, under the process conditions, does not adversely react with the aluminum matrix metal and/or the filler material when the aluminum is made molten. A filler material or preform can thereafter be contacted with molten aluminum matrix metal and spontaneously infiltrated.

Moreover, rather than supplying an infiltration enhancer precursor, an infiltration enhancer may be supplied directly to at least one of the preform or filler material, and/or matrix metal, and/or infiltrating atmosphere. Ultimately, at least during the spontaneous infiltration, the infiltration enhancer should be located in at least a portion of the filler material or preform.

Under the conditions employed in the method of the present invention, in the case of an aluminum/magnesium/nitrogen spontaneous infiltration system, the preform or filler material should be sufficiently permeable to permit the nitrogen-containing gas to penetrate or permeate the filler material or preform at some point during the process and/or contact the molten matrix metal. Moreover, the permeable filler material or preform can accommodate infiltration of the molten matrix metal, thereby causing the nitrogen-permeated preform to be infiltrated spontaneously with molten matrix metal to form a metal matrix composite body and/or cause the nitrogen to react with an infiltration enhancer precursor to form infiltration enhancer in the filler material or preform and thereby result in spontaneous infiltration. The extent of spontaneous infiltration and formation of the metal matrix composite will vary with a given set of process conditions, including magnesium content of the aluminum alloy, magnesium content of the preform or filler material, amount of magnesium nitride in the preform or filler material, the presence of additional alloying elements (e.g., silicon, iron, copper, manganese, chromium, zinc, and the like), average size of the filler material (e.g., particle diameter) comprising the preform or the filler material, surface condition and type of filler material or preform, nitrogen concentration of the infiltrating atmosphere, time permitted for infiltration and temperature at which infiltration occurs. For example, for infiltration of the molten aluminum matrix metal to occur spontaneously, the aluminum can be alloyed with at least about 1 percent by weight, and preferably at least about 3 percent by weight, magnesium (which functions as the infiltration enhancer precursor), based on alloy weight. Auxiliary alloying elements, as discussed above, may also be included in the matrix metal to tailor specific properties thereof. Additionally, the auxiliary alloying elements may affect the minimum amount of magnesium required in the matrix aluminum metal to result in spontaneous infiltration of the filler material or preform. Loss of magnesium from the spontaneous system due to, for example, volatilization should not occur to such an extent that no magnesium was present to form infiltration enhancer. Thus, it is desirable to utilize a sufficient amount of initial alloying elements to assure that spontaneous infiltration will not be adversely affected by volatilization. Still further, the presence of magnesium in both of the preform (or filler material) and matrix metal or the preform (or filler material) alone may result in a reduction in required amount of magnesium to achieve spontaneous infiltration (discussed in greater detail later herein).

The volume percent of nitrogen in the infiltrating atmosphere also affects formation rates of the metal matrix composite body. Specifically, if less than about 10 volume percent of nitrogen is present in the atmosphere, very slow or little spontaneous infiltration will occur. It has been discovered that it is preferably for at least about 50 volume percent of nitrogen to be present in the atmosphere, thereby resulting in, for exampole, shorter infiltration times due to a much more rapid rate of infiltration. The infiltrating atmosphere (e.g., a nitrogen-containing gas) can be supplied directly to the filler material or preform and/or matrix metal, or it may be produced or result from a decomposition of a material.

The minimum magnesium content required for the molten matrix metal to infiltrate a filler material or preform depends on one or more variables such as the processing temperature, time, the presence of auxiliary alloying elements such as silicon or zinc, the nature of the filler material, the location of the magnesium in one or more components of the spontaneous system, the nitrogen content of the atmosphere, and the rate at which the nitrogen atmosphere flows. Lower temperatures or shorter heating times can be used to obtain complete infiltration as the magnesium content of the alloy and/or preform is increased. Also, for a given magnesium content, the addition of certain auxiliary alloying elements such as zinc permits the use of lower temperatures. For example, a magnesium content of the matrix metal at the lower end of the operable range, e.g., from about 1 to 3 weight percent, may be used in conjunction with at least one of the following: an above-minimum processing temperature, a high nitrogen concentration, or one or more auxiliary alloying elements. When no magnesium is added to the preform, alloys containing from about 3 to 5 weight percent magnesium are preferred on the basis of their general utility over a wide variety of process conditions, with at least about 5 percent being preferred when lower temperatures and shorter times are employed. Magnesium contents in excess of about 10 percent by weight of the aluminum alloy may be employed to moderate the temperature conditions required for infiltration. The magnesium content may be reduced when used in conjunction with an auxiliary alloying element, but these elements serve an auxiliary function only and are used together with at least the above-specified minimum amount of magnesium. For example, there was substantially no infiltration of nominally pure aluminum alloyed only with 10 percent silicon at 1000° C. into a bedding of 500 mesh, 39 CRYSTOLON® (99 percent pure silicon carbide from Norton Co.). However, in the presence of magnesium, silicon has been found to promote the infiltration process. As a further example, the amount of magnesium varies if it is supplied exclusively to the preform or filler material. It has been discovered that spontaneous infiltration will occur with a lesser weight percent of magnesium supplied to the spontaneous system when at least some of the total amount of magnesium supplied is placed in the preform or filler material. It may be desirable for a lesser amount of magnesium to be provided in order to prevent the formation of undesirable intermetallics in the metal matrix composite body. In the case of a silicon carbide preform, it has been discovered that when the preform is contacted with an aluminum matrix metal, the preform containing at least about 1% by weight magnesium and being in the presence of a substantially pure nitrogen atmosphere, the matrix metal spontaneously infiltrates the preform. In the case of an alumina preform, the amount of magnesium required to achieve acceptable spontaneous infiltration is slightly higher. Specifically, it has been found that when an alumina preform, when contacted with a similar aluminum matrix metal, at about the same temperature as the aluminum that infiltrated into the silicon carbide preform, and in the presence of the same nitrogen atmosphere, at least about 3% by weight magnesium may be required to achieve similar spontaneous infiltration to that achieved in the silicon carbide preform discussed immediately above.

It is also noted that it is possible to supply to the spontaneous system infiltration enhancer precursor and/or infiltration enhancer on a surface of the alloy and/or on a surface of the preform or filler material and/or within the preform or filler material prior to infiltrating the matrix metal into the filler material or preform (i.e., it may not be necessary for the supplied infiltration enhancer or infiltration enhancer precursor to be alloyed with the matrix metal, but rather, simply supplied to the spontaneous system). For example, in the aluminum/magnesium/nitrogen system, if the magnesium was applied to a surface of the matrix metal it may be preferred that the surface should be the surface which is closest to, or preferably in contact with, the permeable mass of filler material or vice versa; or such magnesium could be mixed into at least a portion of the preform or filler material. Still further, it is possible that some combination of surface application, alloying and placement of magnesium into at least a portion of the preform could be used. Such combination of applying infiltration enhancer(s) and/or infiltration enhancer precursor(s) could result in a decrease in the total weight percent of magnesium needed to promote infiltration of the matrix aluminum metal into the preform, as well as achieving lower temperatures at which infiltration can occur. Moreover, the amount of undesirable intermetallics formed due to the presence of magnesium could also be minimized.

The use of one or more auxiliary alloying elements and the concentration of nitrogen in the surrounding gas also affects the extent of nitriding of the matrix metal at a given temperature. For example, auxiliary alloying elements such as zinc or iron included in the alloy, or placed on a surface of the alloy, may be used to reduce the infiltration temperature and thereby decrease the amount of nitride formation, whereas increasing the concentration of nitrogen in the gas may be used to promote nitride formation.

The concentration of magnesium in the alloy, and/or placed onto a surface of the alloy, and/or combined in the filler or preform material, also tends to affect the extent of infiltration at a given temperature. Consequently, in some cases where little or no magnesium is contacted directly with the preform or filler material, it may be preferred that at least about three weight percent magnesium be included in the alloy. Alloy contents of less than this amount, such as one weight percent magnesium, may require higher process temperatures or an auxiliary alloying element for infiltration. The temperature required to effect the spontaneous infiltration process of this invention may be lower: (1) when the magnesium content of the alloy alone is increased, e.g., to at least about 5 weight percent; and/or (2) when alloying constituents are mixed with the permeable mass of filler material or preform; and/or (3) when another element such as zinc or iron is present in the aluminum alloy. The temperature also may vary with different filler materials. In general, in the aluminum/magnesium/nitrogen system spontaneous and progressive infiltration will occur at a process temperature of at least about 675° C., and preferably a process temperature of at least about 750° C.-800° C. Temperatures generally in excess of 1200° C. do not appear to benefit the process, and a particularly useful temperature range has been found to be from about 675° C. to about 1000° C. However, as a general rule, the spontaneous infiltration temperature is a temperature which is above the melting point of the matrix metal but below the volatilization temperature of the matrix metal. Moreover, the spontaneous infiltration temperature should be below the melting point of the filler material. Still further, as temperature is increased, the tendency to form a reaction product between the matrix metal and infiltrating atmosphere increases (e.g., in the case of aluminum matrix metal and a nitrogen infiltrating atmosphere, aluminum nitride may e formed). Such reaction product may be desirable or undesirable based upon the intended application of the metal matrix composite body. Additionally, electric resistance heating is typically used to achieve the infiltrating temperatures. However, any heating means which can cause the matrix metal to become molten and does not adversely affect spontaneous infiltration, is acceptable for use with the invention.

In the present method, for example, a permeable filler material or preform comes into contact with molten aluminum in the presence of, at least sometime during the process, a nitrogen-containing gas. The nitrogen-containing gas may be supplied by maintaining a continuous flow of gas into contact with at least one of the filler material or preform and/or molten aluminum matrix metal. Although the flow rate of the nitrogen-containing gas is not critical, it is preferred that the flow rate be sufficient to compensate for any nitrogen lost from the atmosphere due to any nitride formation, and also to prevent or inhibit the incursion of air which can have an oxidizing effect on the molten metal.

The method of forming a metal matrix composite is applicable to a wide variety of filler materials, and the choice of filler materials will depend on such factors as the matrix alloy, the process conditions, the reactivity of the molten matrix alloy with the filler material, and the properties sought for the final composite product.

For example, when aluminum is the matrix metal, suitable filler materials include (a) oxides, e.g. alumina, magnesia, zirconia etc.; (b) carbides, e.g. silicon carbide; (c) borides, e.g. aluminum dodecaboride, titanium diboride, and (d) nitrides, e.g. aluminum nitride, and (e) mixtures thereof. If there is a tendency for the filler material to react with the molten aluminum matrix metal, this might be accommodated by minimizing the infiltration time and temperature or by providing a non-active coating on the filler. The filler material may comprise a substrate, such as carbon or other non-ceramic material, bearing a ceramic coating to protect the substrate from attack or degradation. Suitable ceramic coatings include oxides, carbides, borides and nitrides. Ceramics which are preferred for use in the present method include alumina and silicon carbide in the form of particles, platelets, whiskers and fibers. The fibers can be discontinuous (in chopped form) or in the form of continuous filament, such as multifilament tows. Further, the filler material or preform may be homogeneous or heterogeneous.

It also has been discovered that certain filler materials exhibit enhanced infiltration relative to filler materials having a similar chemical composition. For example, crushed alumina bodies made by the method disclosed in U.S. Pat. No. 4,713,360, entitled "Novel Ceramic Materials and Methods of Making Same", which issued on Dec. 15, 1987, in the names of Marc S. Newkirk et al., exhibit desirable infiltration properties relative to commercially available alumina products. Moreover, crushed alumina bodies made by the method disclosed in Copending and commonly owned application Ser. No. 819,397, now U.S. Pat. No. 4,851,375, entitled "Composite Ceramic Articles and Methods of Making Same", in the names of Marc S. Newkirk et al., also exhibit desirable infiltration properties relative to commercially available alumina products. The subject matter of each of the issued Patent and Copending Patent Application is herein expressly incorporated by reference. Thus, it has been discovered that complete infiltration of a permeable mass of ceramic material can occur at lower infiltration temperatures and/or lower infiltration times by utilizing a crushed or comminuted body produced by the method of the aforementioned U.S. Patent and Patent Application.

The size, shape, chemistry and volume percent of the filler material (or preform) can be any that may be required to achieve the properties desired in the composite. Thus, the filler material may be in the form of particles, whiskers, platelets or fibers since infiltration is not restricted by the shape of the filler material. Other shapes such as spheres, tubules, pellets, refractory fiber cloth, and the like may be employed. In addition, the size of the filler material does not limit infiltration, although a higher temperature or longer time period may be needed for complete infiltration of a mass of smaller particles than for larger particles or vice-versa depending on the particular reaction conditions. Average particle diameters as small as a micron or less to about 1100 microns or more can be successfully utilized in the present invention, with a range of about 2 microns through about 1000 microns being preferred for a vast majority of commercial applications. Further, the mass of filler material (or preform) to be infiltrated should be permeable (i.e., contain at least some interconnected porosity to render it permeable to molten matrix metal and/or to the infiltrating atmosphere). Moreover, by controlling the size (e.g., particle diameter) and/or geometry and/or composition of the filler material or the material comprising the preform, the physical and mechanical properties of the formed metal matrix composite can be controlled or engineered to meet any number of industrial needs. For example, wear resistance of the metal matrix composite can be increased by increasing the size of the filler material (e.g., increasing the average diameter of the filler material particles) given that the filler material has a higher wear resistance than the matrix metal. However, strength and/or toughness may tend to increase with decreasing filler size. Further, the thermal expansion coefficient of the metal matrix composite may decrease with increasing filler loading, given that the coefficient of thermal expansion of the filler is lower than the coefficient of thermal expansion of the matrix metal. Still further, the mechanical and/or physical properties (e.g., density, coefficient of thermal expansion, elastic and/or specific modulus, strength and/or specific strength, etc.) of a formed metal matrix composite body may be tailored depending on the loading of the filler material in the loose mass or in the preform. For example, by providing a loose mass or preform comprising a mixture of filler particles of varying sizes and/or shapes, wherein the density of the filler is greater than that of the matrix metal, a higher filler loading, due to enhanced packing of the filler materials, may be achieved, thereby resulting in a metal matrix composite body with an increased density. By utilizing the teachings of the present invention, the volume percent of filler material or preform which can be infiltrated can vary over a wide range. The lower volume percent of filler that can be infiltrated is limited primarily by the ability to form a porous filler material or preform, (e.g., about 10 volume percent); whereas the higher volume percent of filler or preform that can be infiltrated is limited primarily by the ability to form a dense filler material or preform with at least some interconnected porosity (e.g., about 95 volume percent). Accordingly, by practicing any of the above teachings, alone or in combination, a metal matrix composite can be engineered to contain a desired combination of properties.

The method of forming metal matrix composites according to the present invention, not being dependent on the use of pressure to force or squeeze molten matrix metal into a preform or a mass of filler material, permits the production of substantially uniform metal matrix composites having a high volume fraction of filler material and low porosity. Higher volume fractions of filler material may be achieved by using a lower porosity initial mass of filler material. Higher volume fractions also may be achieved if the mass of filler is compacted or otherwise densified provided that the mass is not converted into either a compact with closed cell porosity or into a fully dense structure that would prevent infiltration by the molten alloy. Specifically, volume fractions on the order of about 60 to 80 volume percent can be achieved by methods such as vibrational packing, controlling particle size distribution, etc. However, alternative techniques can be utilized to achieve even higher volume fractions of filler. Volume fractions of filler on the order of 40 to 50 percent are preferred for thermo-forming in accordance with the present invention. At such volume fractions, the infiltrated composite maintains or substantially maintains its shape, thereby facilitating secondary processing. Higher or lower particle loadings or volume fractions could be used, however, depending on the desired final composite loading after thermo-forming. Moreover, methods for reducing particle loadings can be employed in connection with the thermo-forming processes of the present invention to achieve lower particle loadings.

It has been observed that for aluminum infiltration and matrix formation around a ceramic filler, wetting of the ceramic filler by the aluminum matrix metal may be an important part of the infiltration mechanism. Further, the wetting of the filler by molten matrix metal may permit a uniform dispersion of the filler throughout the formed metal matrix composite and improve the bonding of the filler to the matrix metal. Moreover, at low processing temperatures, a negligible or minimal amount of metal nitriding occurs resulting in a minimal discontinuous phase of aluminum nitride dispersed in the metal matrix. However, as the upper end of the temperature range is approached, nitridation of the metal is more likely to occur. Thus, the amount of the nitride phase in the metal matrix can be controlled by varying the processing temperature at which infiltration occurs. The specific process temperature at which nitride formation becomes more pronounced also varies with such factors as the matrix aluminum alloy used and its quantity relative to the volume of filler or preform, the filler material to be infiltrated, and the nitrogen concentration of the infiltrating atmosphere. For example, the extent of aluminum nitride formation at a given process temperature is believed to increase as the ability of the alloy to wet the filler decreases and as the nitrogen concentration of the atmosphere increases.

It is therefore possible to tailor the constituency of the metal matrix during formation of the composite to impart certain characteristics to the resulting product. For a given system, the process conditions can be selected to control the nitride formation. A composite product containing an aluminum nitride phase will exhibit certain properties which can be favorable to, or improve the performance of, the product. Further, the temperature range for spontaneous infiltration with an aluminum alloy may vary with the ceramic material used. In the case of alumina as the filler material, the temperature for infiltration should preferably not exceed about 1000° C. if it is desired that the ductility of the matrix not be reduced by the significant formation of nitride. However, temperatures exceeding 1000° C. may be employed if it is desired to produce a composite with a less ductile and stiffer matrix. To infiltrate silicon carbide, higher temperatures of about 1200° C. may be employed since the aluminum alloy nitrides to a lesser extent, relative to the use of alumina as filler, when silicon carbide is employed as a filler material.

Moreover, the metallic phase of the formed metal matrix composite may be modified by providing a transition element (e.g., Ni, Co, Fe, Ti, Zr, etc.) or a precursor thereof into the metallic phase of the metal matrix composite. For example, a transition element may be provided into at least a portion of the filler material. Further, the transition element may be provided from a reducible compound which liberates a transition element when contacted by molten matrix metal. Further still, the transition element may be an alloying constituent of the matrix metal.

In one embodiment, the transition element may form an intermetallic compound with the matrix metal (e.g., $NiAl$, $Ni_2Al$, $Fe_3Al$, $TiAl$, $Co_3Al$, $Zr_3Al$, etc.). Further, at least a portion of at least the surface of the metallic phase of the formed metal matrix composite may be modified by carbonization, nitridation, borizidation, etc.

More importantly, modifying the metallic phase within a formed metal matrix composite may permit fabrication of a metal matrix composite which possess improved corrosion, erosion, and temperature resistance in comparison to a metal matrix composite which does not possess a modified metallic phase.

Further still, the constituency of the matrix metal within the metal matrix composite and defects, for example, porosity, may be modified by controlling the cooling rate of the metal matrix composite. For example, the metal matrix composite may be directionally solidified by any number of techniques including: placing the container holding the metal matrix composite upon a chill plate; and/or selectively placing insulating materials about the container. Further, the constituency of the metal matrix may be modified after formation of the metal matrix composite. For example, exposure of the formed metal matrix composite to a heat treatment may improve the tensile strength of the metal matrix composite. (The standard test for tensile strength is ASTM-D3552-77 (reapproved 1982).)

For example, a desirable heat treatment for a metal matrix composite containing a 520.0 aluminum alloy as the matrix metal may comprise heating the metal matrix composite to an elevated temperature, for example, to about 430° C., which is maintained for an extended period (e.g., 18–20 hours). The metal matrix may then be quenched in boiling water at about 100° C. for about 20 seconds (i.e., a T-4 heat treatment) which can temper or improve the ability of the composite to withstand tensile stresses.

Moreover, it is possible to use a reservoir of matrix metal to assure complete infiltration of the filler material and/or to supply a second metal which has a different composition from the first source of matrix metal. Specifically, in some cases it may be desirable to utilize a matrix metal in the reservoir which differs in composition from the first source of matrix metal. For example, if an aluminum alloy is used as the first source of matrix metal, then virtually any other metal or metal alloy which was molten at the processing temperature could be used as the reservoir metal. Molten metals frequently are very miscible with each other which would result in the reservoir metal mixing with the first source of matrix metal so long as an adequate amount of time is given for the mixing to occur. Thus, by using a reservoir metal which is different in composition from the first source of matrix metal, it is possible to tailor the properties of the metal matrix to meet various operating requirements and thus tailor the properties of the metal matrix composite.

A barrier means may also be utilized in combination with the present invention. Specifically, the barrier means for use with this invention may be any suitable means which interferes, inhibits, prevents or terminates the migration, movement, or the like, of molten matrix alloy (e.g., an aluminum alloy) beyond the defined surface boundary of the filler material. Suitable barrier means may be any material, compound, element, composition, or the like, which, under the process conditions of this invention, maintains some integrity, is not volatile and preferably is permeable to the gas used with the process, as well as being capable of locally inhibiting, stopping, interfering with, preventing, or the like, continued infiltration or any other kind of movement beyond the defined surface boundary of the ceramic filler. Barrier means may be used during spontaneous infiltration or in any molds or other fixtures utilized in connection with thermo-forming of the spontaneously infiltrated metal matrix composite, as discussed in greater detail below.

Suitable barrier means includes materials which are substantially non-wettable by the migrating molten matrix alloy under the process conditions employed. A barrier of this type appears to exhibit little or no affinity for the molten matrix alloy, and movement beyond the defined surface boundary of the filler material or preform is prevented or inhibited by the barrier means. The barrier reduces any final machining or grinding that may be required of the metal matrix composite product. As stated above, the barrier preferably should be permeable or porous, or rendered permeable by puncturing, to permit the gas (e.g., infiltrating atmosphere) to contact the molten matrix alloy.

Suitable barriers particularly useful for aluminum matrix alloys are those containing carbon, especially the crystalline allotropic form of carbon known as graphite. Graphite is essentially non-wettable by the molten aluminum alloy under the described process conditions. A particular preferred graphite is a graphite foil product that is sold under the trademark GRAFOIL ®, registered to Union Carbide. This graphite foil exhibits sealing characteristics that prevent the migration of molten aluminum alloy beyond the defined surface boundary of the filler material. This graphite foil is also resistant to heat and is chemically inert. GRAFOIL ® graphite foil is flexible, compatible, conformable and resilient. It can be made into a variety of shapes to fit any barrier application. However, graphite barrier means may be employed as a slurry or paste or even as a paint film around and on the boundary of the filler material or preform. GRAFOIL ® is particularly preferred because it is in the form of a flexible graphite sheet. In use, this paper-like graphite is simply formed around the filler material or preform.

Other preferred barrier(s) for aluminum metal matrix alloys in nitrogen are the transition metal borides (e.g., titanium diboride ($TiB_2$)) which are generally non-wettable by the molten aluminum metal alloy under certain of the process conditions employed using this material. With a barrier of this type, the process temperature should not exceed about 875° C., for otherwise the barrier material becomes less efficacious and, in fact, with increased temperature infiltration into the barrier will occur. Moreover, the particle size of the barrier material may affect the ability of the material to inhibit spontaneous infiltration. The transition metal borides are typically in a particulate form (1–30 microns). The barrier materials may be applied as a slurry or paste to the boundaries of the permeable mass of ceramic filler material which preferably is preshaped as a preform.

Other useful barriers for aluminum metal matrix alloys in nitrogen include low-volatile organic compounds applied as a film or layer onto the external surface of the filler material or preform. Upon firing in nitrogen, especially at the process conditions of this invention, the organic compound decomposes leaving a carbon soot film. The organic compound may be applied by conventional means such as painting, spraying, dipping, etc.

Moreover, finely ground particulate materials can function as a barrier so long as infiltration of the particulate material would occur at a rate which is slower than the rate of infiltration of the filler material.

Thus, the barrier means may be applied by any suitable means, such as by covering the defined surface boundary with a layer of the barrier means. Such a layer of barrier means may be applied by painting, dipping, silk screening, evaporating, or otherwise applying the barrier means in liquid, slurry, or paste form, or by sputtering a vaporizable barrier means, or by simply depositing a layer of a solid particulate barrier means, or by applying a solid thin sheet or film of barrier means onto the defined surface boundary. With the barrier means in place, spontaneous infiltration substantially terminates when the infiltrating matrix metal reaches the defined surface boundary and contacts the barrier means.

Various demonstrations of the present invention are included in the Examples immediately following. However, these Examples should be considered as being illustrative and should not be construed as limiting the scope of the invention as defined in the appended claims.

EXAMPLE 1

Figure 1B:
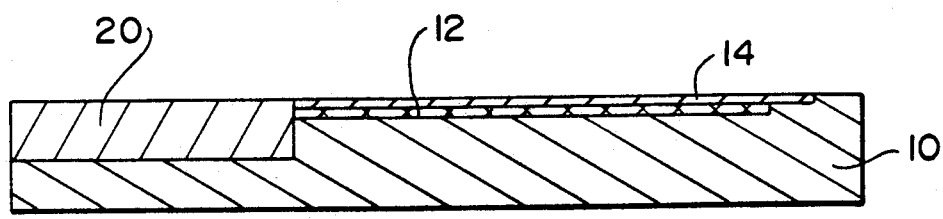
FIG. 1(b) is a side view of a schematic of the female mold half illustrated in FIG. 1c.
Figure 1C:
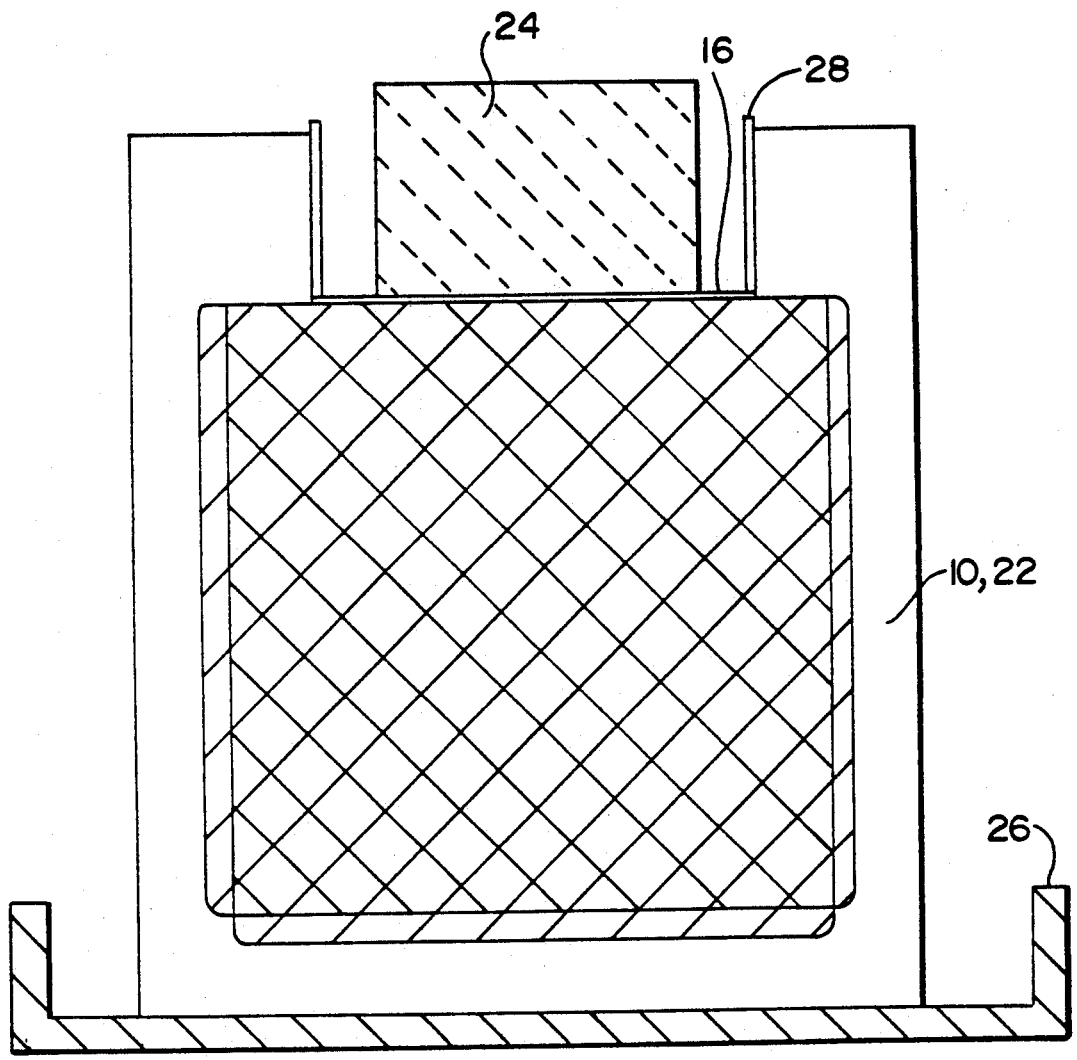
FIG. 1(c) is a cross-sectional view of the assembly utilized to form a metal matrix composite in accordance with Example 1 of the present invention.

This Example illustrates that the techniques of the present invention can be used to infiltrate a tape cast preform to produce a metal matrix composite body which resembles the configuration of the preform. The setup used to carry out the infiltration is shown schematically in FIGS. 1a–1c.

A two piece graphite mold having male 22 and female 10 halves was utilized to shape a tape cast sheet 14. The exterior dimensions of the graphite mold measured about 7 inches (178 mm) by about 9 inches (229 mm) by about 2 inches (51 mm). The interior of the graphite mold defined, respectively, upper 20 and lower 18 cavities which were interconnected in a manner sufficient to permit fluid flow therebetween. The upper cavity 20, which opened outwardly to the exterior of the mold, housed the matrix metal prior to infiltration. The lower cavity 18 was utilized to press mold a tape cast sheet of material 14 into a rectangular shape having a lip which is perpendicular to, and along, the perimeter of the rectangle.

In order to mold a tape cast sheet of material 14 into a preform, the upper 20 and lower 18 cavities of the two piece graphite mold were coated with a slurry of colloidal graphite 12 (DAG ® 154, Acheson Colloid Company, Port Huron, Mich.).

A tape cast sheet 14 measuring about 5 ½ inches (140 mm) square and about 35 mils (0.9 mm) thick and comprising by weight about 6 percent magnesium powder (−325 mesh, Hart Corp., Tamaqua, Pa.) 28 percent 500 grit green silicon carbide (39 CRYSTOLON ®, Norton Company, Worcester, Mass.), and the balance 220 grit green silicon carbide (39 CRYSTOLON ®, Norton Company, Worcester, Mass.) was placed against the coated lower cavity 12, 18 of the female half of the graphite mold 10. The dimensions of the lower cavity 18 are smaller than the tape cast sheet 14 and correspond to the rectangular configuration discussed above. The male half of the graphite mold 22 was brought toward the tape cast sheet 14 in the female half 10. The two halves of the graphite mold were forced together and clamped into place so as to deform the pliable tape cast sheet 14 to the shape of the lower cavity 18 of the mold 10.

An edge of the resultant preform 14 comprising the shaped tape cast material extended from the lower cavity 18 into the upper cavity 20. The exposed edge of the tape cast preform 14 was sprinkled with a layer of magnesium powder (−100 mesh, Hart Co.,). The graphite mold and its contents were oriented such that the upper cavity 20 opened upwardly. The upper cavity 20 of the graphite mold 10, 22 measured about 5 inches (127 mm) by about 3 inches (76 mm) by about 1 inch (25 mm). The graphite mold 10, 22 and its contents were then placed into a graphite boat 26 measuring about 4 inches (102 mm) by about 15 inches (381 mm) by about 1 inch (25 mm) deep. The upper cavity of the graphite mold was lined with graphite paper (GRAFOIL ®, Union Carbide, Danbury, Conn.) to form a feeder box 28 having dimensions approximately the same of those of the matrix metal alloy 24. The feeder box 28 was open on both ends, wherein one opening was smaller and extended into contact with the exposed edge of the preform in the lower cavity. Specifically, the graphite paper feeder box 28 was positioned inside the upper cavity 20 of the graphite mold 10, 22 such that the smaller openings or slot which measured about 2½ inches (65 mm) by about ½ inch (13 mm), was adjacent to the magnesium coated preform edge 26. An ingot of matrix metal 24 weighing about 500 grams and comprising by weight about 15 percent silicon, 5 percent magnesium, and the balance aluminum was placed into the graphite paper box 28 within the upper cavity 20.

The graphite boat 26 and its contents were placed into a vacuum furnace. The furnace atmosphere was evacuated to about 30 inches of mercury vacuum and then backfilled with nitrogen gas at atmospheric pressure. A nitrogen gas flow rate of about 5 liters per minute through the furnace was maintained. The furnace temperature was raised from room temperature to about 200° C. at a rate of about 200° C. per hour. After about 4.5 hours at about 200° C., the temperature was increased to about 825° C. at a rate of about 50° C. per hour. After about 15 hours at about 825° C., the graphite boat 26 and its contents were removed from the furnace and placed on top of a water cooled aluminum quench plate to permit directional solidification. Directional solidification was enhanced by pouring a particulate mixture of hot topping material (FEEDOL ® 9, Foseco, Inc., Cleveland, Ohio) on top of the molten matrix metal 24 within the upper cavity 20 of the graphite mold 10, 22. After cooling to about room temperature, the graphite mold 10, 22 was disassembled to reveal that at least some of the matrix metal 24 had infiltrated the tape cast ceramic preform 14 to produce a metal matrix composite material of near net-shape.

EXAMPLE 2

Figure 2:
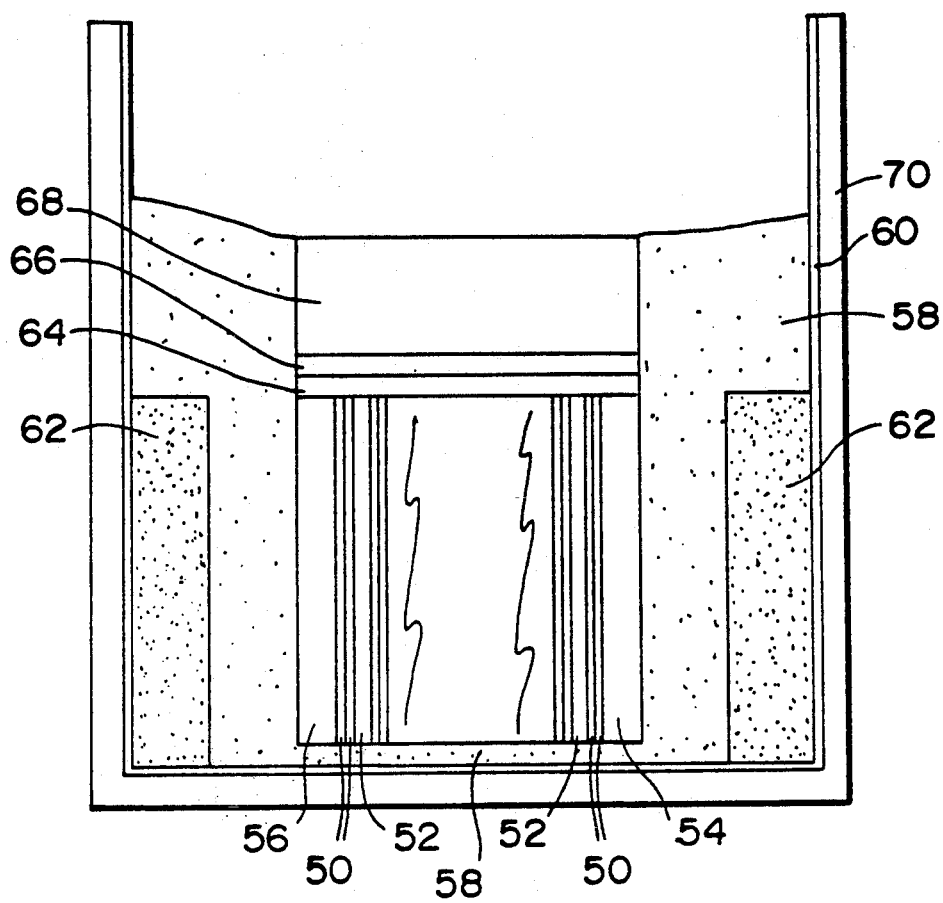
FIG. 2 is a cross-sectional view of the assembly utilized to form a metal matrix composite in accordance with Example 2 of the present invention.

This Example illustrates the ability of the present invention to fabricate several thin metal matrix composite bodies by infiltrating a plurality of preforms from one reservoir of matrix metal. The setup used to carry out the infiltration is shown schematically in FIG. 2.

The preform 52 comprised tape cast filler comprising by weight a 70:30 blend of 220 grit and 500 grit green silicon carbide powders (39 CRYSTOLON ®, Norton Company) which had been ball milled dry for about 24 hours. About 6 percent by weight magnesium powder (−325 mesh, Reade Advanced Materials) was added to the blend of silicon carbide. The tape cast preforms 52 measured about 3 7/16 inches (87 mm) by about 3¼ inches (83 mm) by about ½ inch (13 mm) in thickness. An assembly 50, 52, 54, 56 comprising a pluralities of tape cast preforms 52 was prepared by stacking preforms and graphite foil 50 in an alternating manner upon two sheets of graphite foil 50 (GRAFOIL ®, Union Carbide Company) each measuring about 3 7/16 inches (87 mm) by 3¼ (83 mm) inches by 35 mils (0.89 mm) thick. The two sheets of graphite foil rested upon a first graphite tile 56 measuring about 3 7/16 (87 mm) inches by 3¼ inches (83 mm) by ½ inch (13 mm) thick. Two layers of graphite foil 50 each having substantially the same dimensions as the first two layers of graphite foil 50 were placed upon each tape cast preform 52. This layering sequence comprising 1 sheet of tape cast filler 52 and two sheets of graphite foil 50 was repeated until an assembly 50, 52, 54, 56 comprising 19 sheets of tape cast preform was produced. A second graphite tile 54 having substantially the same dimensions as the first graphite tile was placed upon the last two sheets of graphite foil 50 to complete the preform assembly 50, 52, 54, 56.

Green silicon carbide powder 62 (39 CRYSTOLON ® 90 grit) was also placed into GRAFOIL ® graphite foil box 60 substantially adjacent to the walls of the box 60 and spaced from the preform until a height substantially flush with the top of the preform assembly. An additional amount of the particulate mixture poured around the sides of the preform assembly to a height substantially flush with the top of the preform assembly was reached. A particulate mixture 58 comprising by weight about 15 percent borosilicate glass frit (F-12, Fusion Ceramics, Inc., Carrollton, Ohio.) and the balance 90 grit alumina (E1 ALUNDUM ®, Norton Company) was poured until a depth of about ⅛ inch (3 mm) was reached in the graphite foil box 60 (GRAFOIL ®) which measured about 6 inches (152 mm) square and about 10 inches (254 mm) deep.

The preform assembly 50, 52, 54, 56 discussed above was rotated by about 90° such that the longitudinal axes of the tape cast preform 52 was oriented in a substantially vertical manner. The exposed top surface of the preform assembly 50, 52, 54, 56 was covered with an ⅛ inch (3 mm) thick layer of dry particulate 70:30 weight ratio mixture 64 of 54 and 90 grit green silicon carbides (39 CRYSTOLON ®) to which 2 percent magnesium powder (−325 mesh, Reade Advanced Materials) had been added. An ⅛ inch (3 mm) thick layer of magnesium powder 66 (−100 mesh) was then placed on top of this particulate mixture layer 64.

An ingot of matrix metal 68 comprising by weight about 15 percent silicon, 5 percent magnesium, and the balance aluminum and measuring about 4 inches (102 mm) long by 2 inches (51 mm) wide by ½ inches (13 mm) thick was then placed on top of the magnesium powder layer 66 to serve as a matrix metal reservoir. An additional quantity of the glass frit and alumina particulate mixture 58 was placed into the graphite foil box 60 around the matrix metal ingot 68 until the level of the glass frit mixture 58 was substantially flush with the top of the matrix metal ingot 68.

The graphite foil box 60 and its contents were then placed into a stainless steel boat 70 just slightly larger than the graphite foil box 60. The graphite boat 70 and its contents were then placed into a resistance heated controlled atmosphere furnace. The furnace chamber was evacuated to about 30 inches (762 mm) of vacuum and then backfilled with nitrogen gas. A nitrogen gas flow rate of about 5 liters per minute was established through the furnace. The furnace temperature was raised to about 200° C. at a rate of about 50° C. per hour and held to about 200° C. for about 42½ hours. The temperature was then raised to about 450° C. at a rate of about 50° C. per hour and held at about 450° C. for about 5 hours. The temperature was then raised to about 825° C. at a rate of about 200° C. per hour and held at about 825° C. for about 6.6 hours. The stainless steel boat 70 and its contents were removed from the furnace. The graphite foil box 60 and its contents were removed from the stainless steel boat 70 and placed onto a water cooled aluminum quench plate to directionally solidify the molten metal. To help maintain the temperature gradient, a hot topping particulate mixture (FEEDOL ® 9, Foseco, Inc.) was poured on top of the molten matrix metal reservoir 68. After cooling to substantially room temperature, the graphite foil box 60 was disassembled to reveal that the matrix metal ingot 68 had infiltrated the 19 tape cast preforms 50 to produce 19 thin sheets of metal matrix composite. Each metal matrix composite sheet 50 was separated from the carcass of matrix metal ingot 69.

EXAMPLE 3

Figure 3:
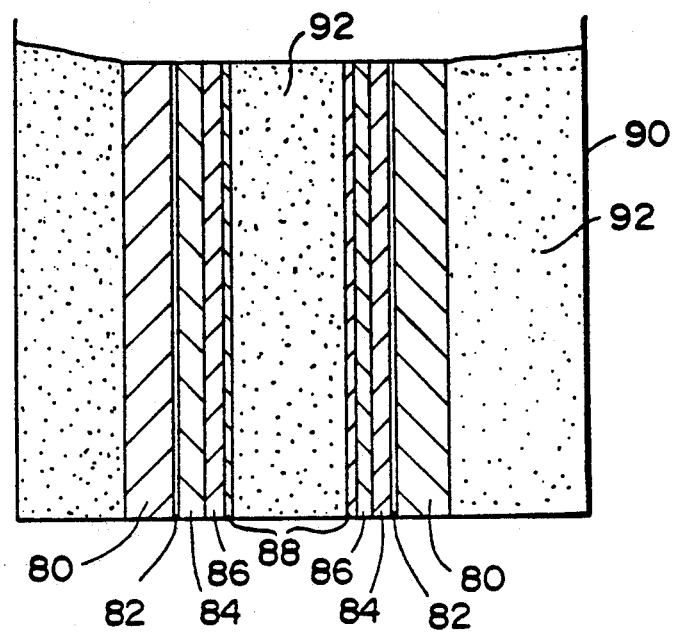
FIG. 3 is a cross-sectional view of the assembly utilized to form a metal matrix composite in accordance with Example 3 of the present invention.

This Example demonstrates another method of forming a metal matrix composite by infiltrating a matrix metal into a tape cast preform. The setup for carrying out the infiltration is shown schematically in FIG. 3.

A tube of matrix metal 80 measuring about 4 inches (102 mm) long and having an outside diameter of about 2½ inches (64 mm) and a wall thickness of about ¼ inch (6 mm) and comprising by weight about 0.4–0.8 percent Si, 0.7 percent Fe, 0.15–0.40 percent Cu, 0.15 percent Mn, 0.8–1.2 percent Mg, 0.04–0.35 percent Cr, 0.25 percent Zn, 0.15 percent Ti and the balance aluminum was first sandblasted on the inside and then sanded by hand on the inside with 240 grit sandpaper. A slurry 82 comprising by weight about 33 percent magnesium particulate (−325 mesh, Hart Corporation, Tamaqua, Pa.) and the balance ethyl alcohol was painted onto the inside of the matrix metal tube and allowed to dry in air for about ½ hour.

A preform was provided by cutting a tape cast ceramic sheet 84 to substantially conform to the interior dimensions of the aluminum matrix metal tube 80. The tape cast ceramic sheet 84 was about 35 mil (0.89 mm) thick and comprised by weight about 6 percent magnesium powder (−325 mesh, Hart Corporation), 28 percent 500 grit green silicon carbide (39 CRYSTOLON ®, Norton Company, Worcester, Mass.), and the balance 220 grit green silicon carbide (39 CRYSTOLON ®). The shape of the preform was determined by placing the tape case ceramic sheet 84 in contact with the interior wall of the tube of matrix metal 80. A second sheet 86 of this 35 mil (0.89 mm) thick tape cast ceramic sheet was cut similarly and placed into the tube of matrix metal 80 and in contact with the exposed surface of the first sheet 84.

A sheet of graphite foil 88 (GRAFOIL ®, Union Carbide Company, Danbury, Conn.) was cut so as to substantially cover the exposed surface of the second tape cast ceramic sheet 86 within the tube of matrix metal 80. The tube of matrix metal 80 and its laminated layers of preform material were placed with the longitudinal axis of the tube oriented vertically into a graphite boat 90 measuring about 6 inches (152 mm) square and about 4 inches (102 mm) in depth. Loose particulate bedding material 92 of alumina (90 grit, 38 ALUNDUM ®) was then poured into the graphite boat 90 and inside of the matrix metal tube 80, to a level substantially flush with the top of the tube.

The graphite boat 90 and its contents were placed into an electric resistance controlled atmosphere furnace. The furnace chamber was evacuated to about 30 inches (762 mm) of mercury vacuum and backfilled with nitrogen gas. Nitrogen was passed through the furnace at a flow rate of about 3 liters per minute. The furnace temperature was increased from room temperature to about 425° C. at a rate of about 50° C. per hour. After maintaining a temperature of about 425° C. for about 5 hours, the temperature was increased to about 800° C. at a rate of about 100° C. per hour. After maintaining a temperature of about 800° C. for about 5 hours, the temperature was decreased to about 675° C. at a rate of about 200° C. per hour. At a temperature of about 675° C., the graphite boat 90 and its contents were removed from the furnace and placed onto a water cooled aluminum quench plate to permit directional solidification. A particulate hot topping material (FEEDOL ® 9, Foseco, Inc., Cleveland, Ohio) was poured onto the top of the alumina bedding material 92 and the molten matrix metal 80. A ceramic fiber blanket (CERABLANKET ®, Manville Refractory Produ..., Denver, Colo.) measuring about 2 inches (51 mm) thick and sufficiently large to cover the entire graphite boat was place over the top of the graphite boat 90. After cooling to substantially room temperature, the matrix metal tube 80 was removed from the graphite boat 90 and the graphite foil layer 88 was removed from the inside of the matrix metal tube 80 to reveal that the matrix metal 80 had infiltrated at least a portion of the two layers of tape cast ceramic preform material 84, 86 to produce a metal matrix composite material. The formed metal matrix composite was tubular and resembled the shape of the original matrix metal.

EXAMPLE 4

Figure 4:
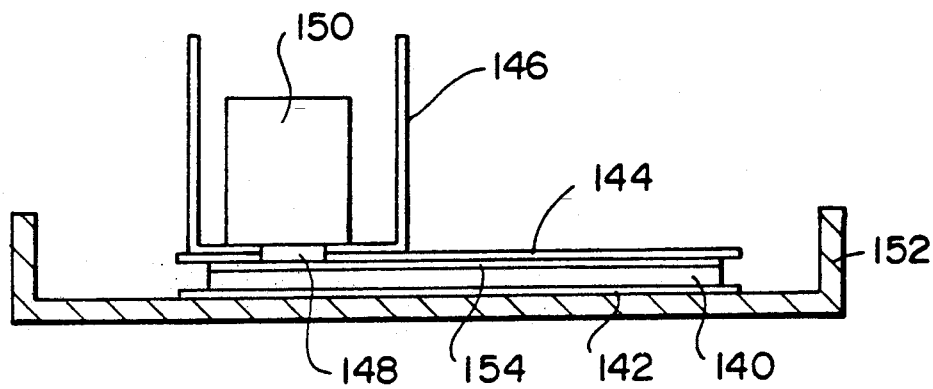
FIG. 4 is a cross-sectional view of the assembly utilized to form a metal matrix composite in accordance with Example 4 of the present invention.

This Example demonstrates that a thin metal matrix composite body can be fabricated by applying a coating of particulate matrix metal onto a thin preform or body of filler material and spontaneously infiltrating the matrix metal into the filler material. The setup for carrying out the infiltration is shown schematically in FIG. 4.

A thin preform 140 of filler material measuring about 9 inches (229 mm) long by about 6 inches (152 mm) wide by about 0.035 inches (0.89 mm) thick was fabricated by tape casting a slurry of filler material. The filler material to be tape cast comprised an approximately 70:30 blend by weight of 220 grit and 500 grit 39 CRYSTOLON ® green silicon carbide particulates which had been ball milled dry for about 24 hours in a porcelain ball mill (U.S. Stoneware Corporation) containing approximately 15/16 inch (24 mm) diameter alumina milling media (Standard Ceramic Supply Company, a Division of Chem-Clay Corporation, Pittsburgh, Pa.). Binders, plasticizers, etc. and by weight about 6 percent magnesium particulate (−325 mesh, Reade Manufacturing Company, Lakehurst, N.J.) were added to the filler material and tape cast into a preform.

The tape cast preform 140 was placed flat onto a first sheet 142 of GRAFOIL ® graphite foil measuring about 0.015 inches (0.89 mm) thick and slightly larger in both length and width dimensions than the tape cast preform 140. A slurry of matrix metal 154 comprising by weight about 33 percent acetone and the balance AESAR ® aluminum powder (−325 mesh, 99.5% pure, AESAR Group of Johnson Matthey Company, Seabrook, N.H.) was painted onto one of the exposed 9 inch by 6 inch surfaces of the tape cast preform 140 until a thickness of about 0.020 inch (0.50 mm) was obtained. A second sheet 144 of GRAFOIL ® having substantially the same dimensions as the first sheet 142 of GRA- FOIL ® was placed upon the slurry of matrix metal 154 upon the tape cast preform 140.

A GRAFOIL ® box 146 for housing additional matrix metal which measured about 2¾ inches (70 mm) square and about 3 inches (76 mm) tall was fabricated from a single sheet of GRAFOIL ® that was cut and folded to form a box open on one end. The folds were cemented together with RIGIDLOCK ® graphite cement and staples were utilized to reinforce the graphite cement. An approximately 1 inch (25 mm) square hole was cut into the bottom of the box. The GRAFOIL ® box 146 was then placed upon the second sheet 144 of GRAFOIL ® overlying the coated tape case preform 140, 154 such that the hole in the graphite box substantially conincided with the hole in the second sheet. About 1-2 grams of magnesium particulate 148 (−100 mesh, Hart Corporation) was sprinkled evenly over the square holes in the GRAFOIL ® box 146 and second sheet of graphite foil 144. An ingot of matrix metal 150 weighing about 282 grams measuring about 1¾ inches (44 mm) square by about 2 inches (51 mm) tall and having substantially the same chemical composition as the slurry of matrix metal 154 was placed into the GRAFOIL ® box 146 and upon the layer of magnesium particulate 148 to form an assembly.

The graphite container 152 for housing the assembly measured about 14 inches (356 mm) long by about 10¼ inches (260 mm) wide by about 1½ inches tall and having a wall thickness of about ¼ inch (6 mm). The assembly was placed into the graphite container 152. The graphite container 152 and its contents were placed into a retort within a furnace at substantially room temperature. The retort was sealed, evacuated to about 30 inches (762 mm) of mercury vacuum and then backfilled with nitrogen gas to substantially atmospheric pressure. A nitrogen gas flow rate of about 4 liters per minute was established through the retort. The temperature in the retort was increased from room temperature to about 450° C. at a rate of about 50° C. per hour. After maintaining a temperature of about 450° C. for about 5 hours, the temperature was then increased to about 810° C. at a rate of about 200° C. per hour. After maintaining a temperature of about 810° C. for about 10 hours, the graphite container 152 and its contents were removed from the retort and placed into a graphite chill plate. A hot topping particulate mixture FEEDOL ® No. 9 was poured on top of the residual molten matrix metal 150. After cooling to substantially room temperature, the assembly was removed from the graphite container 152. The GRAFOIL ® sheets 142, 144 adjacent to what was formerly the tape cast preform 140 and the layer of powdered matrix metal 154 were peeled away to reveal that at least some of the matrix metal 150, 154 had infiltrated at least a portion of the tape cast preform 140 to produce a thin metal matrix composite body. Furthermore, the formed metal matrix composite featured a residual thin layer of matrix metal on one side which was bonded intimately to the thin metal matrix composite body (i.e., the body comprised a macrocomposite consisting of a thin layer of unreinforced matrix metal bonded integrally to a thin layer of metal matrix composite.

EXAMPLE 5

Figure 5:
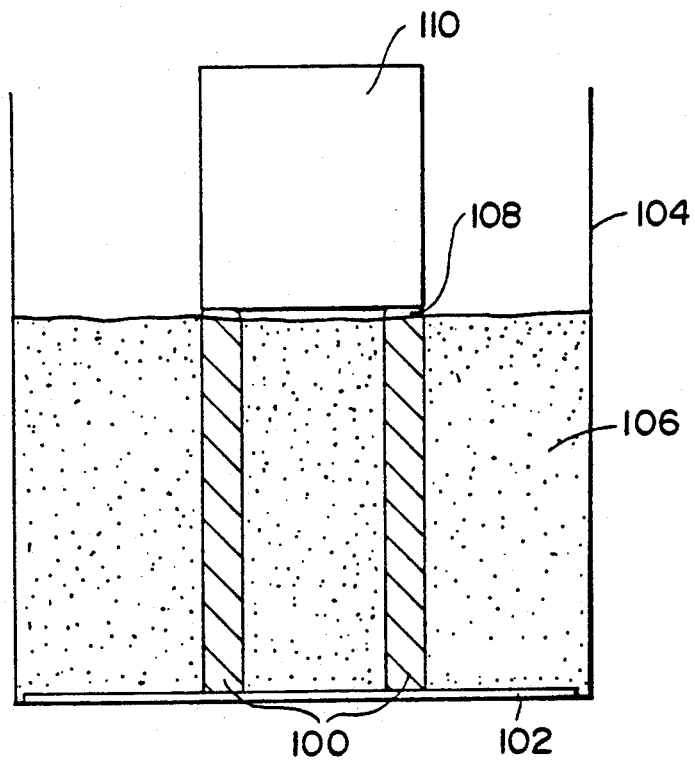
FIG. 5 is a cross-sectional view of the assembly utilized to form a metal matrix composite in accordance with Example 5 of the present invention.

This Example demonstrates that thin metal matrix composite bodies can be produced by infiltrating a slip cast ceramic preform. FIG. 5 shows schematically the setup employed to carry out this infiltration.

The preform comprised prefired and unreacted, as received silicon carbide. The prefired silicon carbide was oxidized to form a protective silica ($SiO_2$) layer on the surface of the particles. Specifically, 500 mesh (17 microns) silicon carbide particulate (39 CRYSTOLON ®, Norton Co., Worcester, Mass.) was loaded into a refractory boat measuring approximately 14 inches (356 mm) by about 11 inches (279 mm) by about 6 inches (152 mm) to a depth of approximately 3 inches (75 mm) which was lined with a ceramic paper (FIBERFRAX ®, SOHIO/Carborundum Co., Niagara Falls, N.Y.). The boat was placed into an electric resistance furnace and heated to about 1325° C. in about 15 hours, held at about 1325° C. for about 24 hours and allowed to cool to room temperature. The silica content of the oxidized powder comprised between about 15 and 25 percent of the total weight of the powder. The partially oxidized powder was comminuted by jaw crushing, followed by sieving until any agglomerates, which may have formed, and were reduced to the original particle size.

A similar treatment was given to the 1000 mesh (6 microns) silicon carbide particulate material (CARBOLON ® F1000, Exolon-ESK, Tonawanda, N.Y.) to form a protective silica layer with the exception that the furnace schedule was modified so that the firing comprised an approximately 3½ hour soak at a temperature of about 1250° C.

A tubular preform was prepared by slip casting a dispersion comprising about 72 weight percent solids silicon carbide. Specifically, about 1400 grams of deionized water was poured into a one gallon plastic jar containing about 10,000 grams of ¼ inch (13 mm) diameter by ¼ inch (13 mm) tall cylindrical alumina grinding media (BURUNDUM ®, U.S. Stoneware, Mahwah, N.J.), to which about 1 gram of dispersant (Darvan 821-A, R. T. Vanderbilt Company, Norwalk, Conn.) was added. Next, about 720 grams of 0.6 micron silicon carbide powder (100 GL, Superior Graphite Company, Chicago, Ill.), about 180 grams of 500 mesh (17 micron) oxidized silicon carbide powder (39 CRYSTOLON ®, Norton Company, Worcester, Mass.), and about 2700 grams of 1000 mesh (6 micron) oxidized silicon carbide powder (CARBOLON ® F1000, Exolon-ESK, Tonawanda, N.Y.) were added to the one-gallon plastic jar.

The slip was ball milled for about 48 hours after which the grinding media were removed and the slip was roll mixed for about an additional 24 hours. The slip was de-aired to about 30 inches (762 mm) of mercury vacuum in a vacuum chamber (Super Vacmac Model No. 160-015, Swest Corporation, Dallas, Tex.) for about 5 minutes. The container of slip was removed from the vacuum chamber and a viscosity measurement was taken using a Model RVT Brookfield viscometer (Brookfield Engineering Laboratories, Inc., Stoughton, Mass.) using a number 4 spindle. The viscosity of the slip was between about 50 and about 100 centipoise.

A two piece plaster of paris mold having a cylindrical cavity measuring about 5 inches (127 mm) in height and about 1¾ inches (44 mm) in diameter was premoistened with water on its casting surfaces. The preform was fabricated by casting the slip into the plaster of paris mold cavity pouring slowly down the side of the mold to avoid trapping air in the slip. Substantially all of the cavity volume was filled with slip. After a thickness of about 0.44 inches (11 mm) of silicon carbide particulate cake had built up on the wall of the plaster of paris mold, the residual slip was poured out of the mold to expose the slip cast preform which was permitted to partially dry inside of the mold for about 45 minutes. During this partial drying stage, the preform shrunk away from the walls of the mold by an amount sufficient to allow the mold halves to be separated without breaking the preform. The preform was then removed from the mold and allowed to dry on a drying rack for at least 16 hours in air at ambient temperature followed by a drying period of at least 6 hours in a forced air drying oven at a temperature of about 40° C.

The cast and dried preform was sanded with sandpaper to provide clean, smooth surfaces free of casting mold lines. The sanded preform was then placed on top of slotted fire bricks and loaded into a resistance heated air atmosphere furnace at room temperature. The furnace was heated from room temperature to about 1025° C. over an approximately 8 hour period and held at about 1025° C. for about 24 hours, after which time the power was turned off and the furnace was allowed to naturally cool to room temperature. After retrieval from the furnace, the bottom of the fired slip cast preform was removed with a saw to provide a tubular preform 100 which was open on both ends and measured about 3¾ inches (89 mm) in length.

A graphite foil sheet 102 (GRAFOIL®, Union Carbide Company, Danbury, Conn.) measuring about 3 inches (76 mm) in diameter and about 15 mils (0.38 mm) thick was placed into the bottom of a graphite crucible 104 measuring about 3 inches (76 mm) in diameter and 5 inches (127 mm) in height and having a wall thickness of about ⅛ inch (3 mm). The tubular preform 100 was placed into the graphite crucible 104 and centered on the graphite foil sheet 102 at the bottom of the crucible 104. The tubular preform 100 was oriented vertically with one open end exposed. A bedding particulate mixture 106 comprising by weight about 15 percent borosilicate glass frit (P54, Mobay Chemical Corporation, Inorganic Chemicals Div., Baltimore, Md.) and the balance equal proportions, respectively, of 90, 220, and 500 grit alumina (E1 ALUNDUM®, Norton Company, Worcester, Mass.) was poured into the graphite crucible 104 and the interior of the tubular preform 100 up to a level substantially flush with the top of the preform. Particulate magnesium metal 108 (−50 mesh, Hart Corporation, Tamaqua, Pa.) was sprinkled evenly over the exposed end of the preform tube at a concentration of about 0.01 gram of magnesium per square centimeter. A disc of matrix metal 110 measuring about 3.25 inches (83 mm) in diameter and about 1 inch (25 mm) in height weighing about 362 grams and comprising by weight about 15% silicon, 5% magnesium, and the balance aluminum was placed directly over the magnesium particulate coating 108 on the preform tube 100.

The graphite crucible 104 and its contents were placed into an electric resistance controlled atmosphere furnace. The furnace chamber was evacuated and then backfilled with nitrogen gas back to approximately atmospheric pressure. A nitrogen gas flow rate through the furnace of about 3.5 liters per minute was established. The furnace temperature was increased from substantially room temperature to a temperature of about 825° C. at a rate of about 150° C. per hour. After maintaining a temperature of about 825° C. for about 20 hours, the temperature was decreased to about 675° C. at a rate of about 200° C. per hour. At a temperature of about 675° C., the graphite crucible 104 and its contents were removed from the furnace and directionally solidified by placing the graphite crucible 104 onto a water cooled aluminum quench plate. A particulate hot topping material (FEEDOL® 9, Foseco, Inc., Cleveland, Ohio) was placed onto the molten matrix metal 110 to enhance the temperature gradient during directional solidification. A 2 inch (51 mm) thick layer of ceramic fiber insulation (CERABLANKET®, Manville Refractory Products, Denver, Colo.) was placed over the top of the graphite crucible 104. After cooling to substantially room temperature, the contents of the graphite crucible 104 were removed to reveal that the matrix metal 110 had infiltrated into at least a portion of the slip cast preform 100 to produce a metal matrix composite.

EXAMPLE 6

Figure 6A:
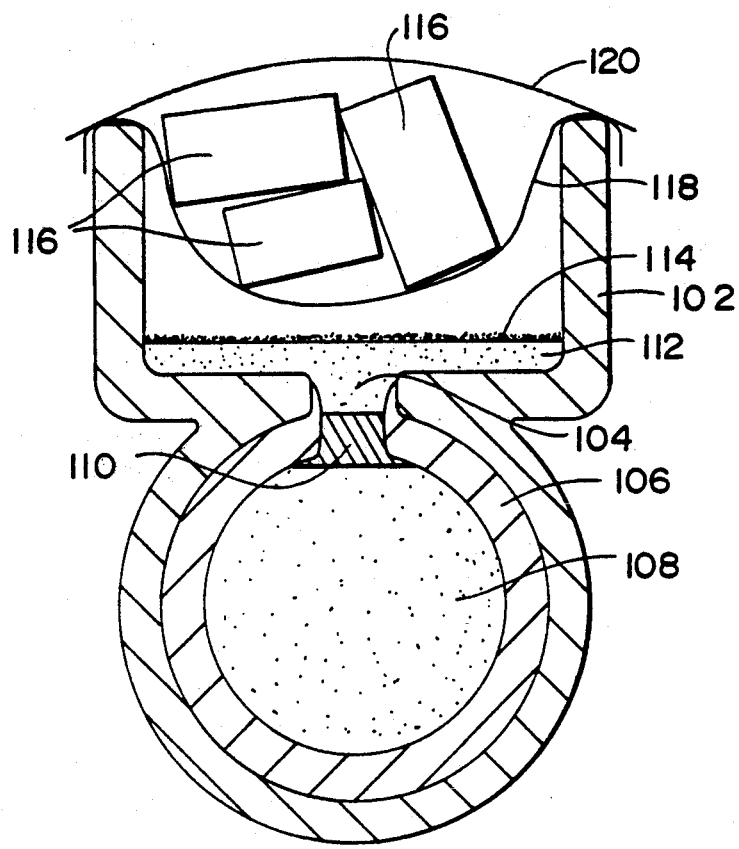
FIGS. 6(a) and 6(b) are cross-sectional views of the assembly utilized to form a metal matrix composite in accordance with Example 6 of the present invention.
Figure 6B:
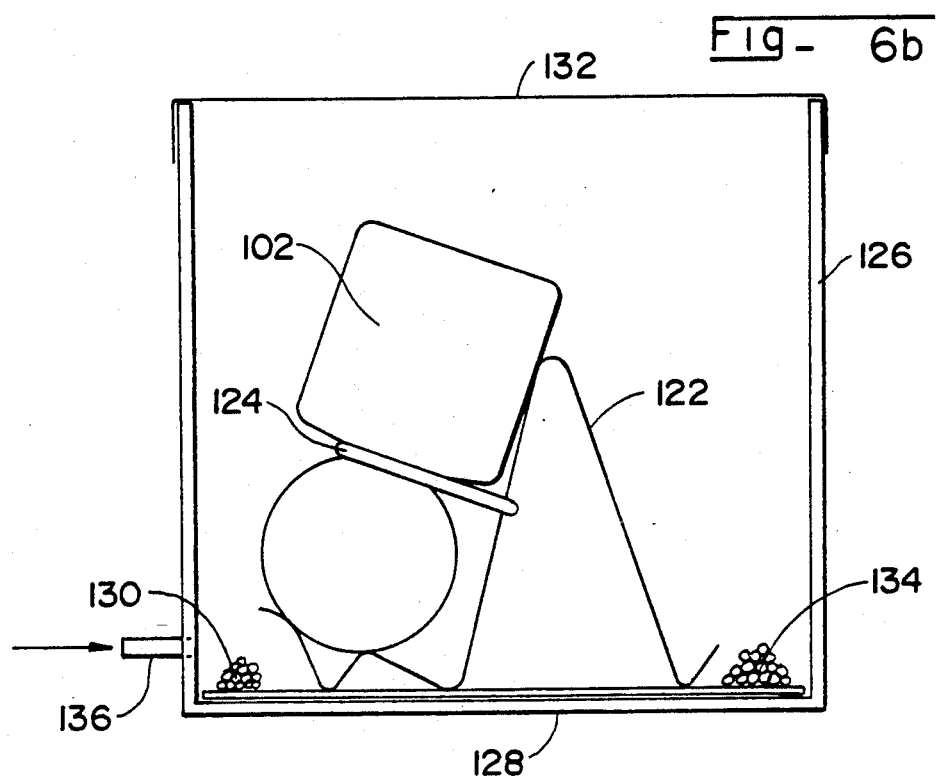

This Example illustrates a technique for making a hollow metal matrix composite body. Specifically, this Example will demonstrate that a metal matrix composite body in the form of a hollow shell can be fabricated by slip casting a filler material admixture to make a preform and then filling the interior of the resulting slip cast body with an uninfiltratable particulate mass. FIGS. 6a and 6b show in schematic form the setup used to carry out the infiltration.

A sphere measuring about 3 inches (76 mm) in diameter and having 12 regularly spaced truncations each measuring about 11/16 inch (17 mm) in diameter was spray coated with Grade MS-122 fluorocarbon release agent dry lubricant (Miller Stevenson Company, Inc., Danbury, Conn.). Grade GI-1000 rubber molding compound (Plastic Tooling Supply Company, Exton, Pa.) was cast around the spray coated sphere to form a rubber mold inversely replicating the shape of the sphere. After curing the rubber molding compound in air for about 12 hours, the spray coated sphere was separated from the mold. An exact wax model of the original sphere was then made by casting Grade 5550-K. GRN. FLK. molten wax (Yates Manufacturing Company, Chicago, Ill.) at a temperature of about 110° C. into the rubber mold cavity left after removing the sphere. The wax was then allowed to cool to substantially room temperature. After the wax had cooled to substantially room temperature, the wax model was separated from the rubber mold. A similar process was used to fabricate a wax model for the matrix metal reservoir portion of the subsequent investment casting. The reservoir measured about 4 inches (102 mm) in diameter and about 3 inches (76 mm) tall. Before solidification of the molten wax reservoir model, however, a steel mandrel was inserted into the wax; the subsequent solidification of the wax locked the mandrel in place.

The two wax models, that for the sphere itself and that for the matrix metal reservoir, were joined at one of the flat, circular truncations on the sphere to produce an investment pattern. The means of joining the two wax models comprised welding with additional molten wax.

An investment shell 102 comprising CaCO₃ was then built up on the surface of the wax investment pattern. Specifically, the wax investment pattern was dipped into a slip or slurry comprising by weight about 30.0 percent NYACOL® 1430AT colloidal silica (Nyacol Products, Inc., an affiliate of PQ Corporation, Ashland, Mass.), about 66.1 percent HUBERCARB® Q 325 calcium carbonate (−325 mesh, J. M Huber Corporation, Calcium Carbonate Div., Quincy, Ill.), about 3.0 percent 500 grit TETRABOR® boron carbide (Exolon-ESK Corporation, Tonawanda, N.Y.), about 0.6 percent VICTOWET® 12 wetting agent (Ransom and Randolph, Inc., Maumee, Ohio) and about 0.3 percent DCH Antifoam defoamer (Ransom and Randolph, Inc.). The slip coated wax model was then dusted or stuccoed with dry 90 grit RANCO ® SIL No. A silica sand (Ransom and Randolph, Inc.). The wax model and its developing investment shell 102 were then dried for about ¼ hour at a temperature of about 65° C. The dried investment shell 102 was then dipped for about 2 seconds into a bath of NYACOL ® 1430 AT colloidal silica. This dip-dust-dry-wet sequence was then immediately repeated. Next, the coated wax investment pattern was immediately dipped into a secondary investment slurry comprising by weight about 1 part REDIP ® indicator (Ransom and Randolph, Inc.), about 2 parts VICTOWET ® 12 wetting agent, about 56 parts distilled water, about 274 parts NYACOL ® 830 colloidal silica and about 700 parts RANCO ® SIL No. 2 silica powder (Ransom and Randolph, Inc.) to yield a slurry viscosity corresponding to about 15 seconds in a Zahn number 4 cup. The slurry coated investment shell was then stuccoed or dipped in a fluidized bed of approximately 30 grit RANCO ® SIL B silica sand (Ransom and Randolph, Inc.). The stuccoed investment shell was again dried at a temperature of about 65° C. for about ½ hour or until the REDIP ® indicator in the shell changed in color from yellow-green to deep orange. This second dip-stucco-dry sequence was then repeated an additional four to five times. No prewetting of the investment shell with colloidal silica between dippings in the secondary investment shell slurry was required. The coated wax investment pattern was then placed into a steam autoclave to remove the wax pattern from the surrounding investment shell. After autoclaving at a temperature corresponding to a water vapor pressure of about 100 psi (690 kPa) for about five minutes, substantially all of the wax had been removed from the surrounding investment shell 102. The investment shell 102 was then removed from the steam autoclave and placed into a resistance heated air atmosphere furnace at substantially room temperature. The furnace temperature was then increased to about 850° C. at a rate of about 800° C. per hour. After maintaining a temperature of about 850° C. for about 4 ½ hours to rigidize the investment shell 102, the shell was furnace cooled to a temperature of about 600° C. The investment shell mold 102 was left in the approximately 600° C. furnace until it was ready to be used for the pressureless metal infiltration process.

The resultant mold comprised a spherical end portion that inter-connected via a tubular neck region to an open ended cylinder.

About 1,126 grams of a slip comprising by weight about 53.3 percent 500 grit green silicon carbide (39 CRYSTOLON ®, Norton Company, Worcester, Mass.) about 13.3 percent 1000 grit 39 CRYSTOLON ® green silicon carbide, about 31.1 percent acetone, about 2.0 percent magnesium particulate (−325 mesh, Reade Manufacturing Company, Lakehurst, N.J.) and about 0.3 percent Q-PAC ™ polypropylene carbonate binder (Air Products and Chemicals, Inc., Emmaus, Pa.) was prepared. Specifically, the green silicon carbide and magnesium particulates were placed into a dry 8.9 liter porcelain ball mill (U.S. Stoneware Corp., Mahwah, N.J.) containing about 4000 grams of 15/16 inch (24 mm) diameter milling media (Standard Ceramic Supply Co., a Division of Chem-Clay Corp., Pittsburgh, Pa.). After ball milling the particulates for about an hour, all but about 772 grams of ball milled particulates were removed from the mill. The removed ball milled particulates were sealed tightly in a NALGENE ® plastic jar (Nalge Company, Rochester, N.Y.) and stored for subsequent use. The acetone and the Q-PAC ™ binder were added to the porcelain ball mill to form the slip. The slip was ball milled for about 1 hour.

The slip was poured into the spherical portion of the mold discussed above. The spherical portion of the mold was filled with the slip. A rubber stopper was inserted into the neck region 104 between the spherical portion of the mold and the attached cylindical portion of the mold. Having isolated the two portions of the mold in this matter, the mold was rotated to allow the slip to evenly coat the surfaces of the spherical portion of the mold. Periodic removal of the rubber stopper and inspection of the slip casting process revealed that after approximately 5 minutes a ⅜ inch (10 mm) to ½ inch (13 mm) thick coating had been built up on the inner wall of the spherical portion of the mold. The remaining slip was poured from the mold. The resultant slip cast coating comprised a preform 106 whose inner surface was approximately spherical and whose outer surface closely matched that of the truncated sphere portion of the original wax investment pattern in size and shape.

Loose 500 grit alumina powder 108 (38 ALUNDUM ®, Norton Company) was then poured into the interior of the slip cast preform within the mold to a level substantially flush with the bottom of the neck region 104. The 38 ALUNDUM ® will not be substantially infiltrated with the matrix metal because this material does not contain magnesium powder. Additional slip 110 was then poured into the neck region 104 and allowed to slip cast against the 38 ALUNDUM ® until a cast thickness of about ⅜ inch (10 mm), to about ½ inch (13 mm) was achieved, thereby eliminating the discontinuity in the slip cast shell 106.

a dry filler admixture 112 having the same composition as the admixture which was utilized to make the slip was then poured into the bottom of the cylinder portion of the mold until a depth of about ¼ inch (6 mm) was reached. Magnesium particulate 114 (−50 mesh, Reade Manufacturing Company) was then sprinkled evenly over the top of this dry loose filler material admixture until a concentration of about 6 milligrams per square centimeter was obtained.

Several ingots of a matrix metal 116 comprising by weight about 12 percent silicon and the balance commercially pure aluminum, weighing a total of about 1200 grams, were placed on top of copper foil slings 118 folded over the side of the reservoir chambers such that the ingots remained suspended over the magnesium particulate layer 114 and the filler material admixture 112 in the bottom of the cylindrical portion of the mold. A PERMA FOIL graphite foil cover sheet 120 (TT America, Portland, Ore.) sufficiently large to cover the opened end of the cylindrical portion of the mold was placed over the matrix metal.

The investment shell mold 102 and its contents were placed onto a stainless steel holder 122 and secured with copper foil straps 124. The stainless steel holder 122 and its contents were then placed into a stainless steel can 126 measuring about 10 inches (254 mm) long by about 10 inches (254 mm) wide by about 10 inches (254 mm) tall. The bottom of the can was covered with a graphite foil sheet 128 having substantially the same dimensions as the length and width of the can. About 10 grams each of Grade RMC-3 magnesium turnings 130 (Reade Manufacturing Company) and TI-LOY 97 titanium sponge 134 (Chemically Company, Bryn Mawr, Pa.) were placed into the can outside of the stainless steel holder. The titanium sponge and magnesium turning function as a gather to absorb oxygen moisture. Two copper foil sheets 132 each measuring about 16 inches (406 mm) long by about 14 inches (356 mm) wide by about 6 mils (0.15 mm) thick were placed over the opening of the stainless steel can 126. The portions of the copper sheets 132 extending over the sides of the can 126 were folded down against the sides of the can 126 to form an isolated chamber. A nitrogen gas purge tube 136 was provided through one side of the can 126.

The stainless steel can 126 and its contents were placed into an electric resistance atmosphere furnace. A nitrogen gas flow rate of about 15 liters per minute through the purge tube 136 into the stainless steel can 126 was established. The furnace was heated from substantially room temperature to a temperature of about 200° C. at a rate of about 400° C. per hour. After maintaining a temperature of about 200° C. for about 1 hour, the temperature was increased to about 520° C. at a rate of about 400° C. per hour. After maintaining a temperature of about 520° C. for about 1 hour, the temperature was increased to about 780° C. at a rate of about 400° C. per hour. After maintaining a temperature of about 780° C. for about 3 hours, the nitrogen gas purge tube 136 was disconnected. The stainless steel can 126 and its contents were removed from the furnace.

The copper foil sheets 132 and the stainless steel holder 122 and its contents were removed from the stainless steel can 126. The stainless steel holder 122 and its contents were placed onto a water cooled copper quench plate to permit directional solidification. To assist in the directional solidification of the matrix metal, air was blown around the bottom of the stainless steel holder 122 adjacent to the water cooled copper quench plate. FEEDOL ® 9 hot topping particulate mixture (Foseco, Inc., Cleveland Ohio) was poured on top of the molten matrix metal 116. After the stainless steel holder 122 and its contents had cooled to substantially room temperature, the investment shell mold 102 and its contents were removed from the holder 122. The investment shell mold 102 was removed with low force hammer blows to reveal that at least some of the matrix metal 116 had infiltrated the slip cast filler admixture 106 adjacent to the investment shell 102 to form a metal matrix composite body having substantially the same shape as the original near-spherical wax investment pattern. Residual matrix metal 116 was removed from the metal matrix composite body with a diamond saw. An approximately ⅜ inch (10 mm) diameter hole was then drilled in what was originally the neck region 104, 110 and the uninfiltrated alumina powder 108 inside of the metal matrix composite shell was blown out with compressed air. Finally, the metal matrix composite body was sliced in half using a diamond saw to reveal a rough surface on the inside of the metal matrix composite shell. Matrix metal infiltration into the 500 grit 38 ALUNDUM ® alumina powder which did not contain magnesium powder that was inside of the hollow slip cast preform was limited to less than 1/32 of an inch (0.8 mm).

EXAMPLE 7

Figure 7:
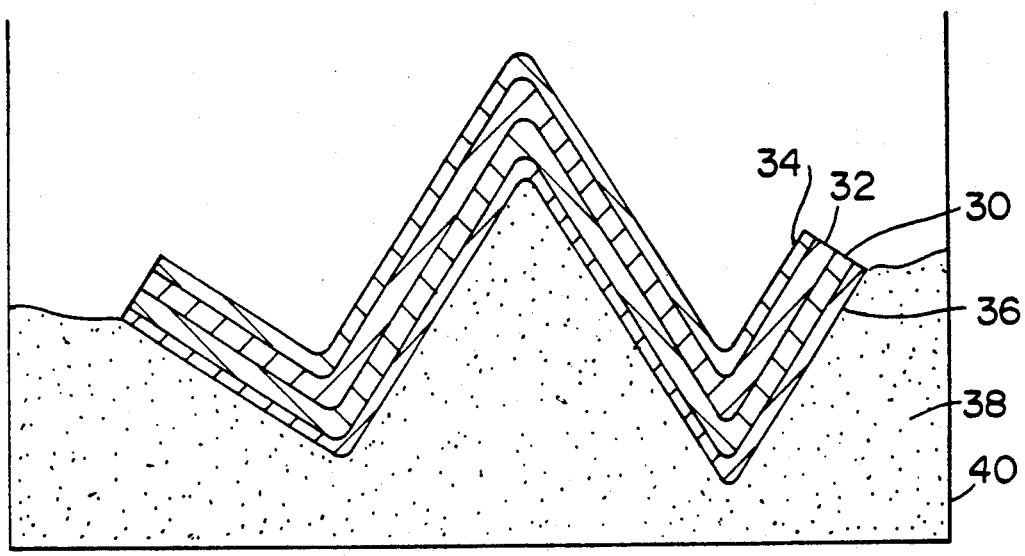
FIG. 7 is a cross-sectional view of the assembly utilized to form a metal matrix composite in accordance with Example 7 of the present invention.

This Example illustrates that it is possible to form a metal matrix composite body by coating a thin sheet of a matrix metal on one side with a powder of ceramic filler material. This Example further illustrates that metal matrix composites formed according to the present invention are not limited to a flat sheet but may possess a complex shape. FIG. 7 illustrates schematically the setup used to carry out the infiltration.

The coating 32, 34 applied to a thin sheet of matrix metal 30 was prepared from about 450 grams of dried tabular alumina powder (−325 mesh T-64, Alcoa, Industrial Chemical Div., Bauxite, Ark.). The dried tabular alumina was placed into a dry porcelain ball mill having about 8 liters of internal volume. About 900 grams of dense alumina milling media measuring about 15/16 inch (24 millimeters) in diameter was added to the mill and the alumina was ball milled for about six hours. About 61 percent by weight of the milled tabular alumina, about 5 percent of magnesium powder (−325 mesh, Reade Manufacturing Co., Lakehurst, N.J.), about 23 percent ethanol and about 1 percent XUS 40303.00 Experimental Binder (Dow Chemical Company, Midland, Mich.) were mixed together to form a slurry.

The matrix metal sheet 30 to be coated comprised by weight about 0.4–0.6% silicon, ≦0.15% copper, ≦0.7% iron, 0.8–1.0% magnesium, ≦0.15 manganese, ≦0.15% zinc, 0.15–0.35% chromium, and the balance aluminum and measured about 7 inches (178 mm) square by about 63 mils (1.6 mm) thick. The matrix metal sheet 30 was folded three times to produce a "M" or zigzag shape. One side of the folded matrix metal sheet 30 was cleaned by grit blasting. The grit blasted surface was coated with a slurry comprising by weight about 67 percent magnesium powder 32 (−325 mesh, Reade Manufacturing Co.) and ethanol. The coating was permitted to dry in air at ambient temperature for about an hour. The dry and coated matrix metal sheet 30, 32 was weighed which revealed that about 1 gram of magnesium powder 32 had been applied to a surface of the sheet 30.

The slurry 34 discussed above comprising the ball milled tabular alumina was spray coated on top of the magnesium powder coating 32. The coated and folded matrix metal sheet 30, 32, 34 was again dried in air at ambient temperature for about 3 to 5 hours. The dry weight of the second coating 34 was about 180 grams. A sheet of graphite foil 36 (GRAFOIL ®, Union Carbide Co.) measuring about 7 inches (178 mm) square and about 10 mils (0.25 mm) thick was folded so as to conform to the shape of the coated matrix metal sheet. The folded graphite foil 36 was placed into contact with the uncoated side of the matrix metal sheet 30.

A support bedding 38 comprising green silicon carbide particulate (39 CRYSTOLON ®, 90 grit, Norton Company, Worcester, Mass.) was poured into a graphite boat 40 measuring about 14 inches (356 mm) long by about 11 inches (279 mm) wide by about 8 inches (203 mm) tall to a depth of about 3 inches (76 mm). The coated matrix metal sheet 30, 32, 34 and graphite foil 36 assembly were placed upon the green silicon carbide support bedding 38 within the graphite boat 40 such that the graphite foil 36 contacted silicon carbide 38. The coating 34 on top of the matrix metal sheet 30 was left exposed to the atmosphere.

The graphite boat 40 and its contents were placed into an electric resistance controlled atmosphere furnace. The furnace atmosphere was evacuated to 30 inches (762 mm) of mercury vacuum and backfilled with nitrogen gas. A nitrogen flow rate of about 3 liters per minute was established through the furnace. The furnace temperature was raised from room temperature to about 200° C. at a rate of about 200° per hour and held at about 200° C. for about 46 hours. The temperature was raised to about 460° C. at a rate of about 200° per hour and held at about 460° C. for about 5 hours. The temperature was then raised to about 490° C. at a rate of about 10° C. per hour and held at about 490° C. for about 1 hour. The temperature was raised to about 550° C. at a rate of about 150° C. per hour and held at about 550° C. for about 1 hour. The temperature was raised to about 775° C. at a rate of about 150° C. per hour and held at about 775° C. for about 5 hours. The temperature was lowered to about 760° C. at a rate of about 150° C. per hour. When a reduced temperature of about 760° C. had been reached, the graphite boat 40 was removed from the furnace and placed on a water-cooled aluminum quench plate. After cooling to substantially room temperature, the contents were removed from the graphite boat 40 and inspected. It was discovered that the matrix metal sheet 38 had infiltrated the coating of alumina 34 on its surface. It was also observed that some of the matrix metal 30 had contacted the graphite foil 36 and had infiltrated a portion of the silicon carbide support bedding 38 underneath.

EXAMPLE 8

Figures 8A, 8B:
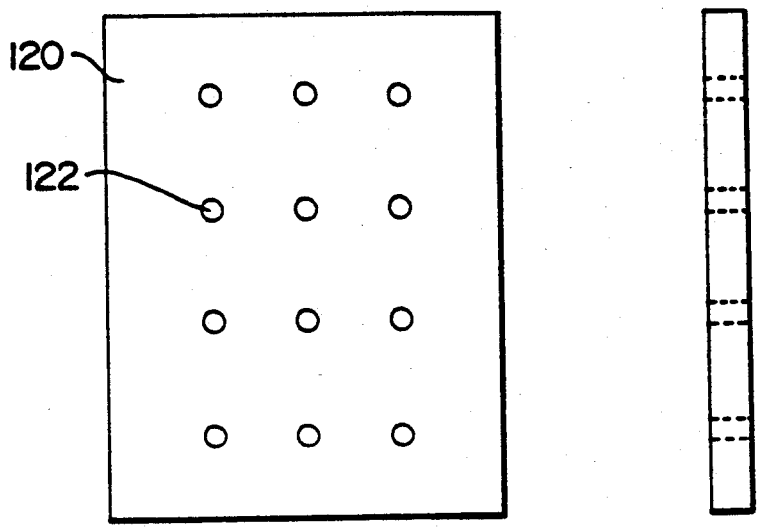
FIGS. 8(a), 8(b), and 8(c) are cross-sectional views of the assembly utilized to form a metal matrix composite in accordance with Example 8 of the present invention.
Figure 8C:
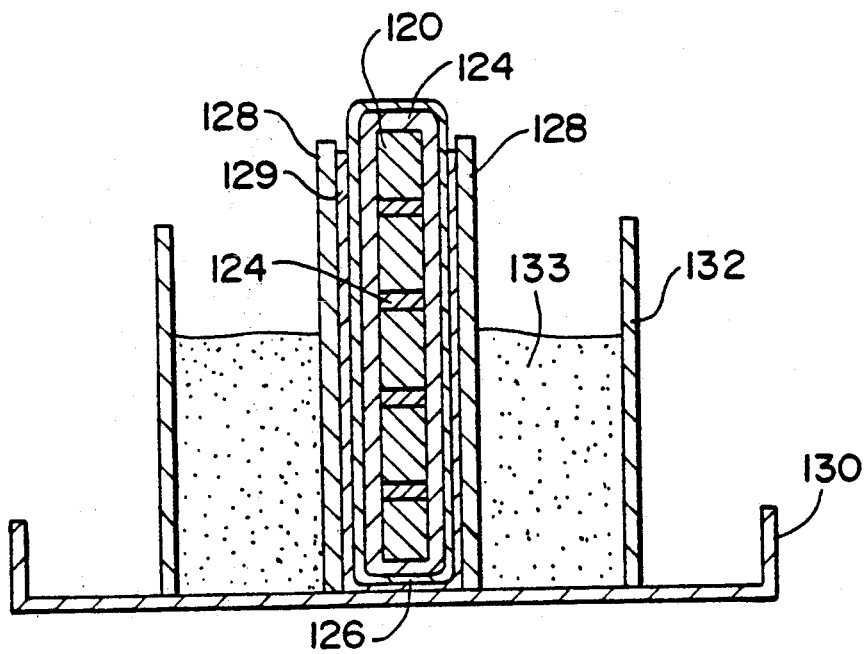

This Example demonstrates that thin metal matrix composite bodies containing channels which inversely replicate the configuration of the matrix metal can be fabricated according to the present invention. FIG. 8c illustrates schematically the setup for carrying out the inverse shape replication fabrication process.

A sheet of matrix metal 120 measured about 7 inches (178 mm) long by about 3 ½ inches (89 mm) wide by about ⅛ inch (3 mm) thick. The sheet of matrix metal weighed about 127 grams and had 12 regularly spaced ⅜ inch (10 mm) diameter through holes 122 as shown in FIG. 8a and 8b. The sheet of matrix metal comprised by weight about 0.4-0.8 percent silicon, ≦0.7 percent iron, about 0.15-0.40 percent copper, ≦0.15 percent manganese, about 0.8-1.2 percent magnesium, about 0.04-0.35 percent chromium, ≦0.25 percent zinc, ≦0.15 percent titanium, and the balance aluminum. The metal matrix sheet 120 was prepared by sandblasting to remove any surface oxide and then cleaned with ethyl alcohol to remove any debris from the sandblasting operation.

A slurry of filler material for coating the sheet of matrix metal comprised by weight about 3000 grams of Grade T-64 tabular alumina (Alcoa Industrial Chemicals Division, Bauxite, Ark.) about 240 grams of magnesium particulate (−325 mesh, Reade Manufacturing Company, Lakehurst, N. J.), about 162 grams of Grade XUS 40303.00 Experimental Binder (Dow Chemical Corporation, Midland, Mich.) and about 1038 grams of ethyl alcohol. The slurry was prepared by dissolving the binder into the ethyl alcohol and stirring in the particulates of tabular alumina.

The matrix metal sheet 120, discussed above, was dipped into the slurry to form an adherent coating of a filler material 124 on the sheet of matrix metal 120. The coated matrix metal sheet 120, 124 was then placed into a forced air drying oven and dried for about 15-30 minutes at a temperature of about 78° C. The dip coating and drying operation was repeated to produce a total of 3 layers of filler material 124 on the matrix metal sheet 120. The 12 regularly spaced ⅜ inch (10 mm) through holes of the sheet of matrix metal were substantially filled with filler material 124. The total weight of dried filler material was about 131 grams.

The coated sheet of matrix metal 120, 124 was then encased within a single sheet of GRAFOIL ® graphite foil 126 which measured about 15 mils (0.38 mm) thick. The sheet of coated matrix metal 120, 124 was encased by wrapping and folding the GRAFOIL ® around the coated sheet. The coated and wrapped sheet of matrix metal 120, 124, 126 was cemented between two plates of graphite 128 each measuring about 8 inches (203 mm) long by about 4 inches (102 mm) wide by about ½ inch (13 mm) thick, by applying RIGIDLOCK ® graphite cement 129 (Polycarbon Corporation, Valencia, Calif.) to the surfaces to be bonded together in order to form an assembly.

The assembly comprising the coated 124 and wrapped 126 sheet of matrix metal 120 which was sandwiched between the graphite plates 128 was oriented vertically about the longitudinal axis of the assembly within a graphite box 130 having external dimensions of about 14 inches (356 mm) long, by about 10¼ inches (260 mm) wide, by about 1½ inches (38 mm) tall and having a wall thickness of about ¼ inch (6 mm). A graphite fixture 132 open at both ends measuring about 8 inches (203 mm) long by about 4 inches (102 mm) wide by about 6 inches (152 mm) tall and having a wall thickness of about ¼ inch (6 mm) was placed into the graphite box 130 and around the assembly 120, 124, 126, 128. A bedding material admixture comprising by weight about 15 percent Grade F-69 glass frit (Fusion Ceramics, Inc., Carrollton, Ohio) and the balance equal weight proportions of 90 grit, 220 grit and 500 grit E1 ALUNDUM ® alumina (Norton Company, Worcester, Mass.) was poured into the region between the graphite fixture 132 and the assembly 120, 124, 126, 128 until the bedding material 133 obtained a depth of about 4 inches (102 mm).

The graphite box 130 and its contents were placed into a retort within a furnace at substantially room temperature. The retort was sealed, evacuated to about 30 inches (762 mm) of mercury vacuum, and then back-filled with nitrogen gas to substantially atmospheric pressure. A nitrogen gas flow rate of about 5 liters per minute was established through the furnace. The temperature in the retort was increased from room temperature to about 460° C. at a rate of about 200° C. per hour. After maintaining a temperature of about 460° C. for about 5 hours, the temperature was increased to about 490° C. at a rate of about 10° C. per hour. After maintaining a temperature of about 490° C. for about 1 hour, the temperature was increased to about 800° C. at a rate of about 200° C. per hour. After maintaining a temperature of about 800° C. for about 6 hours, the temperature was decreased to about 675° C. at a rate of about 200° C. per hour. At a temperature of about 675° C., the graphite box 130 and its contents were removed from the retort and placed onto a water cooled aluminum quench plate.

After cooling to substantially room temperature, the assembly 120, 124, 126, 128 was removed from the bedding material 133 and disassembled to reveal that virtually all of the matrix metal 120 had infiltrated the filler material admixture coating 124 to produce a double-walled metal matrix composite body. The region defined between the metal matrix composite walls comprised empty space except for those areas which correspond to the location of the approximately ⅜ inch (10 mm) diameter through holes 122 in the original sheet of matrix metal 120 which had been filled with filler material 124. The filler material 124 within the holes 122 was subsequently spontaneously infiltrated with matrix metal 120 during the pressureless metal infiltration process to produce bridges or bonding joints roughly ⅜ inch (10 mm) in diameter that joined the two walls of the formed metal matrix composite. Thus this Example illustrates that a thin double-walled metal matrix composite body having inversely replicated metal matrix composite structures between the walls can be produced.

EXAMPLE 9

Figure 29:
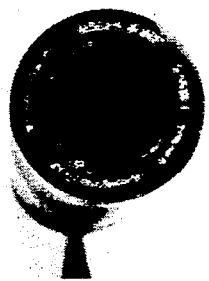
FIG. 29 is a photograph of a polymer filled metal matrix composite body formed in accordance with Example 21.

This Example demonstrates that a metal matrix macrocomposite body can be fabricated to incorporate a polymer reinforcement material. The set-up employed to fabricate the metal matrix composite portion of the macrocomposite body was substantially the same as that illustrated in FIG. 29.

The fabrication of a pair of concentric metal matrix composite tubes joined at various locations with bridging joints or channels of metal matrix composite material was substantially the same as that described in Example 21 with the following exceptions. In the present Example, the mass of the filler material admixture which was vibration packed around the magnesium particulate coated matrix metal tube amounted to about 125 grams. Likewise, the matrix metal tube measured about 1.25 inches (32 mm) in outside diameter by about 1.075 inches (27 mm) in inside diameter by about 5.0 inches (127 mm) in length and had a mass of about 62 grams.

After fabrication of the joined concentric metal matrix composite tubes, the joined tubes were given a cleaning operation. Specifically, the joined tubes were grit-blasted on their exterior and interior surfaces and then rinsed with dehydrated ethyl alcohol to remove any debris from the grit-blasting operation. The cleaned metal matrix composite body was then allowed to dry in air at ambient temperature.

A polymeric foam material was then prepared so as to fill the cavities between the joined concentric metal matrix composite tubes. Specifically, about 51.2 grams of FLEXIPOL ® FP 252A (The Flexible Products Company, Marietta, Ga.) was hand mixed using a tongue depressor into about 100 grams of FLEXIPOL ® FP 252B contained within a 500 ml plastic beaker. After mixing thoroughly, the mixture was agitated with the tongue depressor for about 30 seconds. The joined metal matrix composite concentric tube assembly was oriented vertically and placed upon a paper towel. The exposed cavity between the concentric metal matrix composite tubes was then filled with the polymeric mixture. The metal matrix composite concentric tube assembly was substantially completely filled. The liquid polymer filled metal matrix composite tubr assembly was then allowed to sit undisturbed for about 30 minutes to allow the liquid polymer to cure. Upon curing, the mixture of the liquid polymer precursor compounds FLEXIPOL ® FP 252A and FLEXIPOL ® FP 252B yielded a self-supporting polyurethane foam. The resulting macrocomposite thus comprised concentric tubes of metal matrix composite material joined together at various locations with additional metal matrix composite material with the remaining space between the tubes filled with the formed polyurethane foam.

This Example has therefore demonstrated that by extending the concept of fabricating a metal matrix composite body having inversely replicated channels that by filling said channels with a polymeric material that a polymer reinforced metal matrix macrocomposite body can be formed. A photograph of the formed macrocomposite in shown in FIG. 32.

EXAMPLE 10

Figure 9:
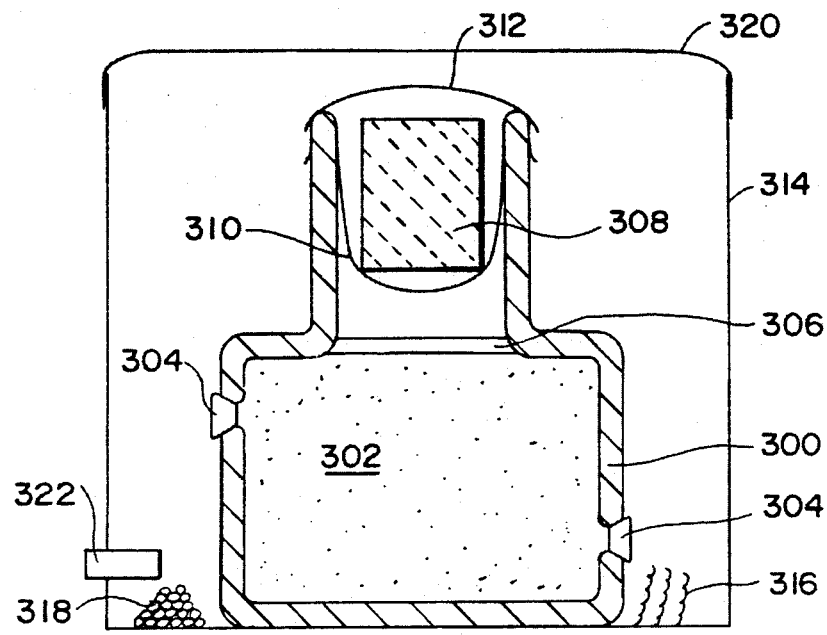
FIG. 9 is a cross-sectional view of a lay-up used to make an "A" frame metal matrix composite body in accordance with Example 9.

This Example demonstrates that thin metal matrix composite bodies possessing complex geometrics can be fabricated by pressurelessly infiltrating filler materials contained within investment shell molds according to the techniques of the present invention wherein the investment pattern precursor to the investment shell mold comprises thin sheets of bassword. A cross-sectional view of such an investment shell and its contents is shown schematically in FIG. 9.

A hollow body of triangular cross-section having one open end and containing additional structural members was assembled by gluing together about 1/16 inch (1.6 mm) thick sheets of basswood. The lengths of the triangular sides were about 4, 4, and 3 inches (102, 102 and 76 mm), respectively. The depth of the body was about 3 inches (76 mm). The interior of the triangular body was braced with three additional sheets of basswood each about 3 inches (76 mm) long and oriented such that two were parallel to the base of the triangle and the third was substantially perpendicular to the base and adjacent to the base. The basswood sheets were joined to one another with ELMER'S ® wood glue (Professional Carpenters Wood Glue, Borden Company, Columbus, Ohio). Upon curing the glue in air at substantially room temperature for about 2 to 3 hours, the basswood fugitive investment pattern was then sealed with a protective coating of RED DEVIL ® HIGLOSS 70 polyurethane (Red Devil Paints and Chemicals, Division of Insilco Company, Mount Vernon, N.Y.). After drying the brushed on polyurethane coating for about ½ hour, two additional coatings were applied, each with an approximately ½ hour drying period after the coating application. The finished basswood pattern was then joined to a Grade 5550-K. GRN. FLK. wax pattern in the shape of the desired matrix metal reservoir measuring about 3 inches (76 mm) in height, about 3 inches (76 mm) in diameter at the top and about 2 inches (51 mm) in diameter at its base where it contacted the basswood investment pattern. The basswood investment pattern was joined to the wax reservoir pattern with molten wax.

The basswood and wax pattern assembly was then layered with investment shell coatings in substantially the same manner as those described in Example 6. In this Example, however, three primary investment shell coatings were applied instead of two. Furthermore, after the third secondary investment shell coating was applied, the developing investment shell was wrapped with a length of wire for added strength. Two additional layers of the secondary investment shell coating composition were then applied on top of the wire wrapped investment shell.

Several holes were drilled in the investment shell 300 in strategic places to assist in venting gases from the basswood during the subsequent flash firing. The coated basswood and wax reservoir investment pattern was then flash fired by placing said pattern into a gas heated air atmosphere furnace at a temperature of about 890° C. and holding at that temperature for about 15 minutes to burn out the basswood and the wax. The remaining investment shell 300 was then removed from the 890° C. gas furnace and immediately placed into a resistance heated air atmosphere furnace at a temperature of about 850° C. After firing the investment shell 300 for about 6 hours at a temperature of about 850° C. to remove the chemically bound water and to rigidize the shell, the investment shell 300 was removed from the furnace at a temperature of about 850° C. and placed onto a room temperature refractory plate and allowed to cool.

A blend of 39 CRYSTOLON ® green silicon carbide particulates comprising about 772 grams of 220 grit (average particle diameter of about 66 microns) and about 193 grams of 500 grit (average particle diameter of about 17 microns) particles were placed into a dry 1.1 liter porcelain ball mill (U.S. Stoneware Corporation, Mahwah, N.J.) containing about 2000 grams of dry about ½ inch (13 mm) diameter BURUNDUM ® stones (U.S. Stoneware Corp.). The ball mill, the ball mill lid (removed from mill) and its contents were vacuum dried for about 4 hours at a temperature of about 150° C. under about 30 inches (762 mm) of mercury vacuum. The ball mill and its contents were removed from the vacuum drier and magnesium particulate (−325 mesh, Reade Manufacturing Company, Lakehurst, N.J.) having a particle diameter less than 45 microns was added to the silicon carbide particulate in the ball mill to produce a filler material admixture 302. The lid to the ball mill was then secured and the filler material admixture 302 was milled for about 2 hours. The ball mill lid was then removed from the alumina ball mill and the ball mill and its contents were vacuum dried a second time for at least about 4 hours at a temperature of about 150° C. under about 30 inches (762 mm) of mercury vacuum.

The vent holes in the investment shell 300 were filled with CARBORUNDUM ® FIBERFRAX ® ceramic fiber 304. About 138 grams of the milled and dried filler material admixture was then poured into the investment shell 300 while the shell was shaken back and forth to allow the admixture 302 to fill in as much space as possible in the narrow walls. When all of the admixture 302 had been poured into the investment shell 300, the shell was then tapped about 5 times on a hard surface to complete the packing of the admixture 302. Additional magnesium particulate material 306 (−50 mesh, Reade Manufacturing Company) having a particle size less than 300 microns was sprinkled evenly over the surface of the filler material admixture 302 until a concentration of about 6 milligrams per square centimeter of filler material surface was achieved. An ingot of matrix metal 308 weighing about 901 grams and comprising by weight about 11.0–13.0 percent Si, ≦2.0 percent Fe, ≦1.0 percent Cu, ≦0.35 percent Mn, ≦0.10 percent Mg, ≦0.50 percent Ni, ≦0.50 percent Zn, ≦0.15 percent Sn and the balance aluminum, was then placed onto a sling 310 comprising several copper foil strips suspended over the magnesium particulate 306 dusted surface of the filler material admixture 302. The ends of the copper strips 310 were wrapped over the walls of the investment shell 302. The copper foil sling 310 served to prevent the matrix metal 308 from contacting the filler material admixture 302 until the matrix metal 308 was in a molten state. A PERMA FOIL graphite foil sheet 312 (TT America, Portland, Ore.) measuring about 4 inches (102 mm) square was placed over the opening at the top of the investment shell 300.

The investment shell 300 and its contents were then placed into a stainless steel can 314 measuring about 10 inches (254 mm) wide by about 10 inches (254 mm) long by about 10 inches (254 mm) tall. About 7 grams of Grade RMC-3 magnesium turnings 316 and about 12 grams of TI-LOY 97 titanium sponge 318 were placed into the stainless steel can 314 outside of the investment shell 300. The magnesium turnings 316 and the titanium sponge 318 were utilized as oxygen-getters. Two sheets of copper foil 320 each measuring about 14 inches (356 mm) by about 16 inches (406 mm) by about 6 mils (0.15 mm) thick were placed over the opening of the stainless steel can 314. Those portions of the sheets extending over the sides of the can 314 were folded down tightly against the sides of the can 314 to form an isolated chamber.

The stainless steel can 314 and its contents were placed into a resistance heated air atmosphere furnace. A nitrogen gas flow rate of about 15 liters per minute was provided to the interior of the can 314 through a feed tube 322 which extended through one side of the can 314. The furnace was then heated from substantially room temperature to a temperature of about 790° C. at a rate of about 400° C. per hour. After maintaining a temperature of about 790° C. for about 3½ hours, the nitrogen gas feed tube 322 was disconnected from the stainless steel can and the can and its contents were removed from the furnace and placed onto a water cooled copper chill plate. The copper 320 and graphite foil 312 sheets were removed from the stainless steel can 314 and the investment shell 300, respectively, and FEEDOL ® No. 9 hot topping particulate mixture was poured onto the top of the residual molten matrix metal 308 contained within the investment shell 300 to cause an exothermic reaction which provided heat to the surface of the residual molten matrix metal 308 and thereby assisted in the directional solidification of the molten matrix metal 308 contained within the investment shell 300.

Figure 10:
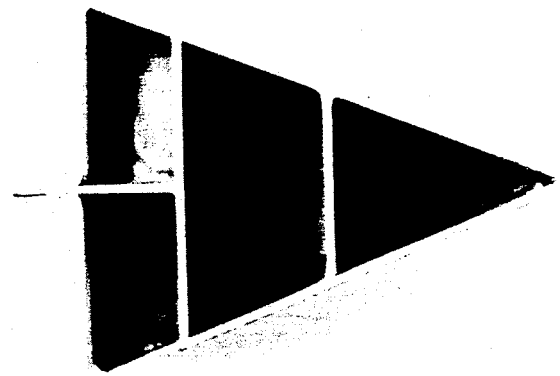
FIG. 10 is a photograph of the metal matrix composite body formed in accordance with Example 9.

After the stainless steel can 314 and its contents had cooled to about 200° C., the investment shell 300 and its contents were removed from the stainless steel can 314. The investment shell 300 was removed to reveal that the matrix metal 308 had infiltrated the filler material admixture 302 to form a metal matrix composite. Further inspection revealed that the formed metal matrix composite body was of substantially the same size and shape as the mold cavity defined by the investment shell, which in turn was defined by the shape of the basswood and wax patterns, respectively. A photograph of the formed metal matrix composite body after removing its attached matrix metal reservoir by diamond machining is shown in FIG. 10. The present Example thus demonstrates that thin metal matrix composite bodies can be fabricated using investment pattern/mold technology wherein the investment pattern comprises sheets of basswood.

EXAMPLE 11

Figure 11:
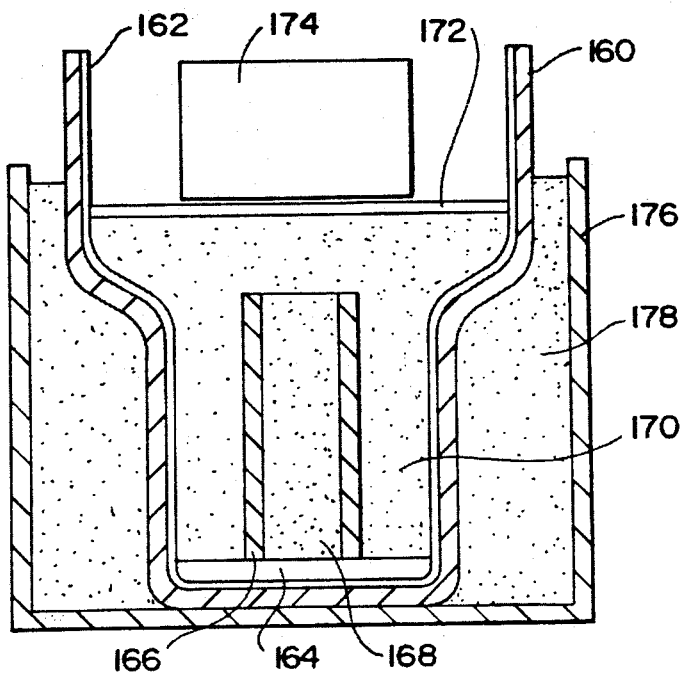
FIG. 11 is a cross-sectional view of a lay-up used to make a metal matrix composite tube in accordance with Example 10.

This Example illustrates that a shaped dense body can be used as a physical barrier during the formation of a metal matrix composite body to define a surface of the final metal matrix composite body. A cross-section of the setup used to make the body is shown schematically in FIG. 11.

Specifically, Grade A-17 alumina powder (Alcoa Industrial Chemicals Div., Bauxite, Ark.) was stirred into a quantity of water containing DARVAN ® 821A dispersant (R. T. Vanderbilt Company, Inc., Norwalk, Conn.) to produce a slurry comprising by weight about 15 percent water, about 0.1 percent dispersant, and the balance alumina. About 500 milliliters of the slurry was poured into a one liter plastic jar and roll mixed for about 16 hours to form a slip. The slip was then cast into a two piece plaster of paris mold having an internal cavity measuring about 9 inches (229 mm) in height and having a diameter of about 2 inches (51 mm) for about the first 6 inches (152 mm) and a diameter of about 3 inches (76 mm) for about the top 3 inches (76 mm). When the casting on the mold wall reached a thickness of about ¼ inch (6 mm), the excess slip was drained from the two piece mold and the casting was allowed to dry in air for several hours at room temperature. The casting, a slip cast alumina barrier shell 160, was then removed from the two piece mold by separating the two mold halves. The slip cast barrier shell was then allowed to dry in air for an additional 24 hours. After drying, the slip cast barrier shell was placed onto a layer of 90 grit (average particle diamet of about 216 microns) 38 ALUNDUM ® alumina (Norton Co., Worcester, Mass.) which was supported by a cordierite refractory plate measuring about 6 inches (152 mm) by about 11 inches (279 mm) by about 1 inch (25 mm) thick. The refractory plate bearing the slip cast barrier shell was placed into a resistance heated air atmosphere furnace and heated to about 1050° C. over a period of about 24 hours. The furnace temperature was maintained at about 1050° C. for about 2 hours after which time the furnace was allowed to cool naturally. Once the furnace temperature had substantially returned to room temperature, the fired slip cast barrier shell 160 was removed from the furnace. The interior of the alumina barrier shell 160 was then aerosol spray coated with AERODAG ® G colloidal graphite 162 (Acheson Colloids Company, Port Huron, Mich.) and allowed to dry in air at ambient temperature for about ½ hour. Two additional colloidal graphite coatings 162 were applied in a similar fashion, with ½ hour drying periods between coating applications. After application of the final colloidal graphite coating, the coated alumina barrier shell 160, 162 was allowed to dry in air at ambient temperature for about 3 to 5 hours.

About 0.5 grams of magnesium particulate 164 (−50 mesh, Hart Corporation, Tamaqua, Pa.) having substantially all particle diameters less than 300 microns was sprinkled evenly over the bottom of the coated slip cast alumina barrier shell 160, 162. A hollow graphite tube 166 measuring about 1⅜ inches (35 mm) in outside diameter and about 4 inches (102 mm) in height was placed into the coated alumina barrier shell 160, 162 and centered on top of the magnesium particulate layer 164. The interior of the graphite tube 166 was filled with 500 grit (average particle diameter of about 17 microns) 38 ALUNDUM ® alumina 168 (Norton Co.) containing no infiltration enhancer precursor in an effort to prevent metal matrix composite formation inside of the graphite tube. Approximately 100 grams of a particulate filler blend 170 comprising by weight about 4 percent magnesium powder (−325 mesh, Hart Corporation) and the balance Grade T-64 tabular alumina (−325 mesh, Alcoa Industrial Chemicals Division, Bauxite, Ark.) having substantially all particle diameters less than 45 microns was processed by substantially the same technique as demonstrated in Example 6 and was then placed into the coated alumina barrier shell 160, 162 around the graphite tube 166 and covering the top of the tube to a depth of about 1 inch (25 mm). After the surface of the filler admixture 170 had been leveled about 0.5 grams of the magnesium particulate 172 (−50 mesh, Hart Corporation) was sprinkled evenly over the surface of the filler admixture 170. An approximately 225 gram ingot of a matrix metal 174 comprising by weight about 9.5-10.6 percent magnesium, ≦2.5 percent silicon, ≦0.30 percent iron, ≦0.25 percent copper, ≦0.15 percent manganese, ≦0.15 percent zinc, ≦0.25 percent titanium, and the balance aluminum, and measuring about 2 inches (51 mm) in diameter and about 1⅝ inches (41 mm) tall was placed into the coated alumina barrier shell 160, 162 and centered over the magnesium particulate dusted surface 172 of the filler admixture 170 to form a lay-up. The lay-up, comprising the coated alumina barrier shell and its contents, was then placed into a stainless steel box 176 measuring about 4 inches (102 mm) square and about 7 inches (178 mm) tall. The space between the steel box 176 and the barrier shell 160 was then filled with 220 grit (average particle diameter of about 66 microns) 38 ALUNDUM ® alumina 178 (Norton Co.) which acted as support material for the barrier shell 160.

Figure 12:
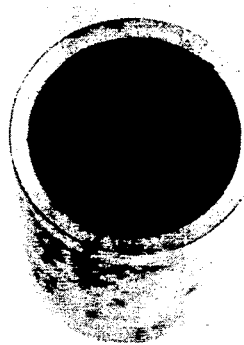
FIG. 12 is a photograph of a metal matrix composite body formed in accordance with Example 10.

The stainless steel box 176 and its contents were placed into a resistance heated controlled atmosphere furnace. The furnace chamber was evacuated to about 20 inches (508 mm) of mercury vacuum and then backfilled with nitrogen gas to substantially atmospheric pressure. A nitrogen gas flow rate of about 4 liters per minute was established. The furnace temperature was increased from substantially room temperature to a temperature of about 550° C. at a rate of about 200° C. per hour. After maintaining a temperature of about 550° C. for about 1 hour, the temperature was then increased to about 775° C. at a rate of about 150° C. per hour. After maintaining a temperature of about 775° C. for about 15 hours, the temperature was decreased to about 760° C. at a rate of about 150° C. per hour. The nitrogen gas flow rate of about 4 liters per minute was maintained throughout the heating cycle. At a temperature of about 760° C., the stainless steel box 176 and its contents were removed from the furnace and placed on top of a water cooled aluminum chill plate. FEEDOL ® No. 9 hot topping particulate mixture (Foseco, Inc., Cleveland, Ohio) was poured on top of the residual molten matrix metal 174 contained within the lay-up to cause an exothermic reaction which supplied heat to the surface of the residual molten matrix metal. An about 2 inch (51 mm) thick layer of CERABLANKET ® ceramic fiber insulation (Manville Refractory Products, Denver, Colo.) was placed over the top of the lay-up to help maintain the high temperature at the top of the lay-up and thereby assist in the directional solidification of the molten metal contained within the lay-up. After the stainless steel box 176 and its contents had cooled to about room temperature, the coated alumina barrier shell 160, 162 and its contents were removed from the stainless steel box 176. The barrier shell 160 was removed from the lay-up to reveal that the matrix metal had infiltrated the filler particulate admixture 170 to form a metal matrix composite body in the shape of a tube. Some matrix metal had also infiltrated into some of the alumina powder 168 contained within the graphite tube. A photograph of the formed metal matrix composite tube is shown in FIG. 12. The outside diameter of the metal matrix composite tube was defined by the interior surface of the coated alumina barrier shell 160, 162 and the interior diameter of the metal matrix composite tube was defined by the exterior surface of the graphite tube 166. Therefore, this Example demonstrates that a solid body of graphite can be used as a physical barrier during the formation of a metal matrix composite to define a surface of a metal matrix composite body.

EXAMPLE 12

Figure 13:
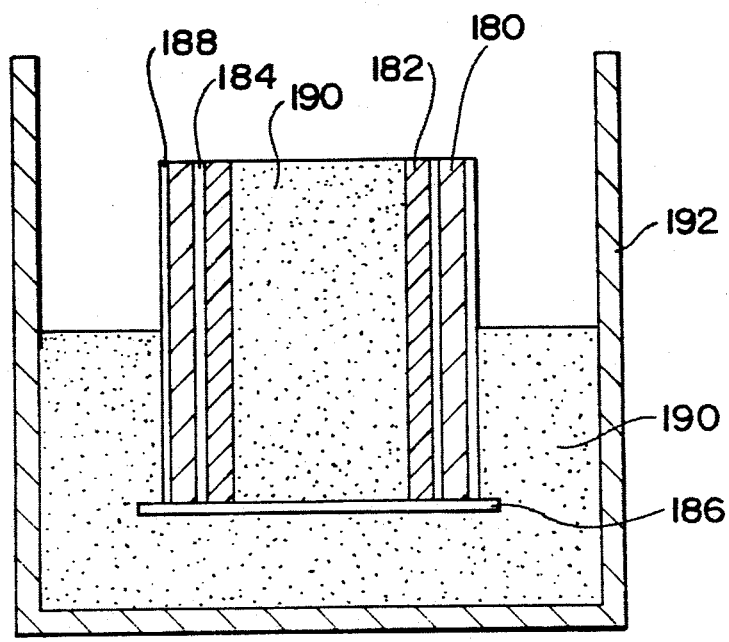
FIG. 13 is a cross-sectional view of a lay-up used to make a metal matrix composite tube in accordance with Example 11.

This Example demonstrates the formation of a right circular cylinder of metal matrix composite material formed by coating a right circular cylinder of a matrix metal with a filler material admixture in the form of a slurry. FIG. 13 illustrates schematically the setup used to carry out the infiltration.

A slurry comprising a liquid and a filler material admixture 180 was prepared from about 450 grams of dried Grade T-64 tabular alumina powder (−325 mesh, Alcoa Industrial Chemicals Division, Bauxite, Ark.) having substantially all particle diameters less than about 45 microns. The dried tabular alumina was placed into a dry porcelain ball mill having about 9 liters of internal volume. About 900 grams of ball milling stones (Standard Ceramic Supply Co., a Division of Chem-Clay Corporation, Pittsburgh, Pa.) each measuring about 15/16 of an inch (24 mm) in diameter were added to the ball mill and the alumina was ball milled dry for about 6 hours. The milling media was removed and about 36 grams of magnesium particulate (−325 mesh, Reade Manufacturing Co., Lakehurst, N.J.) having substantially all particles smaller than about 45 microns was added to the ball mill. The lid to the mill was resecured and the tabular alumina and the magnesium particulate were roll mixed for about 2 hours. The roll mixed filler material admixture was then slowly added to a NALGENE ® plastic beaker (Nalge Co., Rochester, N.Y.) containing a solution comprising about 4.9 grams of XUS 40303.00 Experiment Binder (Dow Chemical Co., Midland, Mich.) and about 245 grams of ethyl alcohol. By slowly stirring the filler material admixture into the solution of binder and ethyl alcohol, a slurry was prepared.

A matrix metal 182 in the shape of a right circular tube measuring about 2⅜ inches (60 mm) in diameter and about 3 inches (76 mm) long and weighing about 131 grams and comprising commercially pure aluminum (Aluminum Association Alloy No. 170.1) was cleaned by sandblasting its exterior and rinsing off the debris from sandblasting with ethyl alcohol. The sandblasted surface was then coated with a slurry comprising by weight about 67 percent magnesium particulate 184 (−325 mesh, Reade Manufacturing Co.) and ethyl alcohol. The coating of magnesium particulate 184 was dried in air at ambient temperature for about an hour. Weighing the dried and coated matrix metal tube 182, 184 revealed that about 1 gram of magnesium particulate 184 had been applied to the exterior of the tube.

The slurry of filler material 180 discussed above comprising the ball milled tabular alumina and magnesium particulate was spray coated on top of the magnesium particulate coating 184. Specifically, a thin coating of filler material 180 was applied at a pressure of about 25 psi (172 kPa) using a Model No. SG212G Speedy Sprayer spray paint gun (W. R. Brown, Inc., Chicago, Ill.). The coating of filler material 180 was allowed to dry in air at ambient temperature for about ten minutes. This coating and drying operation was then repeated for about five iterations until about 100 grams of filler material 180 had been deposited onto the magnesium particulate layer 184 on top of the tube of matrix metal 182. A sheet of GRAFOIL ® graphite foil 186 (Union Carbide Co., Danbury, Conn.) measuring about 3 inches (76 mm) in diameter was bonded to one end of the coated matrix metal tube with RIGIDLOCK ® colloidal graphite cement (Polycarbon Corp., Valencia, Calif.). Another sheet of GRAFOIL ® graphite foil 188 (Union Carbide Co., Danbury, Conn.) measuring about 8 inches (203 mm) long and about 3 inches (76 mm) wide and about 15 mils (0.38 mm) thick was wrapped around the coated matrix metal tube 182 and fixed in placed with RIGIDLOCK ® colloidal graphite cement (Polycarbon Corporation) to form a lay-up.

A support bedding 190 comprising 90 grit (average particle size about 216 microns) 39 CRYSTOLON ® green silicon carbide particulate (Norton Co., Worcester, Mass.) was poured into a graphite boat 192 measuring about 14 inches (356 mm) long by about 11 inches (279 mm) wide by about 8 inches (203 mm) high to a depth of about 2 inches (76 mm). The lay-up 180, 182, 184, 186, 188 comprising the wrapped and coated matrix metal tube was placed upon the green silicon carbide support bedding 190 within the graphite boat 192 and so oriented such that the axis of the tube was substantially vertical. Additional 90 grit 39 CRYSTOLON ® green silicon carbide particulate 190 was poured into the tube until the tube was substantially completely full. Additional 90 grit 39 CRYSTOLON ® green silicon carbide 190 was poured into the graphite boat 192 around the tube assembly until the total depth of silicon carbide 190 in the graphite boat 192 reached about 3½ inches (89 mm).

Figure 14:
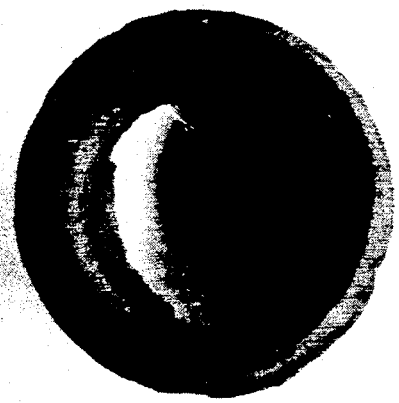
FIG. 14 is a photograph of a metal matrix composite body formed in accordance with Example 11.

The graphite boat 192 and its contents were placed into an electrical resistance heated, controlled atmosphere furnace. The furnace atmosphere was evacuated to about 30 inches (762 mm) of mercury vacuum and backfilled with nitrogen gas. A nitrogen gas flow rate of about 3 liters per minute was established through the furnace. The furnace temperature was raised from substantially room temperature to a temperature of about 200° C. at a rate of about 200° C. per hour and held at about 200° C. for about 46 hours. The temperature was raised to about 460° C. at a rate of about 200° C. per hour and held at about 460° C. for about 5 hours. The temperature was then raised to about 490° C. at a rate of about 10° C. per hour and held at about 490° C. for about 1 hour. The temperature was raised to about 550° C. at a rate of about 150° C. and held at about 550° C. for about 1 hour. The temperature was then raised to about 775° C. at a rate of about 150° C. per hour and held at about 775° C. for about 5 hours. The temperature was then lowered to about 760° C. at a rate of about 150° C. per hour. When a reduced temperature of about 760° C. had been reached, the graphite boat 192 was removed from the furnace and placed on a water-cooled aluminum quench plate. FEEDOL ® 9 hot topping particulate mixture (Foseco, Inc., Cleveland, Ohio) was poured on top of the lay-up 180, 182, 184, 186, 188 to help directionally solidify the matrix metal 182. After cooling to substantially room temperature, the contents were removed from the graphite boat 192 and inspected. It was discovered that the matrix metal tube 182 had infiltrated the coating of filler material 180 on its surface to form a metal matrix composite body. A photograph of the metal matrix composite tube thus produced is shown in FIG. 14. It has therefore been demonstrated that a metal matrix composite body in the shape of a tube can not only be fabricated by infiltrating a slip cast tube preform or a tape cast preform molded against a tube of matrix metal, but also by spray coating a tube of matrix metal with a filler material admixture.

EXAMPLE 13

This Example is another embodiment demonstrating the concept of infiltrating a filler material admixture coating on a sheet of matrix metal through use of the pressureless metal infiltration process of the present invention.

A slurry comprising a liquid and a filler material admixture 200 was prepared. Specifically, about 850 grams of dried Grade T-64 tabular alumina particulate (−325 mesh, Alcoa Industrial Chemicals Division, Bauxite, Ark.) having substantially all particles less than 45 microns in size was placed into a dry porcelain ball mill having about 9 liters of internal volume. About 1700 grams of ball milling stones (Standard Ceramic Supply Co., a Division of Chem-Clay Corporation, Pittsburg, Pa.) each measuring about 15/16 of an inch (24 mm) in diameter were added to the ball mill and the tabular alumina was ball milled dry for about 6 hours. The ball milling stones were removed and about 150 grams of Grade A-1000 alumina powder (Alcoa Industrial Chemical Division) and about 40 grams of magnesium particulate (−325 mesh, Reade Manufacturing Company, Lakehurst, N.J.) having substantially all particles less than 45 microns in size were added to the ball mill. The lid to the mill was resecured and the aluminas and the magnesium particulate were roll mixed for about 2 hours. The roll mixed filler material admixture 200 was then slowly added to a NALGENE ® plastic beaker (Nalge Company, Rochester, N.Y.) containing a solution comprising about 7.8 grams of XUS 40303.00 Experimental Binder (Dow Chemical Company, Midland, Mich.) and about 520 grams of ethyl alcohol. By slowing stirring the filler material admixture into the solution of binder and ethyl alcohol, a slurry was prepared.

Figure 15A:
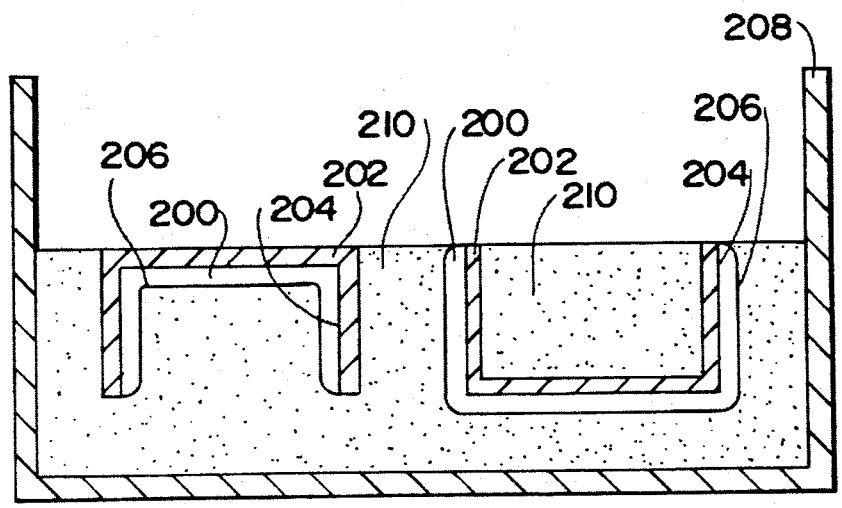
FIG. 15a is a cross-sectional view of a lay-up used to make a metal matrix composite body in accordance with Example 12.

FIG. 15a is a cross-sectional view of a lay-up employed in fabricating two metal matrix composite boxes, Samples A and B, as herein described.

Sample A

A matrix metal sheet 202 approximately ⅛ inch (3 mm) in thickness, weighing about 344 grams and comprising by weight about 0.05 to 0.20 percent copper, ≦0.95 percent silicon plus iron, ≦0.05 percent manganese, ≦0.10 percent zinc and the balance aluminum (Aluminum Association Alloy No. 1100) was formed into a box 202 open on one end and measuring about 5 inches (127 mm) square by about 2 inches (51 mm) deep. The interior of the box 202 was cleaned by sandblasting followed by washing with ethyl alcohol. The interior of the box 202 was then brush coated with a slurry comprising by weight about 67 percent magnesium particulate 204 (−325 mesh, Reade Manufacturing Company) and the balance ethyl alcohol. After drying the coated matrix metal box 202, 204 in air at ambient temperature for about an hour, the coated matrix metal box 202, 204 was weighed, which revealed that about 1 gram of magnesium particulate 204 had been applied to the interior surface of the box.

The slurry of filler material 200 discussed above comprising the aluminas and magnesium particulates was brush coated on top of the magnesium particulate coating 204 applied to the interior of the box 202. Specifically, a thin slurry coating of filler material 200 was applied and allowed to dry for about ten minutes in air at ambient temperature. This coating and drying sequence was then continued until about 330 grams of filler material 200 had been deposited onto the magnesium particulate layer 204 inside the matrix metal box 202. The coated matrix metal box 200, 202, 204 was then dried in air at ambient temperature for about 3 to 5 hours to ensure that all of the ethyl alcohol had evaporated. The coated surfaces of the matrix metal box 200, 202, 204 were then spray coated with AERODAG ® G colloidal graphite 206 (Acheson Colloids Company, Port Huron, Mich.) applied under about 25 psi (172 kPa) of pressure using the Model No. SG212G Speedy Sprayer spray paint gun (W. R. Brown, Inc., Chicago, Ill.).

Sample B

A second matrix metal box 202 of substantially the same size and composition as the box described above was similarly cleaned and coated with layer of magnesium particulate 204, the filler material admixture 202 and the colloidal graphite barrier coating 206 with the exception that these coatings and procedures were applied to the box exterior rather than the interior.

A graphite boat 208 measuring about 12 inches (305 mm) long by about 8 inches (203 mm) wide by about 6 inches (152 mm) tall was filled with a bedding material 210 comprising 90 grit (180 microns average particle size) 39 CRYSTOLON ® green silicon carbide particulate (Norton Company, Worcester, Mass.) to a depth of about 1 inch (25 mm) and leveled. The matrix metal box 202 whose coatings were applied on the exterior of the box (Sample B) was then placed into the graphite boat 208 on top of the silicon carbide bedding 210 and oriented such that the 5 inch (127 mm) base of the box 200, 204, 202, 206 contacted the bedding material 210. Additional 90 grit (180 microns) 39 CRYSTOLON ® green silicon carbide 210 was then poured into the graphite boat 208 in and around the Sample B coated matrix metal box to a height substantially flush with the top edge of the box and leveled. The matrix metal box 202 with the magnesium particulate infiltration enhancer precursor 204, the filler material admixture 200, and the barrier coatings 206 applied on the inside of the box (Sample A) was then placed into the graphite boat 208 with the open end of the box 202 facing down and pressed down into the 90 grit (180 microns) 39 CRYSTOLON ® silicon carbide bedding 210 to a depth such that the top of the bedding material 210 was substantially flush with the base of the box 202.

Figure 15B:
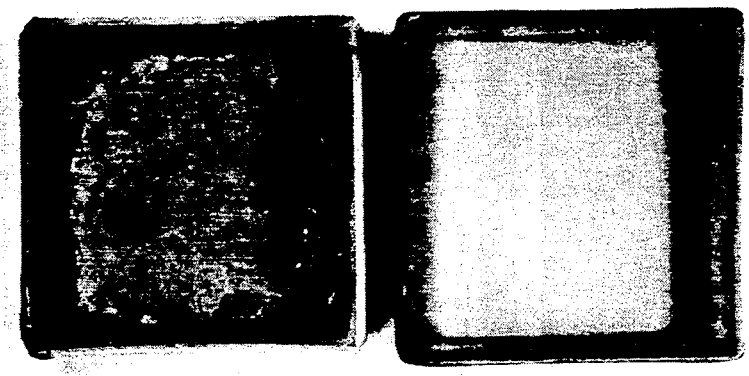
FIG. 15b is a photograph of the metal matrix composite body produced in accordance with Example 12.

The graphite boat 208 and its contents were placed into an electrical resistance heated, controlled atmosphere furnace. The furnace atmosphere was evacuated to about 30 inches (762 mm) of mercury vacuum and then backfilled with nitrogen gas to substantially atmospheric pressure. A nitrogen gas flow rate of about 2.5 liters per minute was established through the furnace. The furnace temperature was then raised from substantially room temperature to a temperature of about 460° C. at a rate of about 200° C. per hour and held at a temperature of about 460° C. for about 5 hours. The temperature was then increased to about 490° C. at a rate of about 10° C. per hour and held at a temperature of about 490° C. for about 1 hour. The temperature was then increased to about 775° C. at a rate of about 150° C. per hour and held at a temperature of about 775° C. for about 5 hours. The temperature was then decreased to about 760° C. at a rate of about 150° C. per hour. At a temperature of about 760° C., the graphite boat 208 and its contents were removed from the furnace and placed onto a water-cooled aluminum quench plate. FEE- DOL® 9 hot topping particulate mixture (Foseco, Inc., Cleveland, Ohio) was poured onto the top of the exposed residual molten matrix metal 202. The top and sides of the graphite boat 208 were covered with an approximately 2 inch (51 mm) thick layer of CERA-BLANKET® ceramic fiber insulation (Manville Refractory Products, Denver, Colo.). After cooling to substantially room temperature, the contents of the graphite boat 208 were removed from the graphite boat 208 and inspected. Removal of the colloidal graphite barrier coating 206 by sandblasting revealed that the matrix metal 202 in the boxes had infiltrated the filler material admixture coatings 200 on the interior and exterior surfaces of the boxes, respectively, to form metal matrix composite bodies replicating the shape of the matrix metal boxes as shown by the photos of Samples A and B in FIG. 15b. Thus, this Example provides a further illustration that thin metal matrix composite bodies can be fabricated by coating thin shaped sheets of matrix metal with a filler material admixture and infiltrating the filler material admixture with the adjacent matrix metal by practicing the pressureless infiltration process of the present invention.

EXAMPLE 14

This Example further illustrates how a thin double-walled metal matrix composite body featuring inversely replicated channels between the walls can be fabricated by infiltrating a filler material admixture coating applied over a perforated matrix metal sheet. The setup employed in carrying out the infiltration was substantially the same as that used in Example 8 and illustrated in FIG. 8c.

Figures 16A, 16B:
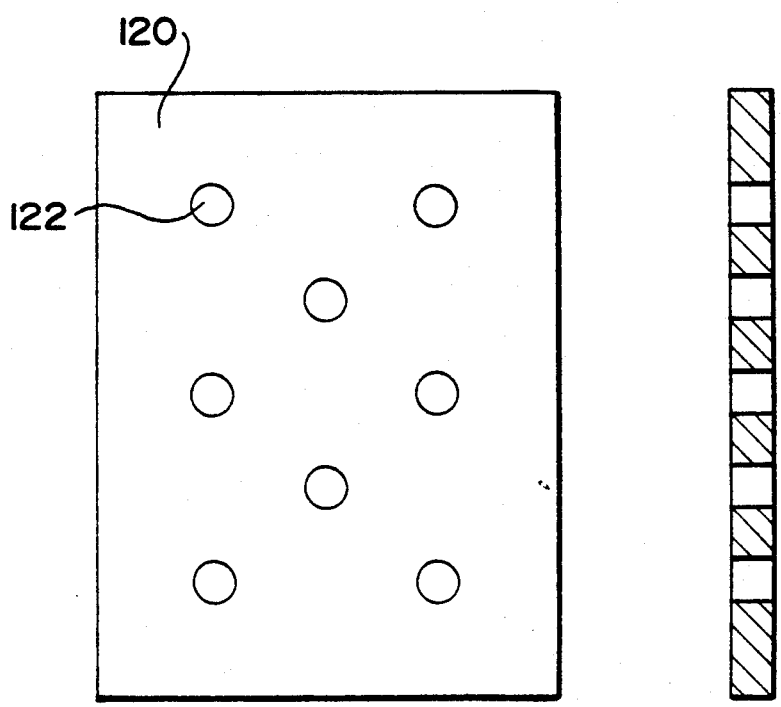
FIGS. 16a and 16b are schematic views of a shaped matrix metal body utilized in Example 13.

A sheet of a matrix metal 120 measuring about 3 inches (76 mm) long by about 2 inches (51 mm) wide by about 0.050 inches (1.3 mm) thick and comprising by weight about 0.4 to 0.8 percent silicon, ≦0.7 percent iron, about 0.15 to 0.40 percent copper, ≦0.15 percent manganese, about 0.8 to 1.2 percent magnesium, about 0.04 to 0.35 percent chromium, ≦0.25 percent zinc, ≦0.15 percent titanium and the balance aluminum was perforated with eight approximately 5/32 inch (4 mm) diameter through holes 122 arranged in a staggered pattern as illustrated in FIGS. 16a and 16b. The surface of the perforated matrix metal sheet was prepared by first sandblasting the surface to remove any adhered surface oxide and then cleaning with ethyl alcohol to remove any debris from the sandblasting operation.

A slurry of filler material 124 for coating the sheet of matrix metal comprised by weight about 3000 grams of Grade T-64 tabular alumina (−325 mesh, Alcoa Industrial Chemicals Division, Bauxite, Ark.), having substantially all particles less than 45 microns in diameter, about 240 grams of magnesium particulate (−325 mesh, Reade Manufacturing Company, Lakehurst, N.J.), having substantially all particles less than 45 microns in diameter about 162 grams of Grade XUS 40303.00 Experimental Binder (Dow Chemical Corporation, Midland, Mich.) and about 1038 grams of ethyl alcohol. The slurry was prepared by dissolving the binder into the ethyl alcohol and stirring in the particulates of tabular alumina and magnesium.

The matrix metal sheet 120 discussed above was dipped into the slurry to form an adherent coating on the sheet of a filler material 124. The coated matrix metal sheet 120, 124 was then placed into a forced air drying oven and dried for about 15 to 30 minutes at a temperature of about 78° C. The dip coating and drying operation was repeated twice to produce a total of three layers of filler material 124 on the matrix metal sheet 120. The through holes 122 in the matrix metal sheet 120 were substantially filled with filler material 124. As dried, the total weight of filler material 124 was about 49 grams.

The coated sheet of matrix metal 120, 124 was then encased within a single sheet of GRAFOIL® graphite foil 126 which measured about 15 mils (0.38 mm) thick. The sheet of coated matrix metal was encased by wrapping and folding the GRAFOIL® around the coated sheet and sealing the seam with RIGIDLOCK® colloidal graphite cement (Polycarbon Corporation, Valencia, Calif.). The coated 124 and wrapped 126 sheet of matrix metal 120 was then placed between two plates of graphite 128 each measuring about 8 inches (203 mm) long by about 4 inches (102 mm) wide by about ½ inch (13 mm) thick in order to form an assembly 120, 124, 126, 128.

The assembly comprising the coated 124 and wrapped 126 sheet of matrix metal 120 which was sandwiched between the graphite plates 128 was oriented vertically about the longitudinal axis of the assembly 120, 124, 126, 128 within a graphite boat 130 having external dimensions of about 14 inches (356 mm) long by about 10¼ inches (260 mm) wide by about 1½ inches (38 mm) tall and having a wall thickness of about ¼ inch (6 mm). A graphite fixture 132 open at both ends measuring about 8 inches (203 mm) long by about 4 inches (102 mm) wide by about 6 inches (152 mm) tall and having a wall thickness of about ¼ inch (6 mm) was placed into the graphite boat and around the assembly 120, 124, 126, 128. A bedding material admixture 133 comprising by weight about 15 percent Grade F-69 glass frit (Fusion Ceramics, Carrollton, Ohio) and the balance equal weight proportions of 90 grit (180 microns average particle diameter), 220 grit (66 microns) and 500 grit (17 microns) El ALUNDUM® alumina (Norton Company, Worcester, Mass.) was poured into the region between the graphite fixture 132 and the assembly 120, 124, 126, 128 until the bedding material 133 obtained a depth of about 4 inches (102 mm).

The graphite boat 130 and its contents were placed into a electrical resistance heated, controlled atmosphere furnace at substantially room temperature. The furnace chamber was sealed, evacuated to about 30 inches (762 mm) of mercury vacuum and then backfilled with nitrogen gas to substantially atmospheric pressure. A nitrogen gas flow rate of about 5 liters per minute was established through the furnace. The temperature in the furnace was increased to about 100° C. at a rate of about 200° C. per hour. After maintaining a temperature of about 100° C. for about 44 hours, the temperature was then increased to about 460° C., again at a rate of about 200° C. per hour. After maintaining a temperature of about 460° C. for about 5 hours, the temperature was then increased by about 30° C. at a rate of about 10° C. per hour. After maintaining a temperature of about 490° C. for about 1 hour, the temperature was then increased to about 800° C. at a rate of about 200° C. per hour. After maintaining a temperature of about 800° C. for about 6 hours, the pressureless infiltration of matrix metal into the filler material admixture coating was substantially complete and the furnace temperature was then decreased to about 700° C. at a rate of 200° C. per hour. At a temperature of about 700° C., the graphite boat 130 and its contents were removed from the furnace and placed onto a water-cooled aluminum quench plate.

Figure 17A:
FIGS. 17a and 17b is a photographs showing cross-sectional and frontal views, respectively, of the double-walled metal matrix composite structure produced in accordance with Example 13.
Figure 17B:
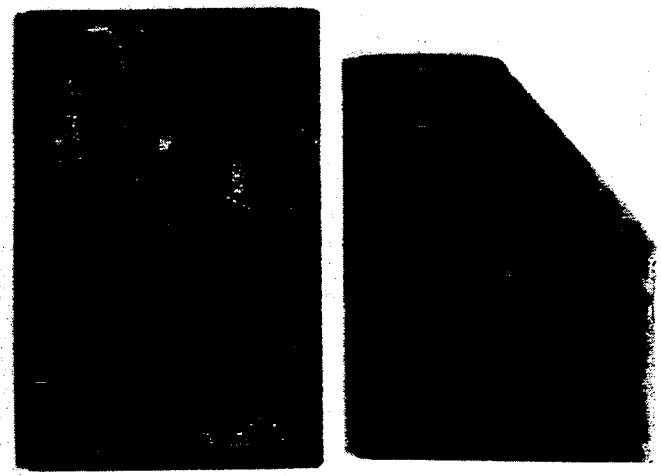

After cooling to substantially room temperature, the assembly 120, 124, 126, 128 was removed from the bedding material admixture 133 and disassembled to reveal that virtually all of the matrix metal 120 had infiltrated the filler material admixture coating 124 to produce a double-walled metal matrix composite body. The region defined between the metal matrix composite walls comprised empty space, except for those areas which correspond to the location of the approximately 5/32 inch (4 mm) diameter through holes 122 in the original sheet of matrix metal 120. These through holes 122 in the matrix metal sheet 120 which had been filled with filler material 124 were subsequently spontaneously infiltrated with matrix metal 120 during the pressureless metal infiltration process to produce bridges or bonding joints roughly 5/32 inch (4 mm) in diameter that joined the two walls of the formed metal matrix composite. A photograph of the formed metal matrix composite structure in both front and cross-sectional views is shown in FIGS. 17a and 17b. Thus, this Example illustrates further that a thin double-walled metal matrix composite body having an inversely replicated metal matrix composite structure between the walls can be produced.

EXAMPLE 15

Figure 18:
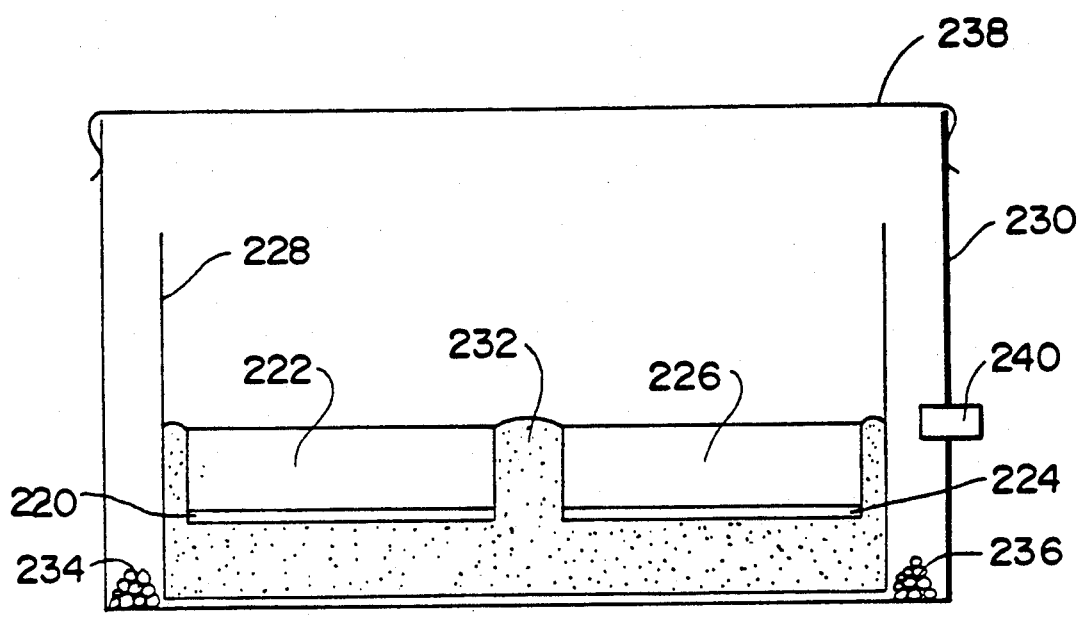
FIG. 18 is a schematic cross-sectional view of a lay-up utilized to form a metal matrix composite body in accordance with Example 14.

This Example demonstrates that a thin metal matrix composite coating can be formed on the surface of a matrix metal according to the techniques of the present invention. The setup used to fabricate the coating is illustrated schematically in FIG. 18.

Sample C

About 2000 grams of Grade A-17 alumina particulate (Alcoa Industrial Chemicals Division, Bauxite, Ark.) were placed into the approximately 10 liter mixing chamber of a "V" blender (Porta Shell Lab Blender, Patterson Pump Co., a subsidiary of Banner Industries, Inc., Toccoa, Ga.). The cover was secured and the mixer was started. After mixing for about 5 minutes to break down the larger agglomerates against the high rotational speed intensifier bar, the mixing was stopped temporarily. About 100 grams of magnesium particulate (−325 mesh, Atlantic Equipment Engineers, Bergenfield, N.J.) having substantially all particles less than 45 microns in diameter, were added to the mixing chamber and the admixture was blended for about 10 minutes. The mixer was stopped, the mixing chamber was opened, and about 20 grams of the particulate admixture was removed and stirred into an approximately 50 ml aluminum sample cup containing about 20 grams of ethyl alcohol to form a slurry of filler material 220. The remaining dry particulate admixture was stored in an approximately 4 liter NALGENE ® plastic jar (Nalge Co., Rochester, N.Y.) for future use 220.

A matrix metal ingot 222 measuring about 2 inches (51 mm) square by about ½ inch (13 mm) thick and comprising by weight about 0.4 to 0.8 percent silicon, ≦0.7 percent iron, about 0.15 to 0.40 percent copper, ≦0.15 percent manganese, about 0.8 to 1.2 percent magnesium, about 0.04 to 0.35 percent chromium, ≦0.25 percent zinc, ≦0.15 percent titanium and the balance aluminum was sandblasted to remove any adhered surface oxide and then rinsed with ethyl alcohol to remove any adhered debris from the sandblasting operation. The matrix metal ingot 222 was then placed into a stainless steel pan measuring about 16 inches (406 mm) long by about 12 inches (305 mm) wide by about ½ inch (13 mm) deep and oriented such that one 2 inch (51 mm) by 2 inch (51 mm) face contacted the stainless steel. A shallow reservoir was created around one of the 2 inch (51 mm) square faces by applying a length of HIGHLAND ® cellophane tape (Commercial Office Supply Division, 3M Corporation, St. Paul, Minn.) to the four 2 inch (51 mm) by ½ inch (13 mm) faces of the matrix metal ingot 222 such that the tape extended about ¼ inch (6 mm) over the edge of the ingot. The slurry of filler material 220 was then poured over the matrix metal ingot 222 into the formed reservoir and allowed to dry in air at ambient temperature for about 3 to 5 hours. The cellophane tape was removed from the coated matrix metal ingot 222.

Sample D

A dry particulate admixture comprising CERALOX HPA alumina (Ceralox Corp., Tucson, Ariz.) having an average particle size of about 0.3 micron and magnesium particulate (−325 mesh, Atlantic Equipment Engineers, Bergenfield, N.J.) having substantially all particles less than 45 microns in size was prepared in substantially the same manner as the particulate admixture of Sample C. The particulate admixture 224 was then slurrified in substantially the same manner as that prepared for Sample C. An ingot of a matrix metal 226 of substantially the same size and composition as that used in Sample C was cleaned in a similar fashion as the Sample C ingot. A coating of filler material 224 was then formed on the matrix metal ingot 226 in substantially the same manner as that which was coated on the matrix metal ingot in Sample C.

A GRAFOIL ® graphite foil box 228 (Union Carbide Company, Danbury, Conn.) was fabricated from a single sheet of GRAFOIL ® measuring about 15 mils (0.38 mm) thick by making strategically placed cuts and folds into the sheet. The shape of the box was maintained by placing staples in the folds in the graphite foil. The GRAFOIL ® box 228 measured about 11 inches (279 mm) long by about 8 inches (203 mm) wide by about 3 inches (76 mm) tall and was placed into a stainless steel boat 230 measuring about 12 inches (305 mm) long by about 9 inches (229 mm) wide by about 11 inches (279 mm) tall. A bedding material 232 comprising Grade A-17 alumina particulate (Alcoa Industrial Chemicals Division) was poured into the GRAFOIL ® box 228 to a depth of about ½ inch (13 mm) and leveled. The two coated matrix metal ingots 220, 222, 224, 226 (Samples C and D) were placed into the GRAFOIL ® box 228 on top of the alumina powder bedding material 232 and oriented such that both coatings faced down against the alumina powder bedding 232. Additional Grade A-17 alumina particulate bedding material 232 was poured into the GRAFOIL ® box 228 around the coated matrix metal ingots 220, 222, 224, 226 to a level about ½ inch (13 mm) above the top of the coated ingots. About 30 ml each by bulk volume of Grade RMC-3 magnesium turnings 234 (Reade Manufacturing Company, Lakehurst, N.J.) and Grade TI-LOY 97 titanium sponge 236 (Chemalloy Corporation, Bryn Mawr, Pa.) were placed into the stainless steel can 230 outside of the GRAFOIL ® box 228. The titanium sponge 236 and magnesium turnings 234 function as a getter to absorb oxygen and moisture. A copper foil sheet 238 measuring about 14 inches (356 mm) long by about 13 inches (330 mm) wide by about 6 mils (0.15 mm) thick was placed over the opening of the stainless steel can. The portions of the copper extending over the sides of the can were folded down against the sides of the can to form an isolated chamber. A hole for a nitrogen gas purge tube 240 was provided through one side of the can.

Figure 19A:
FIGS. 19a and 19b are photomicrographs taken at about 1000× of a metal matrix composite coating which was formed on a matrix metal ingot in accordance with Example 14.
Figure 19B:

The stainless steel can 230 and its contents were placed into an electrical resistance heated, air atmosphere furnace. A nitrogen gas flow rate of about 19 liters per minute was established into the can through a purge tube 240. The furnace was heated from substantially room temperature to a temperature of about 200° C. in a period of about 15 minutes. As soon as a temperature of about 200° C. was achieved, the furnace temperature was increased to about 400° C. over a period of about 3 hours. The temperature was then increased from about 400° C. to about 475° C. over a period of about 7 hours. The temperature was then increased from about 475° C. to about 540° C. over a period of about 7 hours. The temperature was then increased from about 540° C. to about 725° C. over a period of about 3 hours. After maintaining a temperature of about 725° C. for about 2 hours, substantially all of the filler material 220, 224 had been infiltrated by matrix metal 222, 226, so the nitrogen gas purge tube 240 was disconnected and the stainless steel can 230 and its contents were removed from the furnace. The copper sheet 238 was removed from the top of the stainless steel can 230 and the contents were permitted to cool to about room temperature. Thereafter, the coated matrix metal ingots 220, 222, 224, 226 were removed from the alumina bedding material 232. A corner of each tile was removed with a diamond saw, mounted in a thermosetting polymer material and polished on a diamond wheel. The optical photomicrographs shown in FIGS. 19a and 19b demonstrate that the matrix metal 222, 226 did in fact infiltrate each coating of filler material 220, 224 to produce a thin metal matrix composite coating on the surface of the matrix metal substrate.

EXAMPLE 16

Figure 20:
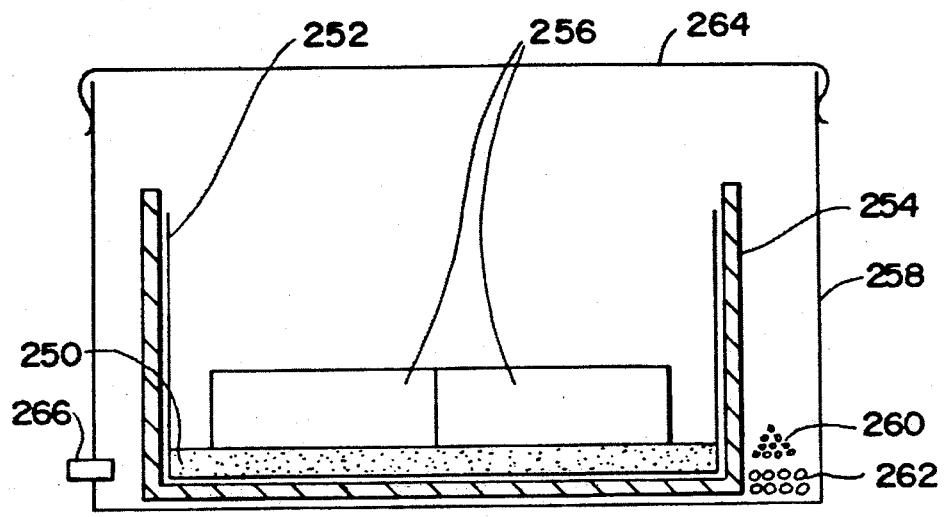
FIG. 20 is a schematic cross-sectional view of a lay-up utilized to make a metal matrix composite body in accordance with Example 16.

This Example further demonstrates the concept of forming a metal matrix composite layer on the surface of a matrix metal. In this embodiment, the matrix metal infiltrates a thin layer of loose filler material to form a metal matrix composite. The setup used to perform the infiltration is shown schematically in FIG. 20.

About 300 grams of Grade T-64 tabular alumina filler material 250 (−325 mesh, Alcoa Industrial Chemicals Division, Bauxite, Ark.) having substantially all particles less than 45 microns in size was placed into a dry porcelain ball mill having approximately 4 liters of internal volume. About 150 grams of ball milling stones each having a diameter of about 15/16 inch (24 mm) (Standard Ceramic Supply Company, a Division of ChemClay Corporation, Pittsburgh, Pa.) were placed into the mill and the lid to the mill was secured. After dry ball milling the tabular alumina filler material 250 for about 2 hours, about 150 grams of the milled tabular alumina filler material 250 was poured into a GRAFOIL ® graphite foil box 252 (Union Carbide Co., Danbury, Conn.) measuring about 6 inches (152 mm) square and about 4 inches (102 mm) tall and leveled. The GRAFOIL ® box 252 was fabricated from a single sheet of GRAFOIL ® of about 15 mils (0.38 mm) thickness by making strategically placed cuts and folds in the GRAFOIL ® sheet and stapling the folds to make a five-sided box open on one of the 6 inch (152 mm) by 6 inch (152 mm) faces. The GRAFOIL ® box 252 was located inside of a graphite boat 254 having substantially the same interior dimensions as the GRAFOIL ® box 252. Two matrix metal ingots 256 each measuring about 3 inches (76 mm) long by about 2 inches (51 mm) wide by about 1 inch (25 mm) thick and comprising by weight about 10.5 percent magnesium and the balance aluminum were sandblasted to remove any adhered surface oxide and then rinsed with ethyl alcohol to remove any debris from the sandblasting operation. The ingots were then placed into the GRAFOIL ® box 252 on top of the tabular alumina filler material 250 such that one 3 inch (76 mm) by 2 inch (51 mm) face of each matrix metal ingot 256 contacted filler material 250 and one 3 inch (76 mm) by 1 inch (25 mm) face contacted the other ingot of matrix metal 256. The graphite boat 254 and its contents were then placed into a stainless steel can 258 measuring about 10 inches (254 mm) long by about 8 inches (203 mm) wide by about 10 inches (254 mm) deep. About 15 grams of Grade RMC-3 magnesium turnings 260 (Reade Manufacturing Company, Lakehurst, N.J.) and about 30 grams of TI-LOY 97 titanium sponge 262 (Chemalloy Corporation, Bryn Mawr, Pa.) were placed into the stainless steel can 258 outside of the graphite boat 254. The magnesium turnings 260 and the titanium sponge 262 serve to getter any moisture or oxygen in the stainless steel can 258 during the run. A copper foil sheet 264 of commercial purity measuring about 12 inches (305 mm) by about 10 inches (254 mm) wide by about 6 mils (0.15 mm) thick was placed over the opening of the stainless steel can 258. The portions of the copper foil sheet 264 extending over the sides of the can 258 were folded down against the can 258 to form an isolated chamber. A hole for a nitrogen gas purge tube was provided through one side of the can 258 near the base.

Figure 21:
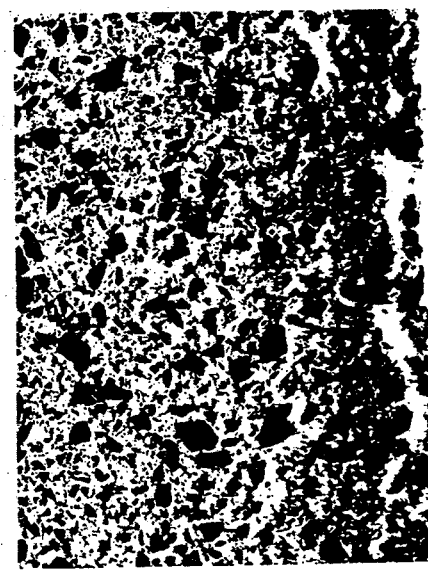
FIG. 21 is a photomicrograph taken at about 400× of a metal matrix composite layer formed on a matrix metal substrate formed in accordance with Example 15.

The stainless steel can 258 and its contents were placed into an electric resistance heated, air atmosphere furnace. A nitrogen gas flow rate into the can of about 15 liters per minute was established through the purge tube 266. The furnace was then heated from substantially room temperature to a temperature of about 800° C. in about 4 hours. After maintaining a temperature of about 800° C. for about 4 hours, the nitrogen gas purge tube 266 was disconnected and the stainless steel can 258 and its contents were removed from the furnace. The copper foil sheet 264 was removed from the can 258 and the graphite boat 254 and its contents were also removed from the can 258 and set onto a refractory plate. A blanket of CARBORUNDUM ® FIBERFRAX ® ceramic fiber insulation measuring about 2 inches (51 mm) thick was placed over the top and around the sides of the graphite boat 254 to help directionally solidify the matrix material 256. After cooling to substantially room temperature, the GRAFOIL ® box 252 and its contents were removed from the graphite boat 254. The GRAFOIL ® box 252 was then disassembled to reveal that the matrix metal 256 had infiltrated the thin layer of tabular alumina filler material 250 to produce a thin metal matrix composite layer. A vertical section of one of the corners of the solidified mass of metal matrix composite material and residual matrix metal 256 was made using a diamond saw. The vertical cross-section was then mounted in a thermosetting polymer material, polished on a diamond wheel, and examined using light microscopy. The optical photomicrograph in FIG. 21 reveals that the thin metal matrix composite layer is metallurgically bonded to the residual matrix metal 256 remaining after the infiltration of the tabular alumina filler material 250. Thus, this Example further illustrates that a metal matrix composite layer can be formed on the surface of a matrix metal substrate with excellent attachment to the substrate by allowing a mass of matrix metal to infiltrate a thin layer of a filler material.

EXAMPLE 17

Figure 22:
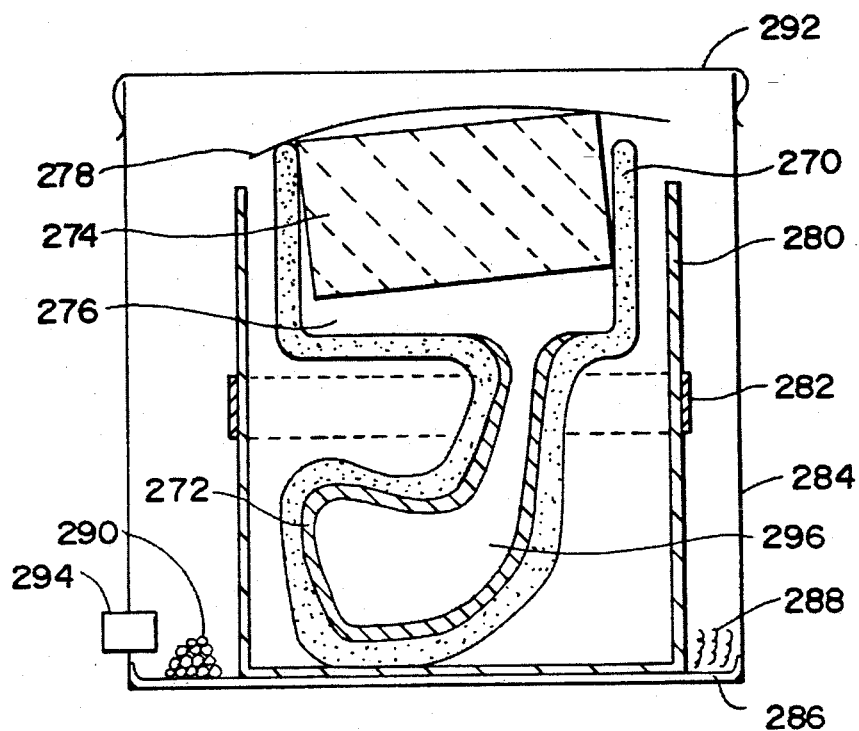
FIG. 22 is a schematic cross-sectional view of a lay-up utilized to make a metal matrix composite body in accordance with Example 16.

This Example demonstrates that a shaped thin metal matrix composite body can be made by infiltrating a slip cast shell with a matrix metal. After the infiltration, the residual matrix metal is left in contact with the infiltrated shell to produce a macrocomposite comprising the metal matrix composite shell metallurgically bonded to the matrix metal substrate underneath. The setup used to carry out the infiltration is shown schematically in FIG. 22.

An investment shell mold 270 was fabricated according to substantially the same procedures as detailed in Example 6. In the present Example, however, the investment pattern comprised a golf club head instead of a sphere. Furthermore, whereas the investment shell in Example 6 was fired at a temperature at about 850° C. for about 4½ hours to rigidize said investment shell, in the present Example the investment shell mold 270 was fired at a temperature of about 800° C. for about 6 hours.

A filler material admixture 272 comprising by weight about 8 percent magnesium particulate (−325 mesh, Atlantic Equipment Engineers Corporation, Bergenfield, N.J.) having substantially all particles less than 45 microns in size and the balance micropolish grade alpha-alumina (Buehler Limited, Lake Bluff, Ill.) having an average particle size of about 0.3 micron was placed into a dry NALGENE ® plastic jar (Nalge Company, Rochester, N.Y.) having an internal volume of about 1 liter. The weight of the filler material admixture totalled about 24 grams. After roll mixing the filler material admixture 272 dry for about ½ hour, about 48 grams of toluene was added to the plastic jar to make a slip. The slip was then roll mixed for about ½ hour.

To retard the rate of wall buildup during the slip casting process, the investment shell mold 270 was soaked in toluene prior to slip casting. The slip was then poured into the investment pattern portion of the investment shell mold. After the filler material admixture 272 in the slip had deposited on the wall of the investment shell mold 270 to a thickness of between 1/16 and ⅛ inch (1.6 and 3 mm), the remaining slip in the investment shell mold 270 was poured out. The resultant slip cast coating of the filler material admixture 272 comprised a preform whose outer surface closely matched that of the original golf club head in size and shape. No deliberate drying operation was performed on the investment shell mold 270 with its slip/cast interior coating 272 because substantially all of the toluene had volatilized out of the shell mold 270 by the time the mold 270 and its contents were loaded into a furnace.

Ingots of matrix metal 274 weighing a total of about 364 grams and comprising by weight about 9.5 to 10.6 percent magnesium ≦0.25 percent of each of silicon, copper and titanium, ≦0.30 percent iron, ≦0.15 percent of each of manganese and zinc and the balance aluminum were placed into the matrix metal reservoir chamber 276 in the upper half of the investment shell mold 270 and were supported by the lip of the shell mold. A PERMA FOIL graphite foil cover sheet 278 (TT America, Portland, Oreg.) sufficiently large enough to cover the open end of the matrix metal reservoir chamber 276 portion of the investment shell mold 270 was placed over the matrix metal ingots 274.

The investment shell mold 270 and its contents were placed onto a stainless steel holder 280 and secured with copper foil 282. The stainless steel holder 280 and its contents were then placed into a stainless steel can 284 measuring about 10 inches (254 mm) long by about 10 inches (254 mm) wide by about 10 inches (254 mm) tall. The floor of the can was covered with a graphite foil sheet 286 measuring about 10 inches (254 mm) square and about 15 mils (0.38 mm) thick. About 10 grams each of Grade RMC-3 magnesium turnings 288 (Reade Manufacturing Company, Lakehurst, N.J.) and TI-LOY 97 titanium sponge 290 (Chemalloy Company, Bryn Mawr, Pa.) were placed into the stainless steel can 284 outside of the stainless steel holder 380 and its contents. The titanium sponge 290 and magnesium turnings 288 serve to absorb stray oxygen and moisture in the stainless steel can 284. A copper foil sheet 292 measuring about 12 inches (305 mm) square and about 6 mils (0.15) thick was placed over the opening of the stainless steel can 284. The portions of the copper sheet 292 extending over the sides of the can 284 were folded down against the sides of the can 284 to form an isolated chamber. A hole for a nitrogen gas purge tube 294 was provided through one side of the can 284 near the base of the can 284.

The stainless steel can 284 and its contents were placed into an electric resistance heated air atmosphere furnace. A nitrogen gas flow rate of about 12 liters per minute into the stainless steel can 284 through the purge tube 294 was established. The furnace was heated from substantially room temperature to about 760° C. at a rate of about 600° C. per hour. At a temperature of about 650° C., the nitrogen gas flow rate was reduced from about 12 liters per minute to about 4 liters per minute. After maintaining a temperature of about 760° C. for about 1 hour, the pressureless infiltration of the slipcast filler material 272 by the molten matrix metal 274 was substantially complete. Accordingly, the nitrogen gas purge tube 294 was disconnected from the stainless steel can 284 and the can and its contents were removed from the furnace.

Figure 23:
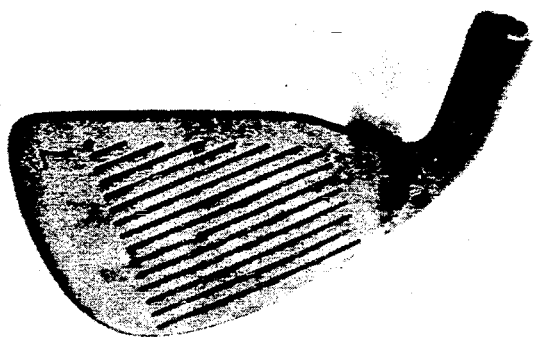
FIG. 23 is a photograph of a metal matrix composite body formed in accordance with Example 16.

The copper foil sheet 292 and the stainless steel holder 280 and its contents were removed from the stainless steel can 284. The stainless steel holder 280 and its contents were placed onto a refractory plate and room temperature air was directed at the base of the stainless steel holder 280. FEEDOL ® 9 hot topping particulate mixture (Foseco, Inc., Cleveland, Ohio) was poured on top of the residual molten matrix metal 274 to assist in directionally solidifying the matrix metal in the composite. After the stainless steel holder 280 and its contents had cooled to substantially room temperature, the investment shell mold 270 and its contents were removed from the holder 280. The investment shell mold 270 was removed from the formed metal matrix composite body contained within using low force hammer blows. The contents of the investment shell mold 270 revealed that the matrix metal 274 had indeed infiltrated the slip cast filler admixture 272 adjacent to the investment shell mold 270 to form a metal matrix composite body having substantially the same shape as the original golf club wax investment pattern. Furthermore, the residual matrix metal 274 substantially filled the cavity 296 inside the thin metal matrix composite golf club head. That the metal matrix composite surface layer was well bonded to the residual matrix metal contained within was demonstrated by the severity and intensity of the hammer blows required to break off a piece of the metal matrix composite surface layer. Thus, this Example demonstrates that through a slight modification to the techniques employed in Example 6, wherein a hollow metal matrix composite body was fabricated by infiltrating a slip cast shell of a filler material, that similarly a solid body can be fabricated by infiltrating a slip cast shell of filler material and allowing the matrix metal to fill the cavity inside of the slip cast shell of filler material. In essence, a macrocomposite resulted comprising a metal matrix composite surface layer well bonded to an unreinforced matrix metal substrate underneath. A photograph of a metal matrix composite golf club head similar to the one described above is shown in FIG. 23.

EXAMPLE 18

Figure 24:
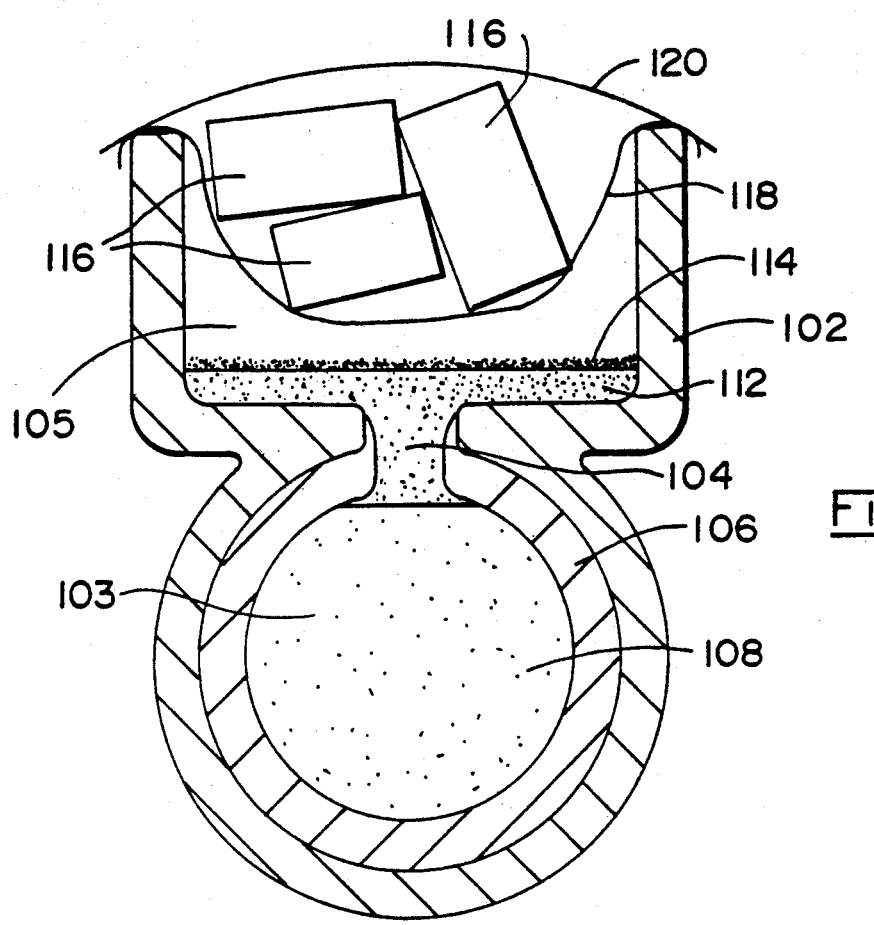
FIG. 24 is not a schematic cross-sectional view of a lay-up utilized to form a metal matrix composite body in accordance with Example 17.

This Example demonstrates a further embodiment of the technique of making a hollow metal matrix composite body by infiltrating a hollow slip cast preform with a matrix metal. The setup employed in carrying out the infiltration is substantially the same as that shown in FIG. 6b. A detailed cross-sectional view of the investment shell and its contents is shown schematically in FIG. 24.

A sphere measuring about 3 inches (76 mm) in diameter was spray coated with Grade MS-122 fluorocarbon release agent dry lubricant (Miller Stevenson Company, Inc., Danbury, Conn.). Grade GI-1000 rubber molding compound (Plastic Tooling Supply Company, Exton, Pa.) was cast around the spray coated sphere to form a rubber mold inversely replicating the shape of the sphere. After curing the rubber molding compound in air for about 12 hours, the spray coated sphere was separated from the mold. An exact wax model of the original sphere was then made by casting Grade 5550-K. GRN. FLK. molten wax (Yates Manufacturing Company, Chicago, Ill.) at a temperature of about 110° C. into the rubber mold cavity left after removing the sphere. The wax was then allowed to cool to substantially room temperature. After the wax had cooled to substantially room temperature, the wax model was separated from the rubber mold. A similar process was used to fabricate a wax model for the matrix metal reservoir portion of the subsequent investment shell. The reservoir measured about 4 inches (102 mm) in diameter and about 3 inches (76 mm) tall. Before solidification of the molten wax reservoir model, however, a wooden mandrel was inserted into the wax; the subsequent solidification of the wax locked the mandrel in place.

The two wax models, that for the sphere itself and that for the matrix metal reservoir, were joined to produce an investment pattern. The means of joining the two wax models comprised welding with additional molten wax.

An investment shell 102 comprising CaCO₃ was then built up on the surface of the wax investment pattern. Specifically, the wax investment pattern was dipped into a slip or slurry comprising by weight about 30.0 percent NYACOL® 1430AT colloidal silica (Nyacol Products, Inc., an affiliate of PQ Corporation, Ashland, Mass.), about 66.1 percent HUBERCARB® Q 325 calcium carbonate (−325 mesh, J. M. Huber Corporation, Calcium Carbonate Div., Quincy, Ill.), having substantially all particles less than 45 microns in size, about 3.0 percent 500 grit (average particle size about 17 microns) TETRABOR® boron carbide (Engineered Ceramics, New Canaan, Conn.), about 0.6 percent VICTOWET® 12 wetting agent (Ransom and Randolph, Inc., Maumee, Ohio) and about 0.3 percent DCH Antifoam defoamer (Ransom and Randolph, Inc.). The slip coated wax model was then dusted or stuccoed with dry 90 grit (216 microns average particle size) RANCO® SIL No. A silica sand (Ransom and Randolph, Inc.). The wax model and its developing investment shell 102 were then dried for about ¼ hour at a temperature of about 65° C. The dried investment shell 102 was then dipped for about 2 seconds into a bath of NYACOL® 1430AT colloidal silica. This dip-dust-dry-wet sequence was then immediately repeated. Next, the coated wax investment pattern was immediately dipped into a secondary investment slurry comprising by weight about 1 part REDIP® indicator (Ransom and Randolph, Inc.), about 2 parts VICTOWET® 12 wetting agent, 56 parts distilled water, about 274 parts NYACOL® 830 colloidal silica and about 700 parts RANCO® SIL No. 2 silica powder (Ransom and Randolph, Inc.) to yield a slurry viscosity corresponding to about 15 seconds in a Zahn number 4 cup. The slurry coated investment shell was then stuccoed or dipped in a fluidized bed of approximately 30 grit (930 microns average particle size) RANCO® SIL B silica sand (Ransom and Randolph, Inc.). The stuccoed investment shell was again dried at a temperature of about 65° C. for about ¼ hour or until the REDIP® indicator in the shell changed in color from yellow-green to deep orange. This second dip-stucco-dry sequence was then repeated an additional four to five times. No prewetting of the investment shell with colloidal silica between dippings in the secondary investment shell slurry was required. The coated wax investment pattern was then placed into a steam autoclave to remove the wax pattern from the surrounding investment shell. After autoclaving at a temperature corresponding to a water vapor pressure of about 100 psi (690 kPa) for about five minutes, substantially all of the wax had been removed from the surrounding investment shell 102. The resultant investment shell 102 defined a spherical end portion 103 that inter-connected via a tubular neck region 104 to an open ended cylinder 105. The investment shell 102 was then removed from the steam autoclave and placed into a resistance heated air atmosphere furnace at substantially room temperature. The furnace temperature was then increased to about 850° C. at a rate of about 800° C. per hour. After maintaining a temperature of about 850° C. for about 4 hours to rigidize the investment shell 102, the shell was furnace cooled to a temperature of about 600° C. The investment shell 102 was left in the approximately 600° C. furnace until it was ready to be used for the pressureless metal infiltration process.

About 1126 grams of a slip comprising by weight about 53.3 percent 1000 grit (6 microns average particle size) green silicon carbide (39 CRYSTOLON®, Norton Company, Worcester, Mass.), about 13.3 percent 500 grit (17 microns average particle size) 39 CRYSTOLON® green silicon carbide, about 31.1 percent acetone, about 2.0 percent magnesium particulate (−325 mesh, Hart Corporation, Tamaqua, Pa.) having substantially all particle diameters less than about 45 microns, and about 0.3 percent Q-PAC™ polypropylene carbonate binder (Air Products and Chemicals, Inc., Emmaus, Pa.) was prepared. Specifically, about 1942 grams of 39 CRYSTOLON® green silicon carbide and about 58 grams of magnesium particulates were placed into a dry 8.9 liter porcelain ball mill (U.S. Stoneware Corp., Mahwah, N.J.) containing about 4000 grams of 15/16 inch (24 mm) diameter milling media (Standard Ceramic Supply Co., a Division of Chem-Clay Corp., Pittsburgh, Pa.). After ball milling the particulates for about an hour, all but about 772 grams of ball milled particulates were removed from the mill. The removed ball milled particulates were sealed tightly in a NALGENE ® plastic jar (Nalge Company, Rochester, N.Y.) and stored for subsequent use. The acetone and the Q-PAC ™ binder were added as a solution to the ball milled mixture and hand mixed to form a slip.

The slip was poured into the lower chamber or spherical portion 103 of the aforementioned investment shell 102 to the top of the neck portion 104 joining the upper 105 and lower 103 chambers of the investment shell 102. During the slip casting process, additional slip was added to the lower chamber 103 to make up for the liquid absorbed by the walls of the investment shell 102. After about 2 minutes, the cake of filler material 106 built up on the walls of the investment shell 102 had reached a thickness of about ⅛ inch (3 mm), so the residual slip was poured from the investment shell 102. The resultant slip cast coating comprised a spherical shell preform 106 having an approximately ⅜ inch (10 mm) diameter opening and as dried weighed about 150 grams.

Loose 500 grit alumina powder 108 (38 ALUNDUM ®, Norton Company, 17 microns average particle size) was then poured into the interior of the slip cast preform 106 within the investment shell 102 to a level substantially flush with the bottom of the neck region 104. The 38 ALUNDUM ® alumina powder will not be substantially infiltrated with the matrix metal because neither the loose 38 ALUNDUM ® alumina powder nor the matrix metal contains any significant amount of magnesium infiltration enhancer precursor.

A dry filler admixture 112 having the same composition as the admixture which was utilized to make the slip was then poured into the neck region 104 of the investment shell 102 on top of the loose 38 ALUNDUM ® alumina particulate 108. The dry filler admixture 112 substantially filled the neck 104 and filled the bottom of the upper portion 105 of the investment shell to a depth of about ¼ inch (6 mm) Magnesium particulate 114 (−50 mesh, Reade Manufacturing Company) having substantially all its particles less than 300 microns in size was then sprinkled evenly over the top of this dry loose filler material admixture 112 until a concentration of about 6 milligrams per square centimeter was obtained.

Several ingots of a matrix metal 116 comprising by weight about 12 percent silicon and the balance commercially pure aluminum, weighing a total of about 1225 grams, were placed on top of copper foil slings 118 folded over the side of the reservoir chambers such that the ingots remained suspended over the magnesium particulate layer 114 and the filler material admixture 112 in the bottom of the upper or cylindrical portion of the investment shell 102. A PERMA FOIL graphite foil cover sheet 120 (TT America, Portland, Oreg.) sufficiently large to cover the open end of the cylindrical portion 105 of the investment shell 102 was placed over the matrix metal 116.

The investment shell 102 and its contents were placed onto a stainless steel holder 122 and secured with copper foil straps 124. The stainless steel holder 122 and its contents were then placed into a stainless steel can 126 measuring about 10 inches (254 mm) long by about 10 inches (254 mm) wide by about 10 inches (254 mm) tall. The bottom of the stainless steel can 126 was covered with a graphite foil sheet 128 having substantially the same dimensions as the length and width of the can 126. About 10 grams each of Grade RMC-3 magnesium turnings 130 (Reade Manufacturing Company) and TI-LOY 97 titanium sponge 134 (Chemalloy Company, Bryn Mawr, Pa.) were placed into the stainless steel can 126 outside of the stainless steel holder 122. The titanium sponge and magnesium turning function as a "getter" to absorb oxygen and moisture. Two copper foil sheets 132 each measuring about 16 inches (406 mm) long by about 14 inches (356 mm) wide by about 6 mils (0.15 mm) thick were placed over the opening of the stainless steel can 126. The portions of the copper sheets 132 extending over the sides of the can 126 were folded down against the sides of the can 126 to form an isolated chamber. A nitrogen gas purge tube 136 was provided through one side of the can 126.

The stainless steel can 126 and its contents were placed into an electric resistance atmosphere furnace. A nitrogen gas flow rate of about 15 liters per minute through the purge tube 136 into the stainless steel can 126 was established. The furnace was heated from substantially room temperature to a temperature of about 220° C. at a rate of about 400° C. per hour. After maintaining a temperature of about 220° C. for about 2 hours, the temperature was increased to about 520° C. at a rate of about 400° C. per hour. After maintaining a temperature of about 520° C. for about 1 hour, the temperature was increased to about 780° C. at a rate of about 400° C. per hour. After maintaining a temperature of about 780° C. for about 3 hours, the nitrogen gas purge tube 136 was disconnected. The stainless steel can 126 and its contents were removed from the furnace.

Figure 25:
FIG. 25 is a photograph of the metal matrix composite body formed in accordance with Example 17.

The copper foil sheets 132 and the stainless steel holder 122 and its contents were removed from the stainless steel can 126. The investment shell 102 containing the formed metal matrix composite body was removed from the stainless steel holder 122 and was placed on refractory bricks in the path of forced air flowing at a rapid rate to permit directional solidification. FEEDOL ® 9 hot topping particulate mixture (Foseco, Inc., Cleveland Ohio) was poured on top of the molten matrix metal 116. After cooling to about room temperature, the investment shell 102 was removed with low force hammer blows to reveal that the matrix metal 116 had infiltrated the loose filler admixture 112 and the slip cast filler admixture 106 adjacent to the investment shell 102 to form a metal matrix composite body having substantially the same shape as the original spherical wax investment pattern. Residual matrix metal 116 was removed from the metal matrix composite body with a diamond saw. Finally, the metal matrix composite body was sliced in half using a diamond saw and the alumina powder 108 inside of the metal matrix composite shell was blown out with compressed air to reveal a net shape surface showing practically zero infiltration of the loose 38 ALUNDUM ® alumina powder. A photograph of the sectioned hollow metal matrix composite sphere is shown in FIG. 25. The metal matrix composite body need not be sectioned to remove the uninfiltrated loose powder, however. Example 6 demonstrated that the shape integrity of the body can be largely preserved by merely drilling a hole in the body and blowing out the loose powder with compressed air.

EXAMPLE 19

This Example is essentially similar to the previous Example which disclosed a technique for making a hollow metal matrix composite body by infiltrating a hollow slip cast preform with a matrix metal. The significant differences in the present Example from the previous Example are herein detailed.

About 350 grams of a slip which was prepared in substantially the same manner as the slip described in Example 18 was poured into the spherical or lower chamber of investment shell 102 to the top of the neck portion 104 joining the upper 105 and lower 103 chambers of the investment shell 102. A rubber stopper was inserted into the neck region 104 and the investment shell was rotated in all directions for about 2 minutes so that the slip would evenly coat all portions of the walls in the lower chamber 103. The investment shell 102 was then rotated by hand about its horizontal axis for about 13 minutes. After a total of about 15 minutes of slip casting, substantially all of the liquid had been absorbed by the porous investment shell. The rubber stopper was removed from the neck portion 104 of the investment shell 102 and the investment shell 102 and its developing slip cast preform 106 was placed into an air atmosphere drying oven at a temperature of about 90° C. After drying at a temperature of about 90° C. for about an hour, the investment shell 102 and its contents were removed from the drying oven and allowed to cool. Loose 500 grit alumina powder 108 (38 ALUNDUM ®, Norton Co., Worcester, Mass.) was then poured into the interior of the slip cast preform 106 within the investment shell 102 to a level substantially flush with the bottom of the neck region 104. The 38 ALUNDUM ® will not be substantially infiltrated with the matrix metal because neither the loose 38 ALUNDUM ® nor the matrix metal contains any significant amount of magnesium infiltration enhancer precursor.

Additional slip material having substantially the same composition as the slip used to cast the hollow spherical preform shape 106 into the lower portion 104 of the investment shell 102 was then slip cast into the neck region 104 of the investment shell 102 on top of the loose 38 ALUNDUM ® alumina particulate 108. As casting proceeded, additional slip was periodically poured into the reservoir until the cake of filler material 112 substantially filled the neck region 104 of the investment shell 102. Magnesium particulate 114 (−50 mesh, Reade Manufacturing Co., Lakehurst, N.J.) having substantially all particles less than 300 microns in size was then sprinkled evenly over the top of this second slip cast filler material admixture 112 until a concentration of about 100 milligrams per square centimeter was obtained.

Several ingots of a matrix metal 116 comprising by weight about 12 percent silicon and the balance commercially pure aluminum weighing a total of about 1378 grams were placed on top of copper foil slings 118 (Alloy 110, All Foils Inc., Brooklyn Heights, Ohio) folded over the side of the reservoir chambers such that the ingots remained suspended over the magnesium particulate layer 114 and the slipcast filler material 112 in the bottom of the upper or cylindrical portion 105 of the investment shell 102. A PERMA FOIL ® graphite foil cover sheet 120 (TT America, Portland, Oreg.) sufficiently large to cover the end of the cylindrical portion 105 of the investment shell 102 was placed over the matrix metal 116.

The total weight of filler material as dried in the preform was about 319 grams.

Another substantial difference between the present Example and Example 18 concerns the furnace heating schedule. In the present Example, a resistance heated controlled atmosphere furnace was, upon heating to the final processing temperature, was maintained at a temperature of 220° C. for about 11 hours. In Example 18 the temperature was maintained at approximately 220° C. for only about 2 hours.

Figure 26:
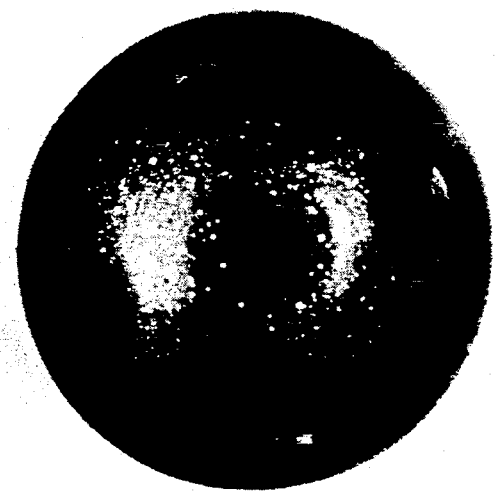
FIG. 26 is a photograph of a metal matrix composite body formed in accordance with Example 18.

After carrying out the PRIMEX ® pressureless metal infiltration process and directionally solidifying the formed metal matrix composite body and allowing said body to cool to substantially room temperature, the investment shell 102 was removed with low force hammer blows to reveal that at least some of the matrix metal 116 had infiltrated the slip cast filler material admixtures 112 and 106 adjacent to the investment shell 102 to form a metal matrix composite body having substantially the same shape as the original spherical wax investment pattern. Residual matrix metal 116 was removed from the metal matrix composite body with a diamond saw. A number of holes, each measuring about 11/32 of an inch (8.7 m) in diameter, were drilled in specific locations in the metal matrix composite spherical shell body using diamond tooling. The loose uninfiltrated 38 ALUNDUM ® alumina powder inside of the metal matrix composite spherical shell was blown out with compressed air. Finally, bolt threads were ground into the diamond-machined holes as illustrated by the photograph shown in FIG. 26.

EXAMPLE 20

Figure 27:
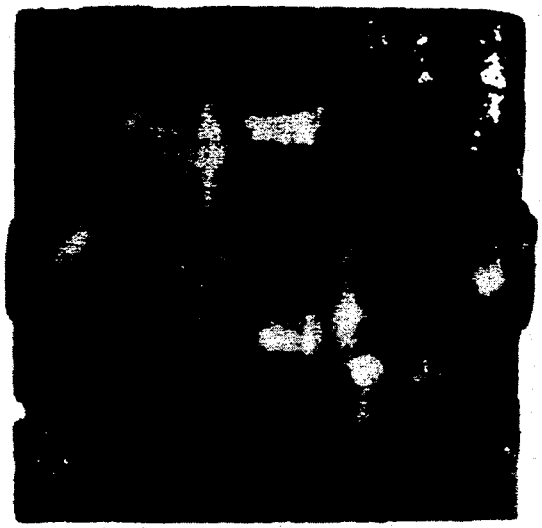
FIG. 27 is a metal matrix composite body formed in accordance with Example 19.

This Example further illustrates the technique of fabricating a metal matrix composite body of complex shape by infiltrating a loose filler material admixture with a matrix metal contained within an investment shell confinement means. A photograph of the formed truss fitting structure is shown in FIG. 27. The setup employed in carrying out the infiltration is substantially the same as that shown in FIG. 6b.

A wax model replicating the size and shape of the truss fitting structure was fabricated in substantially the same manner as the wax model described in Example 18. An investment shell was then formed around the wax model. The composition and assembly of the investment shell was substantially the same as that described in the aforementioned Example. After fabrication of the investment shell around the wax model, the wax was removed by a firing process substantially the same as that in Example 18.

The resulting investment shell mold 102 was filled with a filler material admixture by substantially the same technique as employed in Example 10. The preparation and composition of the filler material admixture 106 was also substantially the same as that described in Example 10. The filler admixture was added to the investment shell until the bottom of the upper or reservoir portion 105 of the investment shell 102 was filled to a depth of about ½ inch (13 mm). Magnesium particulate 114 (−50 mesh, Reade Manufacturing Co., Lakehurst, N.J.) having substantially all of its particles less than about 300 microns in size was then sprinkled evenly over the top of the dry, loose filler material admixture 106 until a concentration of about 140 milligrams per square centimeter was obtained.

Several ingots of a matrix metal 116 comprising by weight about 12 percent silicon and the balance commercially pure aluminum weighing a total of about 2264 grams were placed on top of the layer of magnesium particulate in the upper or reservoir portion 105 of the investment shell 102. The ingots of matrix metal were located so as to avoid resting directly over the neck portion 104 of the investment shell 102. A PERMA FOIL graphite foil cover sheet 120 (TT America, Portland, Oreg.) sufficiently large to cover the open end of the reservoir portion 105 of the investment shell 102 was placed over the matrix metal 116.

The investment shell 102 and its contents were placed onto a stainless steel holder 122 and secured with copper foil straps 124. The stainless steel holder 122 and its contents were then placed into a stainless steel can 126 measuring about 10 inches (254 mm) long by about 10 inches (254 mm) wide by about 10 inches (254 mm) tall. The bottom of the stainless steel can 126 was covered with a graphite foil sheet 128 having substantially the same dimensions as the length and width of the can 126. About 10 grams each of Grade RMC-3 magnesium turnings 130 (Reade Manufacturing Co., Lakehurst, N.J.) and TI-LOY 97 titanium sponge 134 (Chemalloy Company, Bryn Mawr, Pa.) were placed into the stainless steel can 126 outside of a stainless steel holder 122. The titanium sponge and magnesium turning function as a "getter" to absorb oxygen and moisture. Two copper foil sheets 132 each measuring about 16 inches (406 mm) long by about 14 inches (356 mm) wide by about 6 mils (0.15 mm) thick were placed over the opening of the stainless steel can 126. The portions of the copper sheets 132, extending over the sides of the can 126, were folded against the sides of the can 126 to form an isolated chamber. A nitrogen gas purge tube 136 was provided through one side of the can 126.

The stainless steel can 126 and its contents were placed into a resistance heated air atmosphere furnace. A nitrogen gas flow rate of about 15 liters per minute through the purge tube 136 into the stainless steel can 126 was established. The furnace was heated from substantially room temperature to a temperature of about 220° C. at a rate of about 400° C. per hour. After maintaining a temperature of about 220° C. for about 10 hours, the temperature was then increased to about 520° C. at a rate of about 400° C. per hour. After maintaining a temperature of about 520° C. for about 1 hour, the temperature was then increased to about 780° C. at a rate of about 400° C. per hour. After maintaining a temperature of about 780° C. for about 2½ hours, a nitrogen purge tube 136 was disconnected. The stainless steel can 126 and its contents were removed from the furnace.

The copper foil sheets 132 and the stainless steel holder 122 and its contents were removed from the stainless steel can 126. The investment shell 102 and its contents were removed from the stainless steel holder 122 and placed between two refractory supports. Air was blown around the bottom of the investment shell 102 to directionally solidify the matrix metal in the composite. FEEDOL ® 9 hot topping particulate mixture (Foseco, Inc., Cleveland, Ohio) was poured on top of the molten matrix metal 116. After the investment shell 102 and its contents had cooled to substantially room temperature, the investment shell 102 was removed with low force hammer blows to reveal that the matrix metal 116 had infiltrated the loose filler material admixture 106 to form a metal matrix composite body having substantially the same size and shape as the original wax investment pattern of the truss fitting structure. The residual matrix metal 116 was removed from the metal matrix composite body with a diamond saw.

EXAMPLE 21

Figure 28:
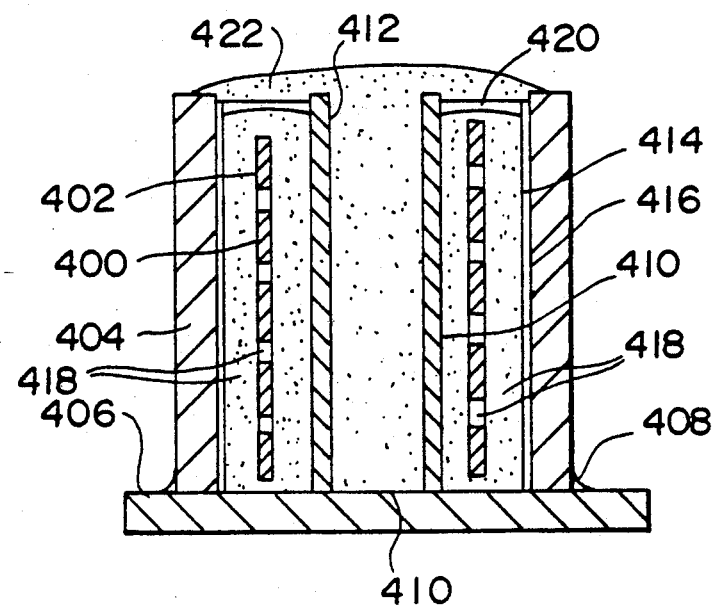
FIG. 28 is a schematic cross-sectional view of a lay-up utilized to form a metal matrix composite body in accordance with Example 20.

This Example demonstrates yet another embodiment of the concept of forming a metal matrix composite body containing inversely replicated channels. The setup used to make such a body is shown schematically in cross section in FIG. 28.

A matrix metal tube 400 measuring about 1.31 inches (33 mm) in outside diameter by about 1.05 inches (27 mm) in inside diameter by about 6 inches (152 mm) tall was perforated with about 36 through holes each measuring about 0.17 inches (4.3 mm) in diameter and staggered at about 1 inch (25 mm) intervals. The composition of the matrix metal comprised by weight about 0.4 to 0.8 percent silicon ≦0.7 percent iron, about 0.15 to 0.40 percent copper, ≦0.15 percent manganese, about 0.8 to 1.2 percent magnesium, about 0.04 to 0.35 percent chromium, ≦0.25 percent zinc, ≦0.15 percent titanium and the balance aluminum (Aluminum Association Alloy No. 6061). The matrix metal tube 400 was prepared by sandblasting to remove any surface oxide and was then cleaned with ethyl alcohol to remove any debris from the sandblasting operation. The perforated matrix metal tube 400 was then spray coated with a slurry 402 comprising by weight about 33 percent magnesium particulate (−352 mesh, Hart Corporation, Tamaqua, Pa.), about 1 percent XUS 40303.00 Experimental Binder (Dow Chemical Co., Midland, Mich.) and the balance ethyl alcohol. After coating all surfaces of the matrix metal tube 400, the coated tube 400, 402 was dried in a forced air drying oven at a temperature of about 70° C. for about 15 minutes. Weighing the matrix metal tube 400 before and after the coating operation revealed that about 0.26 grams of magnesium particulate had been deposited on the surface of the matrix metal tube 400.

The following sequence of steps describes the assembly of the lay-up used in carrying out the metal matrix composite fabrication process. The top side of Grade AGSX graphite base plate 406 (Union Carbide Corp.) measuring about 3.5 inches (89 mm) long by about 2.625 (67 mm) inches wide by about 0.5 inches (13 mm) thick was coated with an approximately 50 volume percent solution of DAG ®154 colloidal graphite 410 (Acheson Colloids, Port Huron, Mich.) and the balance ethyl alcohol. The coated base plate was then cured or dried at a temperature of about 400° C. in air for about 3 hours. A similar coating and drying operation was performed on the outside of a Grade AGXS graphite tube measuring about 0.625 inches (16 mm) in outside diameter by about 0.5625 inches (14.3 mm) in inside diameter by about 6 inches (152 mm) tall. This coated graphite tube was then inserted into an approximately ⅛ inch (3 mm) deep depression or countersink in the top side of the graphite base plate 406 so as to form the boundary for the inside diameter of the metal matrix composite. A grade AGSX graphite tube 404 (Union Carbide Co., Carbon Products Division, Danbury, Conn.) measuring about 2.0 inches (51 mm) in outside diameter by about 1.5 inches (38 mm) in inside diameter by about 6.250 inches (159 mm) tall was cemented to the top of the graphite base plate 406 concentric with the graphite tube 412. The means of cementing the two pieces of graphite comprised a mixture 408 of 180 grit green silicon carbide particulate (39 CRYSTOLON ®, Norton Co., Worcester, Mass.) and RIGIDLOCK ® colloidal graphite cement (Polycarbon Corporation, Valencia, Calif.) in a weight ratio of about 2 to 1.

A sheet of GRAFOIL ® graphite foil 414 (Union Carbide Co., Carbon Product Division, Cleveland, Ohio.) measuring about 6 inches (152 mm) long and about 15 mils (0.4 mm) thick was wrapped around a mandrel in the shape of a rod whose diameter was just slightly less than that of the inside diameter of the larger diameter graphite tube 404. The width of the GRAFOIL ® was such that an approximately ¼ inch (6 mm) overlap was allowed. The portions of the GRAFOIL ® overlapping were cemented to one another using RIGIDLOCK ® colloidal graphite cement (Polycarbon Corp., Valencia, Calif.). The outside of the GRAFOIL ® sheet 414 was also coated with a thin layer of RIGIDLOCK ® colloidal graphite cement 416. Before the colloidal graphite cement had hardened, the mandrel and its GRAFOIL ® sheet layer 414 were inserted into the developing lay-up so that the coated GRAFOIL ® sheet 414 could be transferred to the inside of the large diameter graphite tube 404. Specifically, the GRAFOIL ® sheet 414 was transferred by removing the mandrel while holding the sheet 414 in place against the inside of the graphite tube. After the mandrel was withdrawn, the GRAFOIL ® sheet 414 was pressed firmly against the inside of the large diameter graphite tube 404 to remove any air gaps between the GRAFOIL ® sheet 414 and the graphite tube 404 and to allow the RIGIDLOCK ® graphite cement 416 to adhere the two pieces together. The coated matrix metal tube 400, 402 was then inserted into the cavity between the large 404 and small 412 diameter graphite tubes and centered between the two.

A filler material admixture 418 was prepared by ball milling about 1000 grams of the admixture for about 6 hours in a dry porcelain ball mill having about 8.9 liters of internal volume and containing about 2000 grams of dense alumina milling media (Standard Ceramic Supply Co., a Division of Chem-Clay Corp., Pittsburgh, Pa.) each measuring about 15/16 inch (24 mm) in diameter. The filler material admixture 418 comprised by weight about 7.4 percent magnesium particulate (−325 mesh, Reade Manufacturing Co., Lakehurst, N.J.) and the balance Grade T-64 tabular alumina (−325 mesh, Alcoa Industrial Chemicals Division, Bauxite, Ark.). The developing lay-up was then placed on top of a vibration table and low intensity vibration was initiated. About 98.37 grams of the ball milled filler material was poured around the matrix metal tube. The low intensity vibration allowed the loose filler material admixture 418 to fill all the holes in the matrix metal tube 400. The top of the filler material admixture 418 was substantially flush with the top of the inside graphite tube 412. A GRAFOIL ® graphite foil ring 420 (Union Carbide Co., Carbon Products Division, Danbury, Conn.) was cut so as to substantially completely cover the exposed portion of the filler material admixture 418 and was placed over the exposed top surface of said admixture. Finally, aluminum nitride particulate 422 (Starck B, Hermann C. Starck, Inc., New York, N.Y.) having an average particle diameter of about 1 to 3 microns was poured into the cavity inside the inner graphite tube to a point where some aluminum nitride particulate 422 was allowed to overflow covering the remainder of the top surface of the lay-up.

The lay-up was placed into an electric resistance controlled atmosphere furnace. The furnace atmosphere was evacuated to about 30 inches (762 mm) of mercury vacuum and then backfilled with nitrogen gas. A nitrogen gas flow rate of about 5 liters per minute was established through the furnace. The furnace temperature was raised from substantially room temperature to a temperature of about 475° C. at a rate of about 200° C. per hour. After maintaining a temperature of about 475° C. for about 5 hours, the temperature was then increased to about 500° C. at a rate of about 10° C. per hour. After maintaining a temperature of about 500° C. for about 1 hour, the temperature was then increased to about 800° C. at a rate of about 200° C. per hour. After maintaing a temperature of about 800° C. for about 5 hours, the pressureless infiltration of the filler material admixture by the matrix metal was substantially completely and power to the furnace was terminated. The lay-up was allowed to cool in the furnace. After cooling to substantially room temperature, the lay-up was removed from the furnace and disassembled. The resulting metal matrix composite body which was recovered revealed that substantially all of the filler material 418 was infiltrated by matrix metal 400 and those portions of the lay-up which were originally occupied by matrix metal 400 had become cavities. The resulting metal matrix composite body thus substantially comprised two concentric tubes joined by channels of additional metal matrix composite material at those locations which originally had been the through holes in the original matrix metal tube 400.

EXAMPLE 22

This Example demonstrates that a metal matrix composite body having a honeycomb structure can be fabricated.

A slurrified filler material admixture was prepared by combining about 3000 grams of Grade T-64 tabular alumina (−325 mesh, Alcoa Industrial Chemicals Division, Bauxite, Ark.) having substantially all particles less than about 45 microns in diameter, about 240 grams of magnesium particulate (−325 mesh, Reade Manufacturing Co., Lakehurst, N.J.) having substantially all particles less than about 45 microns in diameter, about 162 grams of XUS 40303.00 experimental binder (Dow Chemical Co., Mindland, Mich.) and about 1038 grams of ethyl alcohol in a polyethylene jug having a volume of about 1 gallon. A handful of approximately ¼ inch (6 mm) diameter alumina milling media was added to the slurry in the polyethylene jug and the slurry was roll mixed for about 2 hours on a mill rack at a speed of about 65 rpm.

A matrix metal having a honeycomb structure (Pollux Corporation, Jessup, Md.) and comprising by weight about 0.05–0.20 percent copper, about 1.0–1.5 percent manganese, ≦0.6 percent silicon, ≦0.7 percent iron, ≦0.1 percent zinc, and the balance aluminum (Aluminum Association Alloy No. 3003) and measuring about 3 inches (76 mm) long by about 0.9 inch (23 mm) wide by about 1.1 inches (28 mm) tall and weighing about 4.73 grams was dip-coated one time in the roll mixed slurry of filler material. The excess slurry was blown off with compressed air and the coated matrix metal honeycomb structure was placed into a GRAFOIL ® graphite foil box measuring about 4¼ inches (108 mm) long by about 1 inch (25 mm) wide by about 1¼ inches (32 mm) tall. The graphite foil box was fabricated from a single sheet of GRAFOIL® measuring about 15 mils (0.38 mm) thick by making strategically placed cuts and fold and bonding the folds to one another using RIGIDLOCK® graphite cement (Polycarbon Corporation, Valencia, Calif.). The GRAFOIL® box was open on one end. The GRAFOIL® box and its contents were placed into a forced air drying oven at a temperature of about 70° C. and allowed to dry for about 15 minutes. A second five-sided GRAFOIL® box, to serve as a lid for the aforementioned GRAFOIL® box, was fabricated by substantially the same means as the aforementioned box and measured about 4⅜ inches (111 mm) long by about 1⅛ inches (29 mm) wide by ½ inch (13 mm) tall. The GRAFOIL® lid was placed over the opening of the GRAFOIL® box and the enclosed box and its contents were placed into a Grade AGSX graphite boat whose exterior dimensions measured about 9 inches (229 mm) long by about 5 inches (127 mm) wide by about 4 inches (102 mm) tall. A lid for this graphite boat was fabricated from graphite foil in substantially the same manner as the lid for the GRAFOIL® box. The graphite boat and its contents were placed into a resistance heated controlled atmosphere furnace. The furnace chamber was evacuated to about 30 inches (762 mm) of mercury vacuum and backfilled with nitrogen gas. A nitrogen gas flow rate of about 2.5 liters per minute was established through the furnace. The furnace temperature was raised from substantially room temperature to a temperature of about 475° C. at a rate of about 200° C. per hour. After maintaining a temperature of about 475° C. for about 5 hours, the temperature was then increased to about 500° C. at a rate of about 10° C. per hour. After maintaining a temperature of about 500° C. for about 1 hour, the temperature was then increased to about 810° C. at a rate of about 200° C. per hour. After maintaining a temperature of about 810° C. for about 5 hours, the pressureless infiltration of the filler material admixture by the matrix metal was substantially complete. The furnace temperature was accordingly decreased to a temperature of about 760° C. at a rate of about 200° C. per hour. At a temperature of about 760° C., the graphite boat and its contents were removed from the furnace and allowed to cool on a water-cooled aluminum quench plate. After cooling to substantially room temperature, the graphite boat and its contents were disassembled to reveal that the matrix metal honeycomb structure had indeed infiltrated its filler material admixture coating layer to produce a honeycomb metal matrix composite structure.

Figure 30:
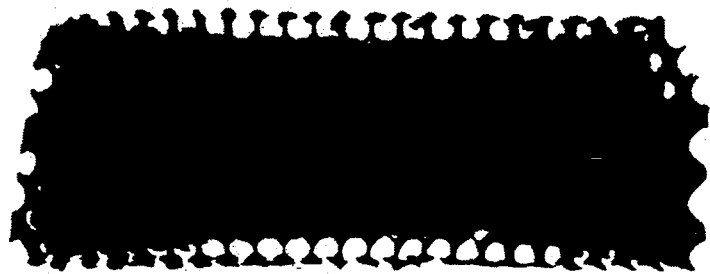
FIG. 30 is a photograph of a metal matrix composite honeycomb structure formed in accordance with Example 22.
Figure 31:
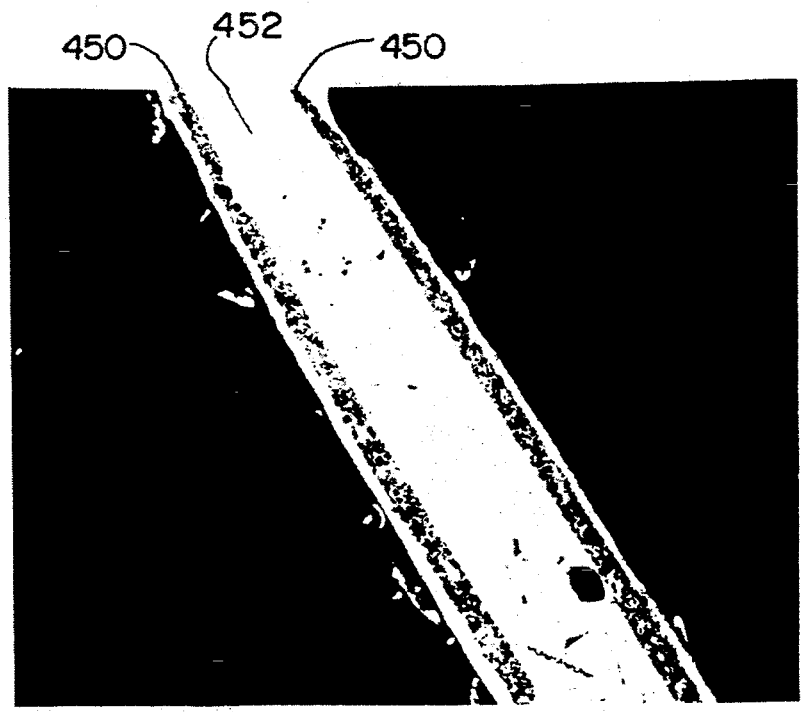
FIG. 31 is a photograph taken at about 50× of a cross section of a portion of the honeycomb body formed in accordance with Example 22.

A photograph of the formed metal matrix composite honeycomb structure is shown in FIG. 30. An approximately 50× magnification photomicrograph of a cross-section of one of the sides of a hexagonal cell in the honeycomb structure is shown in FIG. 31. The regions of metal matrix composite material 450 and residual metal 452 are clearly seen.

What is claimed is:

1. A method for forming a plurality of individual thin metal matrix composite bodies in a single infiltration process, said method comprising:

forming a plurality of thin permeable masses, each thin permeable mass comprising at least one material selected from the group consisting of a filler material and a preform;

providing at least one barrier material between each said thin permeable mass, thereby forming a sandwich structure whereby said barrier material defines the boundaries to which molten matrix metal infiltrates during infiltration;

providing a molten source of matrix metal which communicates with at least a portion of said each thin permeable mass;

infiltrating at least a portion of said each thin permeable mass with molten matrix metal to form a plurality of individual thin metal matrix composite bodies; and recovering said plurality of formed individual thin metal matrix composite bodies from said sandwich structure.

2. The method according to claim 1, wherein each of said permeable masses comprises a preform which is fabricated by at least one process selected from the group consisting of tape casting, slip casting, extrusion, injection molding, isostatic pressing, spray coating and sediment casting.

3. The method according to claim 1, wherein each of said permeable masses comprises a filler material which is sandwiched between two barrier materials.

4. The method according to claim 3, wherein each of said permeable masses comprises a filler material which is applied to at least a portion of each surface of said barrier material.

5. The method of claim 1, wherein an infiltrating atmosphere communicates with said permeable masses for at least a portion of the period of infiltration.

6. The method of claim 1, wherein the infiltrating atmosphere comprises an atmosphere selected from the group consisting of oxygen and nitrogen.

7. The method of claim 1, wherein at least one of an infiltration enhancer precursor and an infiltration enhancer is provided in at least one of said matrix metal and said permeable masses.

8. The method of claim 7, wherein the infiltration enhancer is formed by reacting an infiltration enhancer precursor and the infiltrating atmosphere.

9. The method of claim 8, wherein during infiltration, the infiltration enhancer precursor volatilizes.

10. The method of claim 9, wherein the volatilized infiltration enhancer precursor reacts to form a reaction product in at least a portion of each of the permeable masses.

11. The method of claim 10, wherein said reaction product is at least partially reducible by said molten matrix metal.

12. The method of claim 11, wherein said reaction product is formed as a coating on at least a portion of each of said permeable masses.

13. The method of claim 10, wherein the reaction product comprises a nitride of magnesium.

14. The method of claim 1, wherein each of said permeable masses possesses at least one characteristic which is different from each other.

15. The method of claim 1, wherein said plurality of permeable masses each comprise at least one material selected from the group consisting of powders, flakes, platelets, microspheres, whiskers, bubbles, fibers, particulates, fiber mats, chopped fibers, spheres, pellets, tubules and refractory cloths.

16. The method of claim 1, wherein each of said permeable masses comprises at least one ceramic material.

17. The method of claim 1, wherein said at least one barrier material comprises at least one material selected from the group consisting of carbon, graphite and titanium diboride.

18. The method of claim 1, wherein said at least one barrier material comprises a plurality of sheets of graphite foil.

19. The method of claim 18, wherein said graphite foil and said permeable masses are formed into said sandwich structure whereby each permeable mass is positioned adjacent to a separate graphite sheet.

20. The method of claim 18, wherein each permeable mass of said plurality of permeable masses is bounded and contacted by a pair of said sheets of graphite foil.

21. The method of claim 18, wherein said at least one ceramic material comprises silicon carbide.

22. The method of claim 2, wherein said matrix metal comprises aluminum.

* * * * *